United States Patent [19]
Katoh et al.

[11] Patent Number: 5,483,795
[45] Date of Patent: Jan. 16, 1996

[54] EXHAUST PURIFICATION DEVICE OF INTERNAL COMBUSTION ENGINE

[75] Inventors: Kenji Katoh, Shizuoka; Tokuta Inoue; Hidetaka Nohira, both of Mishima; Kiyoshi Nakanishi, Susono; Satoshi Iguchi, Mishima; Tetsuro Kihara, Susono; Masato Gotoh, Toyota; Takamitsu Asanuma, Susono; Hiroshi Okano; Jun Harada, both of Toyota; Shinichi Takeshima, Susono; Masahiko Sugiyama, Mishima; Shigenori Sakurai, Toyota; Kenji Ohkubo, Toyota; Mikio Murachi, Toyota, all of Japan

[73] Assignee: Toyota Jidosha Kabushiki Kaisha, Toyota, Japan

[21] Appl. No.: 295,917
[22] PCT Filed: Jan. 14, 1994
[86] PCT No.: PCT/JP94/00050
§ 371 Date: Sep. 15, 1994
§ 102(e) Date: Sep. 15, 1994
[87] PCT Pub. No.: WO94/17291
PCT Pub. Date: Aug. 4, 1994

[30] Foreign Application Priority Data

Jan. 19, 1993 [JP] Japan ................................. 5-006746
May 10, 1993 [JP] Japan ................................. 5-108333

[51] Int. Cl.⁶ ..................................................... F01N 3/20
[52] U.S. Cl. ............................... 60/276; 60/285; 60/286; 60/297; 60/301; 60/311
[58] Field of Search ............................. 60/276, 285, 301, 60/297, 286, 311, 277

[56] References Cited

U.S. PATENT DOCUMENTS

| | | | |
|---|---|---|---|
| 5,088,281 | 2/1992 | Izutani | 60/274 |
| 5,203,165 | 4/1993 | Wild | 60/274 |
| 5,214,915 | 7/1993 | Schneider | 60/276 |
| 5,388,406 | 2/1995 | Takeshima | 60/301 |

FOREIGN PATENT DOCUMENTS

| | | |
|---|---|---|
| 503882A1 | 3/1992 | European Pat. Off. . |
| 62-106826 | 5/1987 | Japan . |
| 62-97630 | 5/1987 | Japan . |
| 62-117620 | 5/1987 | Japan . |
| 56816B1 | 12/1989 | Japan . |
| 2-149715 | 6/1990 | Japan . |
| 3-124909 | 5/1991 | Japan . |
| 3-135417 | 6/1991 | Japan . |
| 4-617 U | 1/1992 | Japan . |
| 4-141219 | 5/1992 | Japan . |
| 6-81637 | 3/1994 | Japan . |
| 6-58139 | 3/1994 | Japan . |
| 5-149130 | 6/1994 | Japan . |
| WO-A93/7363 | 4/1993 | WIPO . |

OTHER PUBLICATIONS

"NO Removal by Absorption into BaO–CuO Binary Oxides" by Masato Machida, et al. (J. Chem. Soc., Chem Commun., pp. 1165–1166.

"Formation and Decomposition of $BaCuO_{2.5}$ Prepared from a Mixture of Nitrates" by Masato Machida, et al., (Journal of Solid State Chemistry, pp. 176–179.

"NO Removal by Absorption into Ba–Cu–O Binary Oxides" by Masato Machida, et al. (Catalyst vol. 33 No. 2, pp. 87–90).

*Primary Examiner*—Douglas Hart
*Attorney, Agent, or Firm*—Kenyon & Kenyon

[57] ABSTRACT

An $NO_x$ absorber (18) is arranged in an exhaust passage of an internal combustion engine. The $NO_x$ absorber (18) absorbs the $NO_x$ when the air-fuel ratio of the exhaust gas flowing into the $NO_x$ absorber (18) is lean while releases the absorbed $NO_x$ when the air-fuel ratio of the exhaust gas flowing into the $NO_x$ absorber (18) becomes the stoichiometric air-fuel ratio or rich. An air-fuel ratio sensor (22) is arranged in the exhaust passage downstream of the $NO_x$ absorber (18). When the air-fuel ratio detected by the air-fuel ratio sensor (22) is switched from lean to rich after the air-fuel ratio of the exhaust gas flowing into $NO_x$ absorber (18) is switched from lean to rich, it is decided that the releasing action of $NO_x$ from the $NO_x$ absorber (18) is completed.

18 Claims, 31 Drawing Sheets

Fig. 5
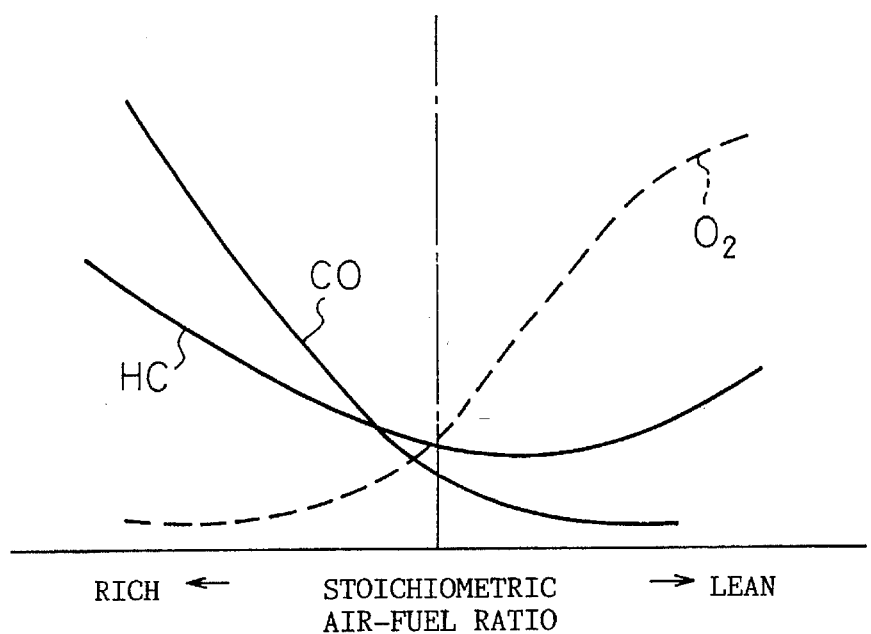
RICH ← STOICHIOMETRIC → LEAN
AIR-FUEL RATIO
Fig. 6(A)  Fig. 6(B)
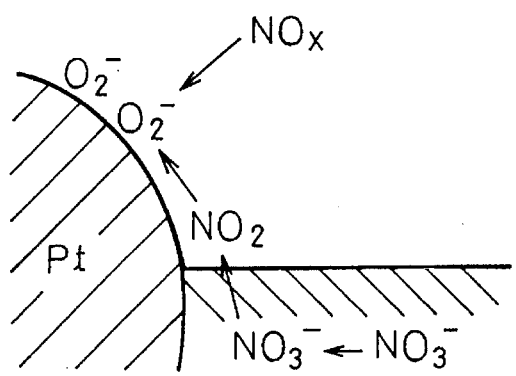 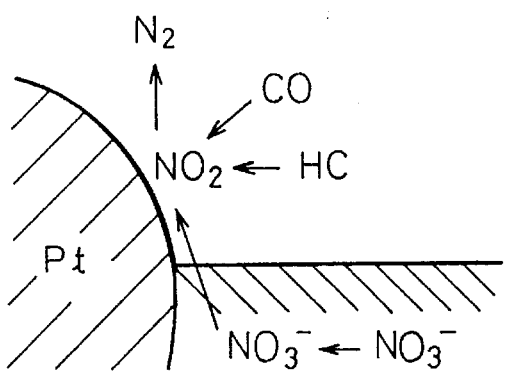

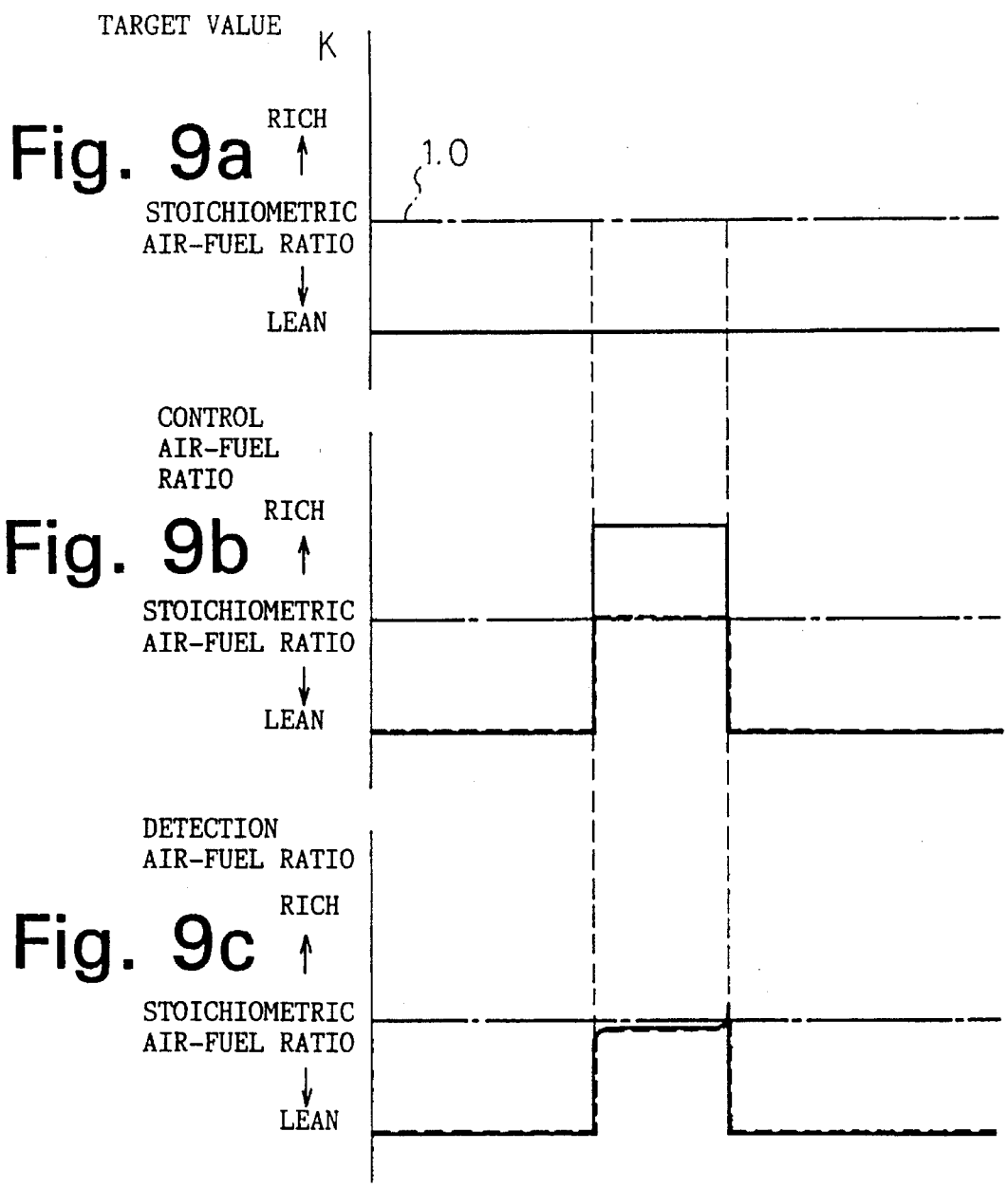

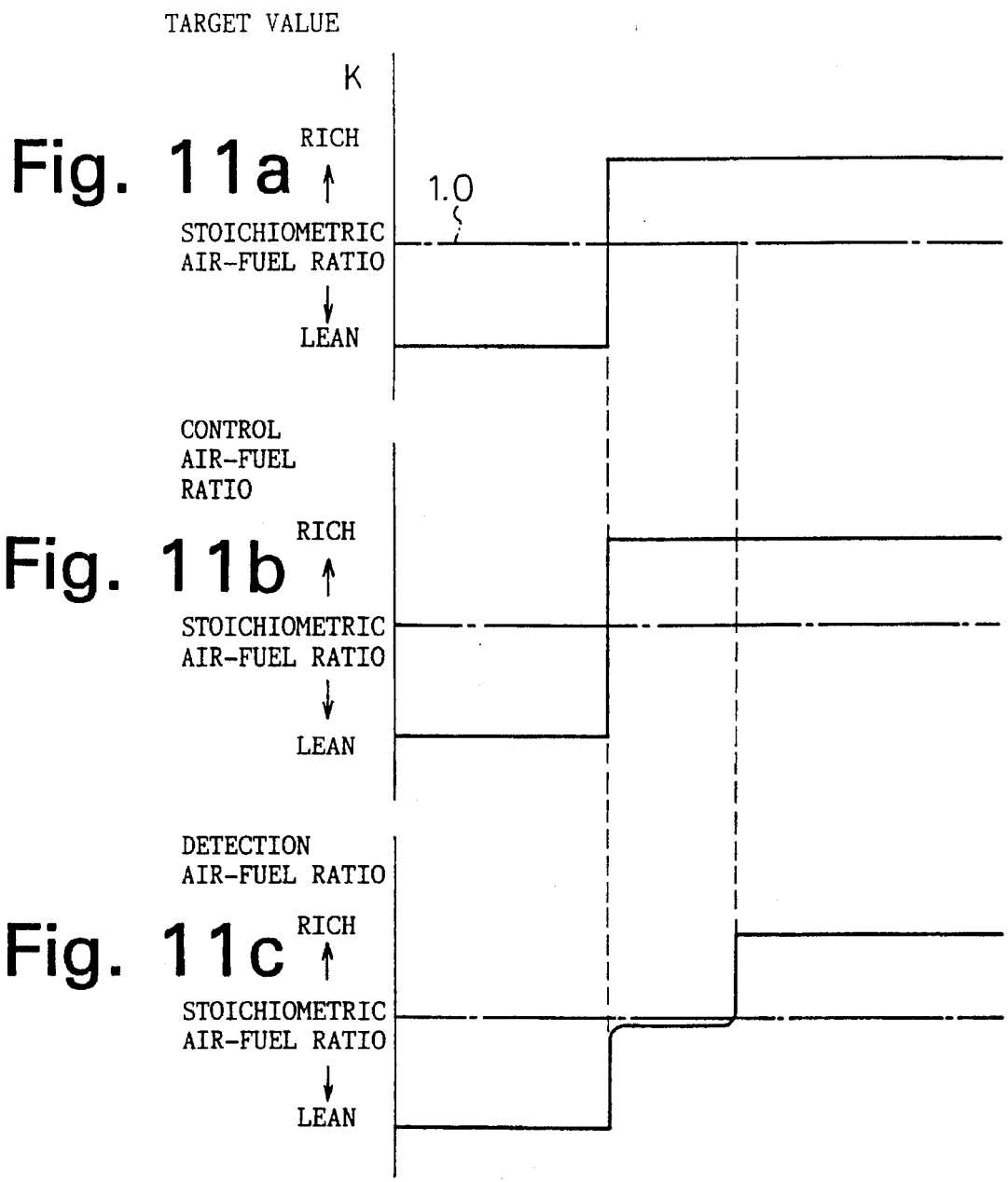

TARGET VALUE

CONTROL AIR-FUEL RATIO

DETECTION AIR-FUEL RATIO

TARGET VALUE

TARGET VALUE
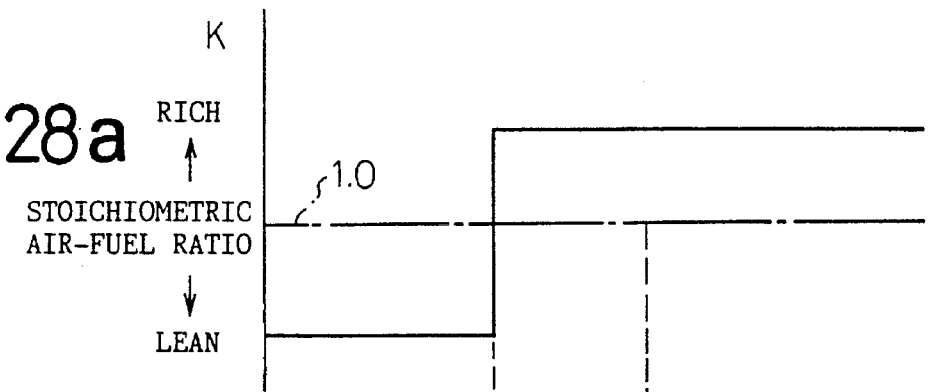
CONTROL AIR-FUEL RATIO
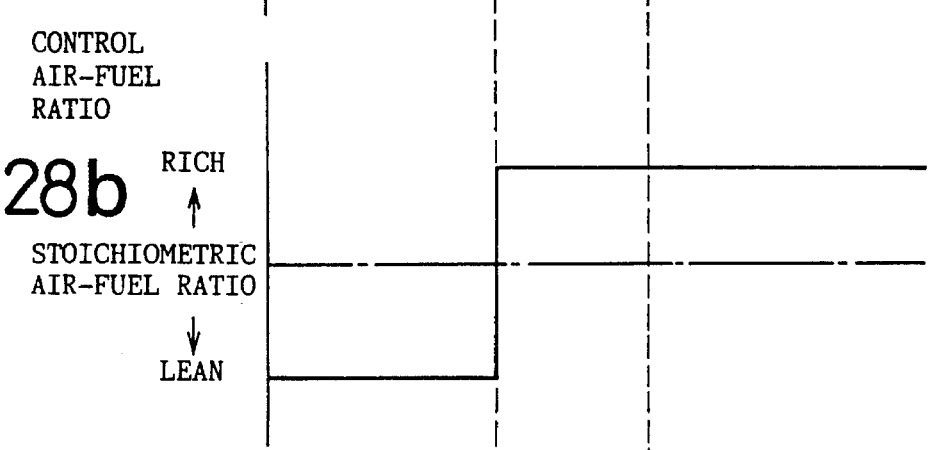
DETECTION AIR-FUEL RATIO
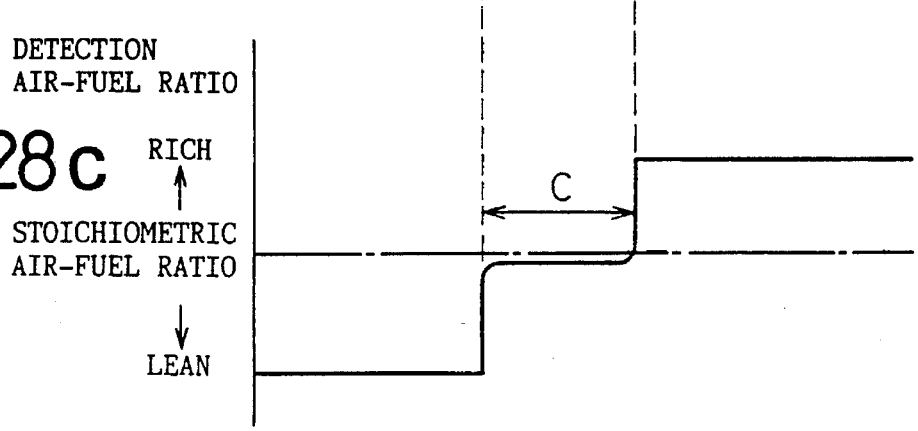

EXHAUST PURIFICATION DEVICE OF INTERNAL COMBUSTION ENGINE

TECHNICAL FIELD

The present invention relates to an exhaust purification device of an internal combustion engine.

BACKGROUND ART

An internal combustion engine in which an $NO_x$ absorber which absorbs the $NO_x$ when an air-fuel ratio of an inflowing exhaust gas is lean while releases the absorbed $NO_x$ when the air-fuel ratio of the inflowing exhaust gas is a stoichiometric air-fuel ratio or rich is arranged in an engine exhaust passage, the $NO_x$ generated when burning a lean air-fuel mixture is absorbed by the $NO_x$ absorber, the air-fuel ratio of the air-fuel mixture flowing into the $NO_x$ absorber is switched from lean to the stoichiometric air-fuel ratio or rich for a predetermined constant time before the $NO_x$ absorbing capability of the $NO_x$ absorber is saturated to make the $NO_x$ absorber release the $NO_x$, and, at the same time, the released $NO_x$ is reduced has been already proposed by the present applicant (refer to PCT/JP92/01279).

However, the releasing speed and the amount of the $NO_x$ released from the $NO_x$ absorber when the air-fuel ratio of the exhaust gas flowing into the $NO_x$ absorber is switched from lean to the stoichiometric air-fuel ratio or rich so as to release the $NO_x$ from the $NO_x$ absorber greatly fluctuate according to the amount of $NO_x$ absorbed in the $NO_x$ absorber, the temperature of the $NO_x$ absorber, and the degree of richness at the time when the air-fuel ratio is switched from lean to rich. Accordingly, when the air-fuel ratio of the exhaust gas flowing into the $NO_x$ absorber is designed to be switched from lean to the stoichiometric air-fuel ratio or rich exactly for a predetermined constant time when the $NO_x$ should be released from the $NO_x$ absorber as in the above-mentioned internal combustion engine, if this constant time is too short, the $NO_x$ absorbed in the $NO_x$ absorber is not sufficiently released, and therefore the $NO_x$ absorbing capability of the $NO_x$ absorber is gradually decreased and the absorber finally becomes unable to absorb the $NO_x$, while if this constant time is too long, even if the releasing action of the $NO_x$ from the $NO_x$ absorber is completed, for example the air-fuel ratio of the exhaust gas is maintained at rich, and thus a large amount of unburnt HC and CO will be released into the atmosphere.

To prevent a situation where the $NO_x$ absorber becomes unable to absorb the $NO_x$ or a large amount of unburnt HC and CO is released into the atmosphere, it is sufficient if the air-fuel ratio of the exhaust gas flowing into the $NO_x$ absorber is maintained at the stoichiometric air-fuel ratio or rich until the releasing action of $NO_x$ from the $NO_x$ absorber is completed. For this purpose, it becomes necessary to detect when the $NO_x$ releasing action from the $NO_x$ absorber has been completed.

Also, since sulfur is contained in the fuel and lubricating oil of an engine, $SO_x$ is discharged from the engine. This $SO_x$ is also absorbed together with $NO_x$ into the $NO_x$ absorber. However, when the amount of $SO_x$ absorbed in the $NO_x$ absorber is increased, the amount of $NO_x$ that can be absorbed by the $NO_x$ absorber is gradually lowered, and the time from when the releasing of $NO_x$ is started to when the releasing of $NO_x$ is completed gradually becomes shorter. In this case, the reduction of the amount of $NO_x$ that can be absorbed by the $NO_x$ absorber means that the $NO_x$ absorber is deteriorated, and accordingly as the $NO_x$ absorber is deteriorated, the time from when the releasing of $NO_x$ is started to when the releasing of $NO_x$ is completed becomes shorter. Accordingly, also in this case, if it can be detected when the $NO_x$ releasing action from the $NO_x$ absorber is completed, the degree of deterioration of the $NO_x$ can be determined.

In this way, there are various merits in use if it can be detected when the $NO_x$ releasing action from the $NO_x$ absorber is completed, but in actual circumstances, it cannot be detected when the $NO_x$ releasing action from the $NO_x$ absorber is completed.

DISCLOSURE OF THE INVENTION

An object of the present invention is to provide an exhaust gas purification device which can detect when the $NO_x$ releasing action from the $NO_x$ absorber has been completed.

According to the present invention, there is provided an exhaust gas purification device of an internal combustion engine in which an $NO_x$ absorber which absorbs the $NO_x$ when the air-fuel ratio of an inflowing exhaust gas is lean while releases the absorbed $NO_x$ when the air-fuel ratio of the inflowing exhaust gas is rich is arranged in an engine exhaust passage, an air-fuel ratio sensor is arranged in the engine exhaust passage downstream of the $NO_x$ absorber, and provision is made of an $NO_x$ releasing completion decision means for deciding that the releasing action of $NO_x$ from the $NO_x$ absorber is completed when the air-fuel ratio detected by the air-fuel ratio sensor is switched from lean to rich after the air-fuel ratio of the exhaust gas flowing into the $NO_x$ absorber is switched from lean to the stoichiometric air-fuel ratio or rich and the releasing action of $NO_x$ from the $NO_x$ absorber is started.

BRIEF DESCRIPTION OF THE DRAWINGS

FIG. 5 is a graph schematically showing a concentration of unburnt HC and CO and oxygen in, the exhaust gas discharged from the engine;

FIG. 6(A), 6(B) is a view for explaining the absorption and releasing action of $NO_x$;

FIG. 9 is a view showing the change of the air-fuel ratio;

FIG. 11 is a view showing the change of the air-fuel ratio;

FIG. 28 is a view of the change of the air-fuel ratio;

BEST MODE FOR CARRYING OUT THE INVENTION

Figure 1:
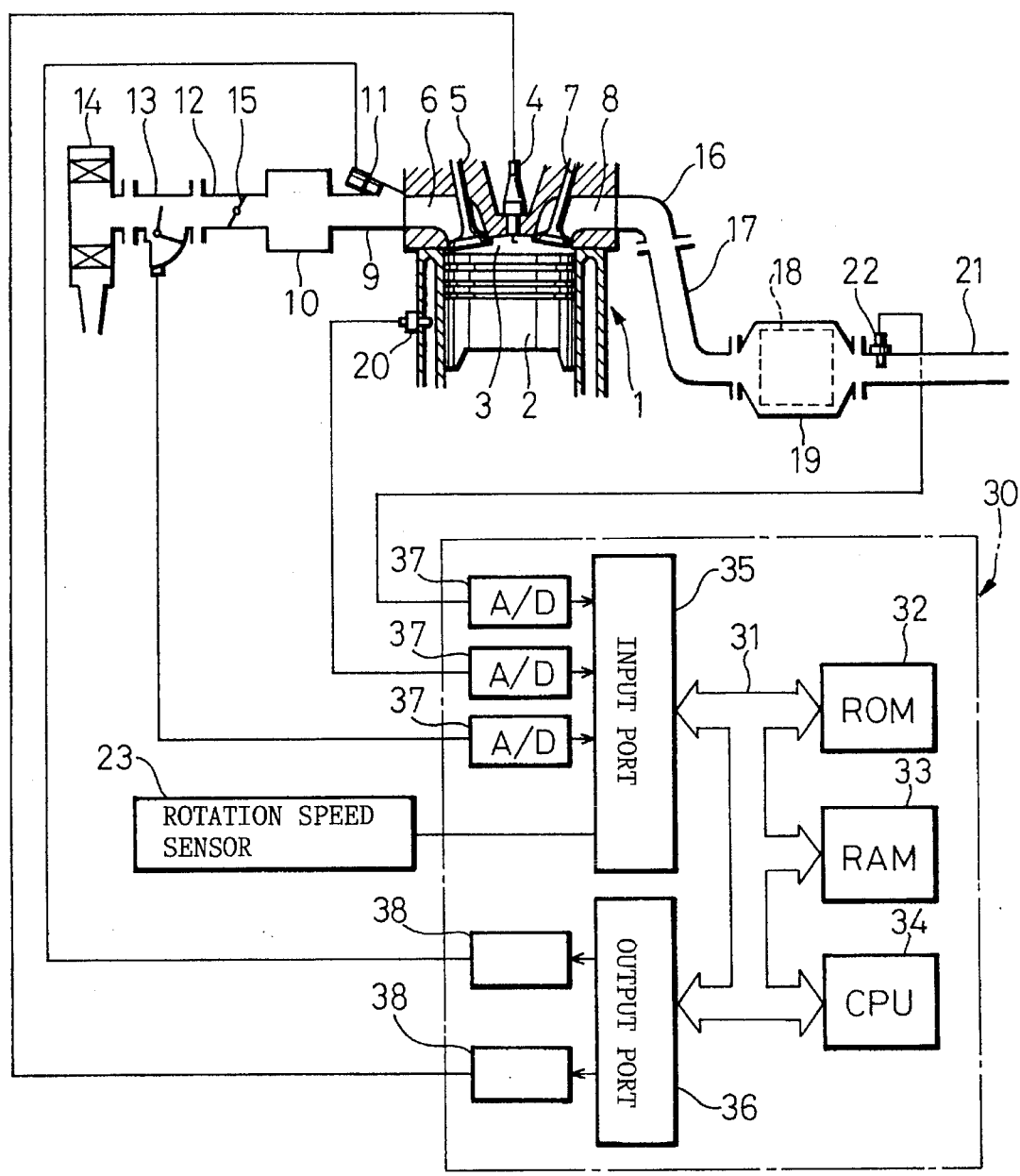
FIG. 1 is an overall view of an internal combustion engine.

FIG. 1 shows a case where the present invention is applied to a gasoline engine.

Referring to FIG. 1, 1 denotes an engine body; 2, a piston; 3, a combustion chamber; 4, a spark plug; 5, an intake valve; 6, an intake port; 7, an exhaust valve; and 8, an exhaust port; respectively. The intake port 6 is connected via a corresponding branch pipe 9 to a surge tank 10, and fuel injectors 11 for injecting the fuel toward the inside of the intake port 6 are attached to the respective branch pipes 9. The surge tank 10 is connected via an intake duct 12 and an air flow meter 13 to an air cleaner 14, and a throttle valve 15 is arranged in the intake duct 12. On the other hand, the exhaust port 8 is connected via an exhaust manifold 16 and an exhaust pipe 17 to a casing 19 including an $NO_x$ absorber 18.

An electronic control unit 30 comprises a digital computer and is provided with a ROM (read only memory) 32, RAM (random access memory) 33, a CPU (microprocessor) 34, an input port 35, and an output port 36 which are mutually connected by a bidirectional bus 31. The air flow meter 13 generates an output voltage proportional to the intake air amount, and this output voltage is input via a corresponding AD converter 37 to the input port 35. A water temperature sensor 20 which generates an output voltage proportional to the engine coolant temperature is attached to the engine body 1, and the output voltage of this water temperature sensor 20 is input via a corresponding AD converter 37 to an input port 35. An air-fuel ratio sensor 22 is arranged in the exhaust pipe 21 downstream of the casing 19, and the output voltage or output current of this air-fuel ratio sensor 22 is input via a corresponding AD converter 37 to the input port 35. Also, a rotation speed sensor 23 generating an output pulse expressing the engine rotation speed is connected to the input port 35. On the other hand, the output port 36 is connected via a corresponding drive circuit 38 to the spark plug 4 and the fuel injector 11, respectively.

In the internal combustion engine shown in FIG. 1, the fuel injection time TAU is calculated based on for example the following equation:

$$TAU=TP \cdot K$$

Figure 2:
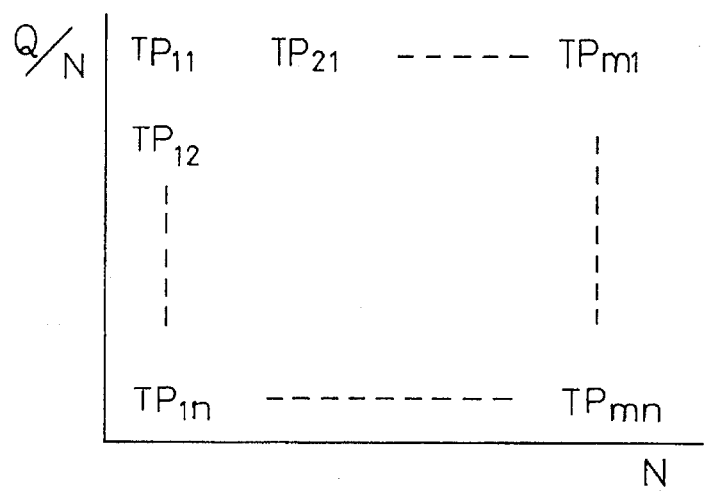
FIG. 2 is a view of a map of a basic fuel injection time.

Here, TP indicates the basic fuel injection time; and K indicates the correction coefficient. The basic fuel injection time TP indicates a fuel injection time necessary for bringing the air-fuel ratio of the air-fuel mixture fed into the engine cylinder to the stoichiometric air-fuel ratio. This basic fuel injection time TP is found in advance by experiments and is stored in advance in the ROM 32 in the form of a map as shown in FIG. 2 as a function of the engine load Q/N (intake air amount Q/engine rotation speed N) and the engine rotation speed N. The correction coefficient K is a coefficient for controlling the air-fuel ratio of the air-fuel mixture fed into the engine cylinder. If K=1.0, the air-fuel mixture fed into the engine cylinder comes to have the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, while when K becomes larger than 1.0, the air-fuel ratio of the air-fuel mixture fed into the engine cylinder becomes smaller than the stoichiometric air-fuel ratio, that is, becomes rich.

Figure 3:
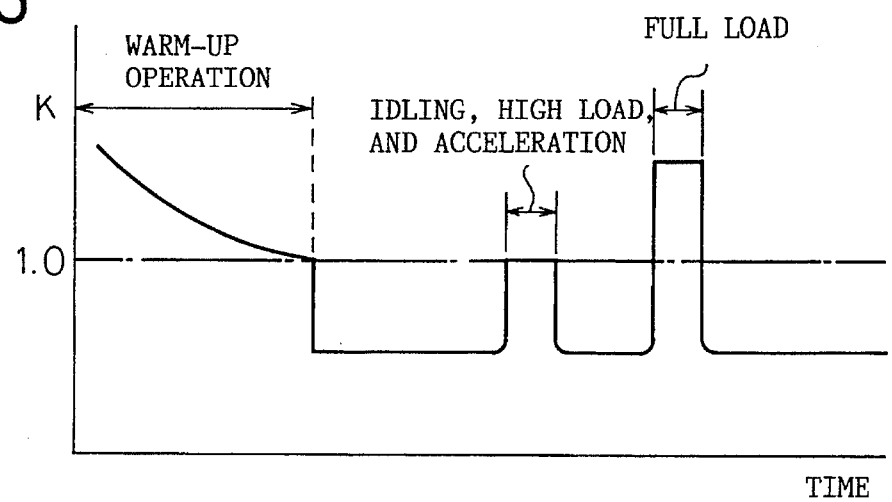
FIG. 3 is a view of a change of a correction coefficient K.
Figure 4:
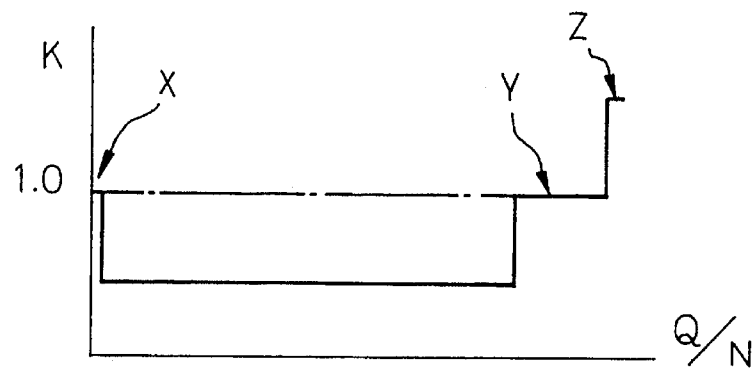
FIG. 4 is a view of a relationship between the correction coefficient K and an engine load Q/N.

This correction coefficient K is controlled in accordance with the operation state of the engine. FIG. 3 and FIG. 4 show one embodiment of control of the correction coefficient K. Note that, an abscissa of FIG. 3 indicates a time and an abscissa of FIG. 4 indicates the load Q/N. In this embodiment, as shown in FIG. 3, during the warm-up operation, the correction coefficient K is gradually lowered as the engine coolant temperature becomes higher, and when the warming up is completed, the correction coefficient K is maintained at a constant value smaller than 1.0, that is, the air-fuel ratio of the air-fuel mixture fed into the engine cylinder is maintained at lean. On the other hand, after the completion of the warming up, as shown in FIG. 3 and FIG. 4, at the time of an idling operation (X of FIG. 4), at the time of a high load operation (Y of FIG. 4). and at the time of an acceleration operation, the correction coefficient K is made for example 1.0, that is, the air-fuel ratio of the air-fuel mixture fed into the engine cylinder is made the stoichiometric air-fuel ratio, and at the time of the full load operation (Z of FIG. 4), the correction coefficient K is made larger than 1.0, that is, the air-fuel ratio of the air-fuel mixture fed into the engine cylinder is made rich. As seen from FIG. 3 and FIG. 4, in the embodiment shown in FIG. 3 and FIG. 4, the air-fuel ratio of the air-fuel mixture fed into the engine cylinder is maintained at the constant lean air-fuel ratio except at the time of the warm-up operation, the time of the idling operation, the time of the high load operation, the time of the acceleration operation and the time of the full load operation, and accordingly in most of the engine operating regions, a lean air-fuel mixture will be burned.

FIG. 5 schematically shows the concentration of representative components in the exhaust gas discharged from the combustion chamber 3. As seen from FIG. 5, the concentration of the unburnt HC and CO in the exhaust gas discharged from the combustion chamber 3 is increased as the air-fuel ratio of the air-fuel mixture fed into the combustion chamber 3 becomes richer, while the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorber 18 accommodated in the casing 19 uses for example alumina as the carrier. On this carrier, at least one element selected from alkali metals, for example, potassium K, sodium Na, lithium Li, and cesium Cs, alkali earths such as barium Ba and calcium Ca, rare earths such as lanthanum La and yttrium Y and a precious metal such as platinum Pt are carried. When calling the ratio between the air and fuel (hydrocarbon) fed into the engine intake passage and the exhaust passage upstream of the $NO_x$ absorber 18 the air-fuel ratio of the inflowing exhaust gas to the $NO_x$ absorber 18, this $NO_x$ absorber 18 performs the $NO_x$ absorption and releasing action of absorbing the $NO_x$ when the air-fuel ratio of the inflowing exhaust gas is lean, while releasing the absorbed $NO_x$ when the oxygen concentration in the inflowing exhaust gas is lowered. Note that, where the fuel (hydrocarbon) or air is not fed into the exhaust passage upstream of the $NO_x$ absorber 18, the air-fuel ratio of the inflowing exhaust gas coincides with the air-fuel ratio of the air-fuel mixture fed into the combustion chamber 3, and accordingly, in this case, the $NO_x$ absorber 18 will absorb the $NO_x$ when the air-fuel ratio of the air-fuel mixture fed into the combustion chamber 3 is lean, while release the absorbed $NO_x$ when the oxygen concentration in the air-fuel mixture fed into the combustion chamber 3 is lowered.

When the above-mentioned $NO_x$ absorber 18 is arranged in the engine exhaust passage, this $NO_x$ absorber 18 actually performs the $NO_x$ absorption and releasing action, but there also exists some unclarity in the detailed mechanism of this absorption and releasing function. However, this absorption and releasing function is considered to be carried out by the mechanism as shown in FIG. 6o Next, this mechanism will be explained taking as an example a case where platinum Pt and barium Ba are carried on the carrier, but the same mechanism is realized even if other precious metals, alkali metals, alkali earths or rare earths are used.

Namely, when the inflowing exhaust gas becomes considerably lean, the oxygen concentration in the inflowing exhaust gas is greatly increased, and as shown in FIG. 6(A), this oxygen 02 is deposited on the surface of the platinum Pt in the form of $O_2^-$ or $O^{2-}$. On the other hand, the NO in the inflowing exhaust gas is reacted with $O_2^-$ or $O^{2-}$ on the surface of the platinum Pt, and becomes $NO_2$ ($2NO+O_2 \rightarrow NO_2$). Subsequently, a part of the produced $NO_2$ is oxidized on the platinum Pt, while absorbed into the absorber, and bonded with the barium oxide BaO, while diffused in the form of nitric acid ions $NO_3^-$ into the absorber as shown in FIG. 5(A). In this way, the $NO_x$ is absorbed into the $NO_x$ absorber 18.

So far as the oxygen concentration in the inflowing exhaust gas is high, the $NO_2$ is produced on the surface of the platinum Pt, and so far as the $NO_x$ absorption capability of the absorber is not saturated, the $NO_2$ is absorbed into the absorber, and the nitric acid ions $NO_3^-$ are produced. Contrary to this, when the oxygen concentration in the inflowing exhaust gas is lowered and the amount of production of $NO_2$ is lowered, the reaction is advanced in a reverse direction ($NO_3^- \rightarrow NO_2$), thus the nitric acid ions $NO_3^-$ in the absorber are released in the form of $NO_2$ from the absorber. Namely, this means that, when the oxygen concentration in the inflowing exhaust gas is lowered, the $NO_x$ will be released from the $NO_x$ absorber 18. As shown in FIG. 5, when the degree of leanness of the inflowing exhaust gas becomes low, the oxygen concentration in the inflowing exhaust gas is lowered, and accordingly when the degree of leanness of the inflowing exhaust gas is lowered, even if the air-fuel ratio of the inflowing exhaust gas is lean, the $NO_x$ will be released from the $NO_x$ absorber 18.

On the other hand, when the air-fuel ratio of the air-fuel mixture fed into the combustion chamber 3 is made rich and the air-fuel ratio of the inflowing exhaust gas becomes rich, as shown in FIG. 5, a large amount of unburnt HC and CO are discharged from the engine, and these unburnt HC and CO are reacted with the oxygen $O_2^-$ or $O^{2-}$ on the platinum Pt, and oxidized. Also, when the air-fuel ratio of the inflowing exhaust gas becomes rich, the oxygen concentration in the inflowing exhaust gas is extremely lowered, and therefore the $NO_2$ is released from the absorber, and this $NO_2$ is reacted with the unburnt HC and CO and reduced as shown in FIG. 6(B). In this way, when $NO_x$ no longer exists on the surface of the platinum Pt, the $NO_2$ is successively released from the absorber. Accordingly, this means that, when the air-fuel ratio of the inflowing exhaust gas is made rich, $NO_x$ is released from the $NO_x$ absorber 18 for a short time.

Namely, when the air-fuel ratio of the inflowing exhaust gas is made rich, first of all, the unburnt HC and CO are immediately reacted with $O_2^-$ or $O^{2-}$ on the platinum Pt and oxidized, and subsequently if the unburnt HC and CO still remain even if the $O_2^-$ or $O^{2-}$ on the platinum Pt is consumed, the $NO_x$ released from the absorber and the $NO_x$ discharged from the engine are reduced by these unburnt HC and CO. Accordingly, when the air-fuel ratio of the inflowing exhaust gas is made rich, the $NO_x$ absorbed in the $NO_x$ absorber 18 is released for a short time, and in addition, this released $NO_x$ is reduced, and therefore this means that it is possible to prevent the discharge of $NO_x$ into the atmosphere. Also, the $NO_x$ absorber 18 has a function of a reduction catalyst, and therefore even if the air-fuel ratio of the inflowing exhaust gas is made the stoichiometric air-fuel ratio, the $NO_x$ released from the $NO_x$ absorber 18 is reduced. However, where the air-fuel ratio of the inflowing exhaust gas is made the stoichiometric air-fuel ratio, the $NO_x$ is only gradually released from the $NO_x$ absorber 18, and therefore a slightly long time is required for releasing all $NO_x$ absorbed in the $NO_x$ absorber 18.

When the degree of leanness of the air-fuel ratio of the inflowing exhaust gas is made low as mentioned before, even if the air-fuel ratio of the inflowing exhaust gas is lean, the $NO_x$ is released from the $NO_x$ absorber 18. Accordingly, so as to release the $NO_x$ from the $NO_x$ absorber 18, it is sufficient if the oxygen concentration in the inflowing exhaust gas is lowered. Note, if the air-fuel ratio of the inflowing exhaust gas is lean even if the $NO_x$ is released from the $NO_x$ absorber 18, the $NO_x$ is not reduced in the $NO_x$ absorber 18, and accordingly in this case, it is necessary to provide a catalyst which can reduce the $NO_x$ downstream of the $NO_x$ absorber 18 or feed the reduction agent downstream of the $NO_x$ absorber 18. Of course, it is possible to reduce the $NO_x$ downstream of the $NO_x$ absorber 18 in this way, but it is rather preferred more than this that the $NO_x$ be reduced in the $NO_x$ absorber 18. Accordingly, in the embodiment according to the present invention, when the $NO_x$ should be released from the $NO_x$ absorber 18, the air-fuel ratio of the inflowing exhaust gas is made the stoichiometric air-fuel ratio or rich, whereby the $NO_x$ released from the $NO_x$ absorber 18 is reduced in the $NO_x$ absorber 18.

In this embodiment according to the present invention, as mentioned above, at the time of a full load operation, the air-fuel ratio of the air-fuel mixture fed into the combustion chamber 3 is made rich, while at the time of an idling operation, the time of a high load operation and the time of an acceleration operation, the air-fuel ratio of the air-fuel mixture is made the stoichiometric air-fuel ratio, and therefore this means that the $NO_x$ is released from the $NO_x$ absorber 18 at the time of the full load operation, the time of the idling operation, the time of the high load operation and the time of the acceleration operation. However, when the frequency of such a full load operation, idling operation, high load operation or acceleration operation being carried out is small, even if the $NO_x$ is released from the $NO_x$ absorber 18 only at the time of the full load operation, the time of idling operation, the time of the high load operation and the time of acceleration operation, the absorption capability of $NO_x$ by the $NO_x$ absorber 18 is saturated during the period when the lean air-fuel mixture is burned, and thus the $NO_x$ can no longer be absorbed by the $NO_x$ absorber 18.

Accordingly, in the embodiment according to the present invention, when the lean air-fuel mixture is continuously burned over a constant time, the air-fuel ratio of the inflowing exhaust gas is temporarily made the stoichiometric air-fuel ratio or rich to make the $NO_x$ absorber 18 release the $NO_x$.

In this case, if a time for which the air-fuel ratio of the inflowing exhaust gas is made the stoichiometric air-fuel ratio or rich is too short, the air-fuel ratio of the inflowing exhaust gas is returned to lean again before all $NO_x$ absorbed in the $NO_x$ absorber 18 is released. As a result, the amount of $NO_x$ which is continuously absorbed into the $NO_x$ absorber 18 and held is gradually increased, and therefore finally the $NO_x$ absorber 18 can no longer absorb the $NO_x$, and thus there arises a problem in that the $NO_x$ is released into the atmosphere. Contrary to this, if a time during which the air-fuel ratio of the inflowing exhaust gas is made the stoichiometric air-fuel ratio or rich is too long, particularly where the air-fuel ratio of the inflowing exhaust gas is made rich, even after all $NO_x$ is released from the $NO_x$ absorber 18, an exhaust gas containing a large amount of the unburnt HC and CO will flow into the $NO_x$ absorber 18. In this case, however, since no $NO_x$ which should be reduced exists, these unburnt HC and CO are discharged as they are from the $NO_x$ absorber 18, and thus there arises a problem in that a large amount of unburnt HC and CO are discharged into the atmosphere.

So as to solve these problems, that is, so as to prevent releasing of the $NO_x$ and unburnt HC and CO into the atmosphere, the air-fuel ratio of inflowing exhaust gas must be returned to lean when the releasing action of $NO_x$ from the $NO_x$ absorber 18 is completed, and this means that the completion of the $NO_x$ releasing action from the $NO_x$ absorber 18 must be detected for this purpose. In the present invention, it is detected from the air-fuel ratio detected by the air-fuel ratio sensor 22 when the $NO_x$ releasing action from the $NO_x$ absorber 18 is completed. An explanation will be made below of this.

Namely, when the air-fuel ratio of the air-fuel mixture fed into the combustion chamber 3 becomes the stoichiometric air-fuel ratio or rich, as shown in FIG. 5, the exhaust gas containing the oxygen $O_2$ and unburnt HC and CO is discharged from the combustion chamber 3, but this oxygen $O_2$ and the unburnt HC and CO almost never react, and thus this oxygen $O_2$ passes through the $NO_x$ absorber 18 and is discharged from the $NO_x$ absorber 18. On the other hand, when the air-fuel ratio of the air-fuel mixture fed into the combustion chamber 3 becomes the stoichiometric air-fuel ratio or rich, the $NO_x$ is released from the $NO_x$ absorber 18. At this time, the unburnt HC and CO contained in the exhaust gas are used for reducing the released $NO_x$, and therefore during a time when the $NO_x$ is released from the $NO_x$ absorber 18, the unburnt HC and CO will never be discharged from the $NO_x$ absorber 18. Accordingly, during a time when the $NO_x$ is continuously released from the $NO_x$ absorber 18, the oxygen $O_2$ is contained in the exhaust gas discharged from the $NO_x$ absorber 18, but no unburnt HC and CO is contained, and accordingly during this term, the air-fuel ratio of the exhaust gas discharged from the $NO_x$ absorber 18 has become slightly lean.

Subsequently, when the releasing action of $NO_x$ from the $NO_x$ absorber 18 is completed, the unburnt HC and CO contained in the exhaust gas are discharged from the $NO_x$ absorber 18 as they are without being used for the reduction of $NO_x$ in the $NO_x$ absorber 18. Accordingly, at this time, where the air-fuel ratio of the air-fuel mixture fed into the combustion chamber 3 is the stoichiometric air-fuel ratio, the air-fuel ratio of the exhaust gas discharged from the $NO_x$ absorber 18 also becomes the stoichiometric air-fuel ratio, and at this time, where the air-fuel ratio of the air-fuel mixture fed into the combustion chamber 3 is rich, the air-fuel ratio of the exhaust gas discharged from the $NO_x$ absorber 18 also becomes rich. Namely, when the releasing action of $NO_x$ from the $NO_x$ absorber 18 is completed, the air-fuel ratio of the air-fuel mixture discharged from the $NO_x$ 18 changes from lean to the stoichiometric air-fuel ratio or rich, and at this time, if the air-fuel ratio of the air-fuel mixture fed into the combustion chamber 3 is made lean, the $NO_x$ and unburnt HC and CO will not be discharged into the atmosphere. Therefore, in the first embodiment according to the present invention, the change of the air-fuel ratio of the exhaust gas discharged from the $NO_x$ absorber 18 from lean to the stoichiometric air-fuel ratio or rich is detected by the air-fuel ratio sensor 22, and when the air-fuel ratio detected by the air-fuel ratio sensor 22 is changed from lean to the stoichiometric air-fuel ratio or rich, the air-fuel ratio of the air-fuel mixture fed into the combustion chamber 3 is returned to lean.

In this way, in the present invention, it is decided whether or not the releasing action of $NO_x$ from the $NO_x$ absorber 18 is completed based on the air-fuel ratio detected by the air-fuel ratio sensor 22. This will be explained in a little more detail.

The air-fuel ratio sensor 22 shown in FIG. 1 comprises a cup shaped cylindrical body made of zirconia arranged in the exhaust passage. An anode made of a thin platinum layer is formed on an inner surface of this cylindrical body, and a cathode made of a thin platinum layer is formed on an outer surface of this cylindrical body, respectively. The anode formed on the inner surface of this cylindrical body is exposed to the atmosphere, and the cathode formed on the outer surface of this cylindrical body is exposed to the exhaust gas. Then, when there are no longer any oxygen molecules on the cathode, the oxygen ions move in the zirconia from the anode toward the cathode, and as a result of this, an induced electric power is produced between the anode and the cathode. When the air-fuel ratio of the exhaust gas flowing on the periphery of the air-fuel ratio sensor 22 is lean, that is, when a large amount of oxygen is contained in the exhaust gas, a large amount of oxygen molecules exist on the cathode. Accordingly, at this time, no movement of oxygen ions in the zirconia occurs, and thus the output voltage of the air-fuel ratio sensor 22 becomes low.

Figure 7:
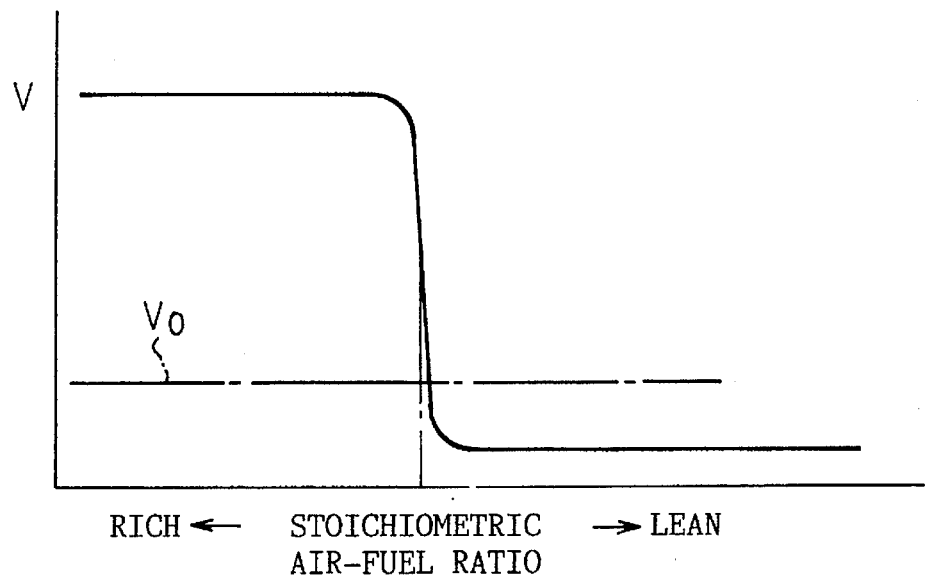
FIG. 7 is a view showing an output voltage of an air-fuel ratio sensor.

Contrary to this, when the air-fuel ratio of the exhaust gas flowing on the periphery of the air-fuel ratio sensor 22 becomes rich, even if oxygen exists on the cathode, this oxygen is used for oxidizing the unburnt HC and CO contained in the exhaust gas by the catalytic function of the thin platinum layer constituting the cathode and thus the oxygen no longer exists on the cathode. Accordingly, at this time, the oxygen ions move in the zirconia and thus the output voltage of the air-fuel ratio sensor 22 becomes high. Accordingly, as shown in FIG. 7, the output voltage of this air-fuel ratio sensor 22 becomes a low voltage of about 0.1 (V) when the air-fuel ratio of the exhaust gas is lean, while becomes a high voltage of about 0.9 (V) when the air-fuel ratio of the exhaust gas is rich.

When the air-fuel ratio of the exhaust gas flowing into the $NO_x$ absorber 18 is lean, a large amount of oxygen is contained in the exhaust gas discharged from the $NO_x$ absorber 18. Accordingly, at this time, the output voltage of the air-fuel ratio sensor 22 becomes a low voltage of about 0.1 (V). On the other hand, when the air-fuel ratio of the exhaust gas flowing into the $NO_x$ absorber 18 is made rich so as to release the $NO_x$ from the $NO_x$ absorber 18, no unburnt HC and CO at all are contained in the exhaust gas discharged from the $NO_x$ absorber 18 as mentioned before during a time when the $NO_x$ is released from the $NO_x$ absorber 18, and a slight amount of oxygen is contained. Accordingly, also at this time, the oxygen molecules exist on the cathode of the air-fuel ratio sensor 22, and thus the output voltage of the air-fuel ratio sensor 22 becomes a low voltage of about 0.1 (V).

Subsequently, when the releasing action of $NO_x$ from the $NO_x$ absorber 18 is completed, as mentioned before, the air-fuel ratio of the exhaust gas discharged from the $NO_x$ absorber 18 will contain a large amount of unburnt HC and CO. At this time, the oxygen molecules on the cathode of the air-fuel ratio sensor 22 are used for oxidizing these unburnt HC and CO, and as a result, the oxygen molecules no longer exist on the cathode, and therefore the output voltage of the air-fuel ratio sensor 22 rapidly rises to about 0.9 (V). Accordingly, when the rising of the output voltage V of the air-fuel ratio sensor 22 is detected, it can be detected when the releasing action of $NO_x$ is completed by the $NO_x$ absorber 18. In the embodiment according to the present invention, it is decided that the releasing action of $NO_x$ is completed by the $NO_x$ absorber 18 when the output voltage V of the air-fuel ratio sensor 22 exceeds the constant value $V_0$ shown in FIG. 7. This constant value $V_0$ is preferably as low as possible within a range where an erroneous decision is not carried out, and in an example shown in FIG. 7, the constant value $V_0$ is set to 0.3 (V).

Note that, even in a case where the air-fuel ratio of the exhaust gas flowing into the $NO_x$ absorber 18 is maintained at the stoichiometric air-fuel ratio when the $NO_x$ should be released, during a time when the releasing action of $NO_x$ from the $NO_x$ absorber 18 is carried out, the air-fuel ratio of the exhaust gas discharged from the $NO_x$ absorber 18 has become lean, and if the $NO_x$ absorber 18 completes the $NO_x$ releasing action, the unburnt HC and CO are discharged from the $NO_x$ absorber 18, and therefore the output voltage V of the air-fuel ratio sensor 22 rises. Accordingly, even in this case, from the fact that the output voltage V of the air-fuel ratio sensor 22 exceeds the constant value $V_0$, it can be decided that the $NO_x$ absorber 18 completed the releasing action of $NO_x$.

However, the amount of rise of the output voltage V of the air-fuel ratio sensor 22 in this case is smaller than that in a case where the air-fuel ratio of the exhaust gas is made rich, and accordingly in a case where the air-fuel ratio of the exhaust gas is made rich, the completion of the releasing action of $NO_x$ can be more reliably detected than a case where the air-fuel ratio of the exhaust gas is made the stoichiometric air-fuel ratio. On the other hand, where an air-fuel ratio sensor other than the air-fuel ratio sensor 22 is provided inside the exhaust passage upstream of the $NO_x$ absorber 18 and the air-fuel ratio of the air-fuel mixture fed into the combustion chamber 3 is controlled by feedback operation to be made the stoichiometric air-fuel ratio based on this other air-fuel ratio sensor when the $NO_x$ should be released, the air-fuel ratio of the exhaust gas flowing into the $NO_x$ absorber 18 fluctuates alternately to rich and lean in a relatively short period. Accordingly, in this case, when the releasing action of $NO_x$ is completed, the air-fuel ratio of the exhaust gas discharged from the $NO_x$ absorber 18 becomes rich, and therefore it becomes easy to detect the completion of the releasing action of $NO_x$.

Figure 8:
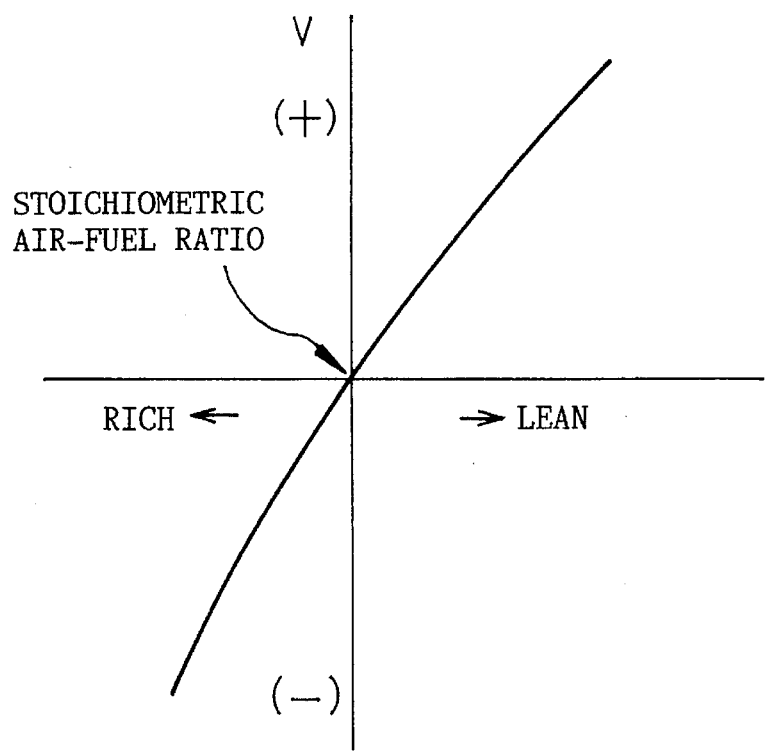
FIG. 8 is a view showing the output voltage V of another air-fuel ratio sensor.

Also, it is also possible to use an air-fuel ratio sensor, shown in FIG. 8, generating the output voltage V in accordance with the air-fuel ratio as the air-fuel ratio sensor 22. Also in this air-fuel ratio sensor, an anode and cathode each made of a thin platinum layer are formed on an inner surface and an outer surface of a cap-like cylindrical body made of zirconia, but in this air-fuel ratio sensor, the cathode is covered by a porous layer, and a constant voltage is applied between the cathode and anode. In this air-fuel ratio sensor, a current in accordance with the air-fuel ratio flows between the anode and cathode, and this current is converted to a voltage to generate an output voltage as shown in FIG. 8. Also, in a case where this air-fuel ratio sensor is used, it can be detected when the releasing action of $NO_x$ is completed by a fact that the output voltage V of the air-fuel ratio sensor becomes zero or negative. However, in this air-fuel ratio sensor, the amount of change of the output value V when the air-fuel ratio changes from lean to the stoichiometric air-fuel ratio or slightly rich is smaller than that of the case shown in FIG. 7, and accordingly in a case using the air-fuel ratio sensor having characteristics shown in FIG. 7, the completion of the releasing action of $NO_x$ can be more easily detected.

Next, an explanation will be made of the control of air-fuel ratio of air-fuel mixture fed into the combustion chamber 3 and the control of the releasing of $NO_x$ referring to FIG. 9 to FIG. 11. Note that, in FIG. 9 to FIG. 11, a target value K indicates a correction coefficient value for bringing the air-fuel ratio of the air-fuel mixture fed into the combustion chamber 3 to the target air-fuel ratio determined according to the operation state of the engine, the control air-fuel ratio indicates the air-fuel ratio of the inflowing exhaust gas to the $NO_x$ absorber 18, and the detection air-fuel ratio indicates the air-fuel ratio detected by the air-fuel ratio sensor 22.

The solid line of FIG. 9 indicates a case where the air-fuel ratio of air-fuel mixture is temporarily made rich so as to release the $NO_x$ during the time the lean air-fuel mixture is burned. In this case, the target value K is maintained at a value smaller than 1.0, that is, the air-fuel ratio of the air-fuel mixture fed into the combustion chamber 3 is maintained lean, and when the $NO_x$ should be released, the control air-fuel ratio, that is, in this case, the air-fuel ratio of the air-fuel mixture fed into the combustion chamber 3, is switched to rich. When the control air-fuel ratio is made rich, during a period when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. When the detection air-fuel ratio becomes rich, the control air-fuel ratio is immediately returned to lean.

Figure 10A:
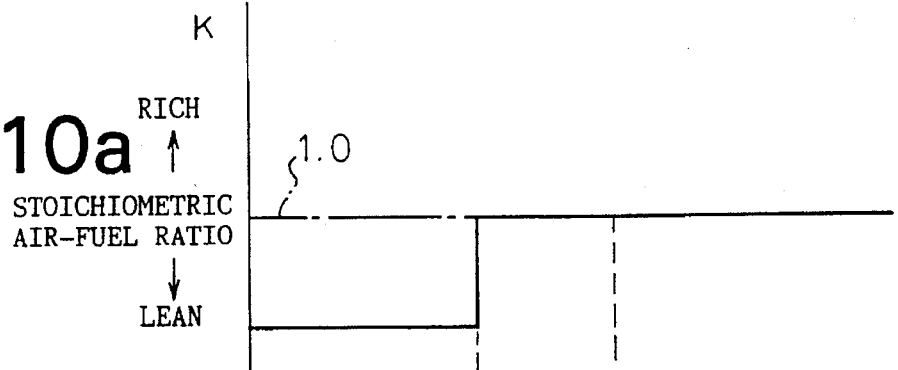
FIG. 10 is a view showing the change of the air-fuel ratio.
Figure 10B:
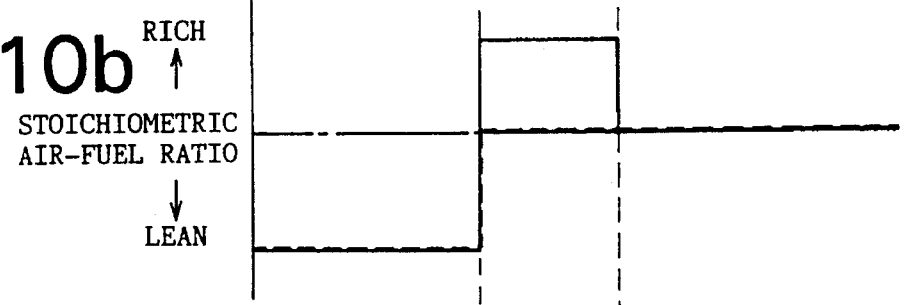
Figure 10C:
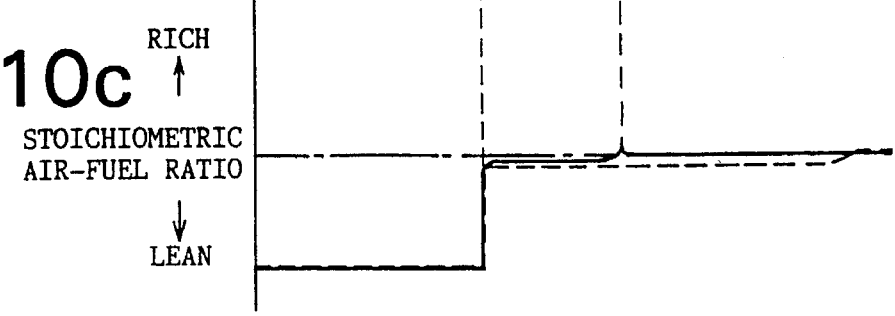

FIG. 10 shows a case where the target value K is changed from a value smaller than 1.0 to 1.0, that is, where the operation state of the engine is changed from an operation state where a lean air-fuel mixture should be burned to an operation state where an air-fuel mixture having the stoichiometric air-fuel ratio should be burned. In this case, as indicated by a solid line in FIG. 10, when the target value K changes from a value smaller than 1.0 to 1.0, the control air-fuel ratio, that is, in this case, the air-fuel ratio of the air-fuel mixture fed into the combustion chamber 3 is switched to rich. When the control air-fuel ratio is made rich, during a period when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. When the detection air-fuel ratio becomes rich, the control air-fuel ratio is immediately switched from rich to the stoichiometric air-fuel ratio.

FIG. 11 shows a case where the target value K is changed from a value smaller than 1.0 to 1.0, that is, where the operation state of the engine is changed from an operation state where a lean air-fuel mixture should be burned to an operation state where a rich air-fuel mixture should be burned. In this case, as indicated by a solid line in FIG. 11, when the target value K changes from a value smaller than 1.0 to a value larger than 1.0, the control air-fuel ratio, that is, in this case, also the air-fuel ratio of the air-fuel mixture fed into the combustion chamber 3, is switched to rich. When the control air-fuel ratio is made rich, during a period when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. However, in this case, even when the detection air-fuel ratio becomes rich, the control air-fuel ratio, that is, the air-fuel ratio of the air-fuel mixture fed into the combustion chamber 3, is continuously maintained at rich.

Figure 12:
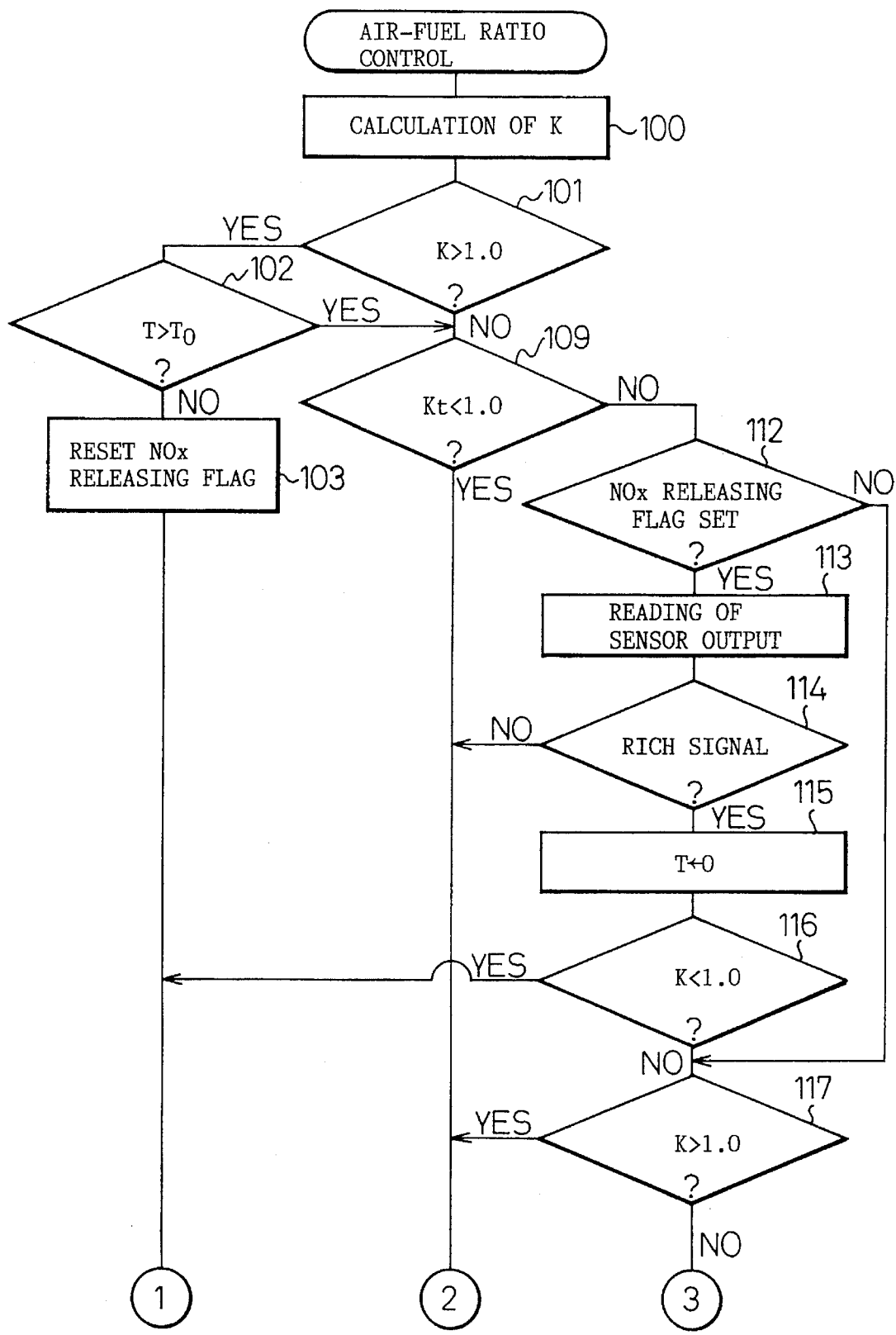
FIG. 12 and FIG. 13 are flow charts for the control of the air-fuel ratio.
Figure 13:
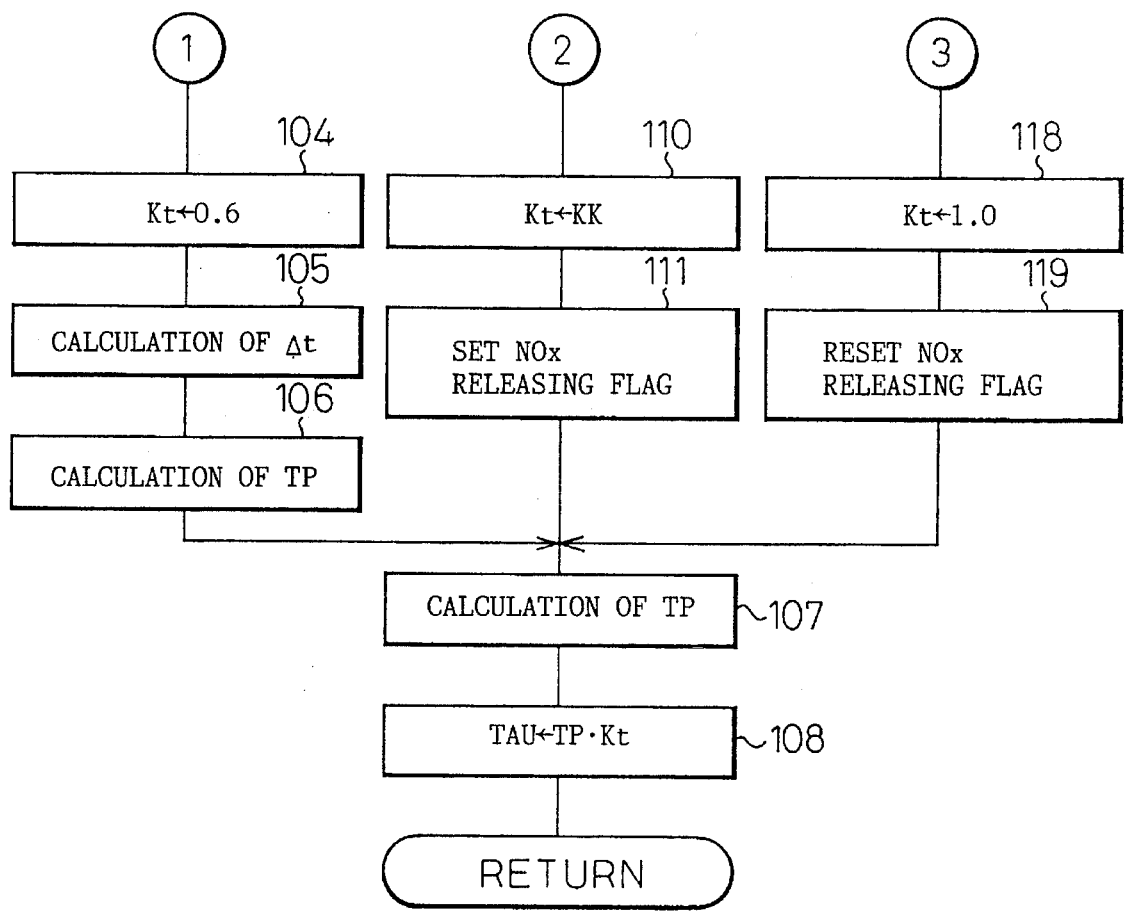

FIG. 12 and FIG. 13 show the control routine of the correction coefficient K and air-fuel ratio, indicated by the solid line in FIG. 9 to FIG. 11.

Referring to FIG. 12 and FIG. 13, first of all, at step 100, the correction coefficient K is calculated from the operation state of the engine. Subsequently, at step 101, it is determined whether or not the correction coefficient K is smaller than 1.0, that is, whether or not the operation state is a state where a lean air-fuel mixture should be burned. When K<1.0, that is, when the operation state is that a lean air-fuel mixture should be burned, the processing routine goes to step 102, at which it is determined whether or not the cumulative time T for which the combustion of lean air-fuel mixture is carried out exceeds the predetermined constant time $T_0$. When $T \leq T_0$, the processing routine goes to step 103, at which an $NO_x$ releasing flag indicating that the air-fuel ratio is made rich for the releasing of $NO_x$ is reset.

Subsequently, at step 104, the correction coefficient $K_t$ is made for example 0.6. Subsequently, at step 105, the elapsed time Δt from when the processing routine goes to step 105 in the preceding processing cycle is calculated, and then at step 106, Δt is added to the cumulative time T. Accordingly, as mentioned above, this cumulative time indicates a time for which the lean air-fuel mixture is burned. Subsequently, at step 107, a basic fuel injection time TP is calculated from a map shown in FIG. 2, and then at step 108, a fuel injection time TAU is calculated by multiplying the basic fuel injection time TP by the correction coefficient $K_t$. At this time, a lean air-fuel mixture is burned in the combustion chamber 3.

Subsequently, when the cumulative time T exceeds the constant time $T_0$, the processing routine goes from step 102 to step 109, at which it is decided whether or not the correction coefficient $K_t$ is smaller than 1.0 . At this time, $K_x<1.0$, and therefore the processing routine goes to step 110, at which the correction coefficient $K_t$ is made the predetermined value KK. This value KK is a value of from 1.1 to 1.2 with which the air-fuel ratio of the air-fuel mixture fed into the combustion chamber 3 becomes about 12.0 to 13.5. Subsequently, at step 111, the $NO_x$ releasing flag is set, and then the processing routine passes step 107, and at step 108, the fuel injection time TAU (=TP·$K_t$) is calculated. Accordingly, at this time, the air-fuel ratio of the air-fuel mixture fed into the combustion chamber 3 becomes rich. Namely, when the cumulative time T exceeds the constant time $T_0$, as indicated by the solid line in FIG. 9, the control air-fuel ratio is switched from lean to rich.

In the next processing cycle, it is decided that K 1.0 at step 101, it is decided the T>$T_0$ at step 102, and it is decided that $K_t$>1.0 at step 109, and therefore the processing routine goes to step 112, at which it is decided whether or not the $NO_x$ releasing flag has been set. At this time, the $NO_x$ releasing flag has been set, and therefore the processing routine goes to step 113. At step 113, the output signal of the air-fuel ratio sensor 22 is read in, and subsequently at step 114, for example it is determined whether or not the output voltage V of the air-fuel ratio sensor 22 exceeds the constant value $V_0$ shown in FIG. 7, that is, whether or not the air-fuel ratio sensor 22 generates a rich signal indicating that the air-fuel ratio is rich. For a while after the air-fuel ratio of the air-fuel mixture fed into the combustion chamber 3 is switched from lean to rich, the $NO_x$ is continuously released from the $NO_x$ absorber 18, and therefore the detection air-fuel ratio detected by the air-fuel ratio sensor 22 has become slightly lean as indicated by the solid line in FIG. 9. Accordingly, during this time, the processing routine jumps from step 114 to step 110, and thus the rich air-fuel mixture is continuously fed into the combustion chamber 3.

Subsequently, when the air-fuel ratio sensor 22 generates a rich signal, the processing routine goes from step 114 to step 115, at which the cumulative time T is made zero. Subsequently, at step 116, it is determined whether or not the correction coefficient K is smaller than 1.0 . At this time, K<1.0, and therefore the processing routine goes to step 104, at which the air-fuel ratio of the air-fuel mixture fed into the combustion chamber 3 is switched from rich to lean. In the next processing cycle, it is decided that $T \leq T_0$ at step 102, and therefore the processing routine passes step 103 and goes to step 104, and thus the air-fuel ratio of the air-fuel mixture fed into the combustion chamber 3 is maintained at lean.

On the other hand, when the target value K changes from a state where K<1.0 to K=1.0, that is, when the operation state of the engine becomes from the operation state where a lean air-fuel mixture should be burned to an idling operation, high load operation or acceleration operation state, the processing routine goes from step 101 to step 109. At this time, $K_t$ is still smaller than 1.0, and therefore the processing routine goes via steps 110, 111 and 107 to step 108, and thus the air-fuel ratio of the air-fuel mixture fed into the combustion chamber 3 is switched from lean to rich. Namely, when the operation state of the engine changes from the operation state where the lean air-fuel mixture should be burned to an idling operation, high load operation or acceleration operation state, as indicated by the solid line in FIG. 10, the control air-fuel ratio is switched from lean to rich.

In the next processing cycle, the processing routine passes step 109 to steps 112 and 113 and goes to step 114, at which it is determined whether or not the air-fuel ratio sensor 22 generates a rich signal. Until the air-fuel ratio sensor 22 generates a rich signal, the processing routine jumps to step 110, and thus, as indicated by the solid line in FIG. 10, the control air-fuel ratio is maintained at rich. Subsequently, when the air-fuel ratio sensor 22 generates a rich signal, the processing routine passes step 115 and goes to step 116. At this time, K=1.0, and therefore the processing routine goes to step 117, at which it is determined whether or not the correction coefficient K is larger than 1.0 . At step 117, it is decided that $K \leq 1.0$, and therefore the processing routine goes to step 118, at which the correction coefficient $K_t$ is made 1.0. Subsequently, at step 119, the $NO_x$ releasing flag is reset, and then the processing routine passes step 107 and goes to step 108. Accordingly, when the air-fuel ratio sensor 22 generates a rich signal, as indicated by the solid line in FIG. 10, the control air-fuel ratio becomes the stoichiometric air-fuel ratio. In the next processing cycle, the processing routine jumps from step 112 to step 117, and thus the control air-fuel ratio is maintained at the stoichiometric air-fuel ratio.

On the other hand, when the target value K changes from a state where K<1.0 to a state where K>1.0, that is, when the engine operation state is shifted from the operation state where a lean air-fuel mixture should be burned to a full load operation state, the processing routine goes from step 101 to step 109. At this time, $K_t$ is still smaller than 1.0, and therefore the processing routine goes to step 108 via steps 110, 111 and 107, and thus the air-fuel ratio of the air-fuel mixture fed into the combustion chamber 3 is switched from lean to rich. Namely, when the operation state of the engine is shifted from the operation state where a lean air-fuel mixture should be burned to the full load operation state, as shown in FIG. 11, the control air-fuel ratio is switched from lean to rich.

In the next processing cycle, the processing routine goes from step 109 to step 114 while passing steps 112 and 113, and it is determined whether or not the air-fuel ratio sensor 22 generates the rich signal. Until the air-fuel ratio sensor 22 generates a rich signal, the processing routine jumps to step 110, and thus, as shown in FIG. 11, the control air-fuel ratio is maintained rich. Subsequently, when the air-fuel ratio sensor 22 generates a rich signal, the processing routine passes step 115 and goes to step 116. At this time, K>1.0, and therefore the processing routine goes to step 117, and then the processing routine goes from step 117 to step 110. Thus, in this case, even after the air-fuel ratio sensor 22 generates a rich signal, the rich air-fuel mixture is continuously fed into the combustion chamber 3.

Figure 14:
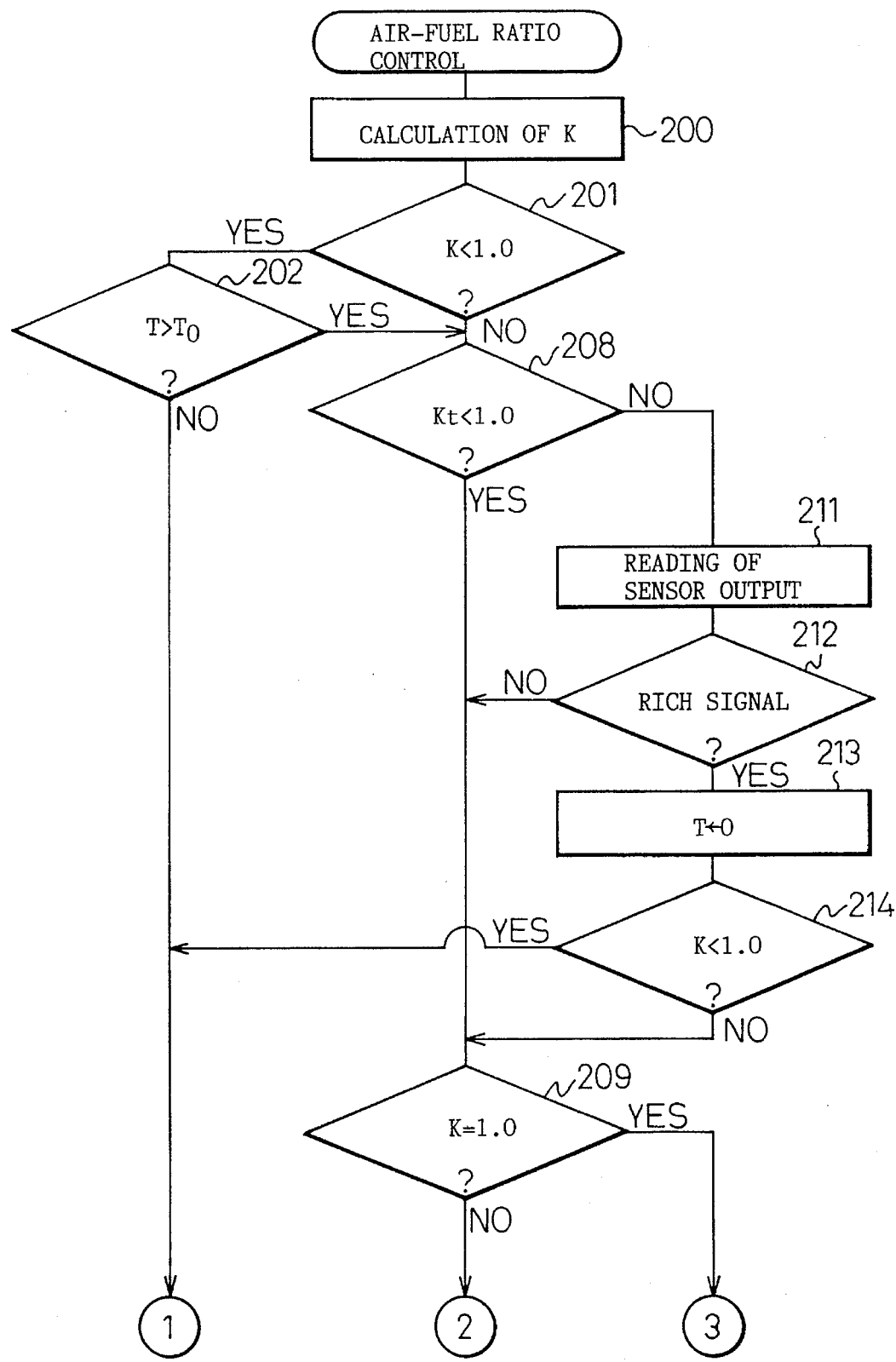
FIG. 14 and FIG. 15 are flow charts of another embodiment for the control of the air-fuel ratio.
Figure 15:
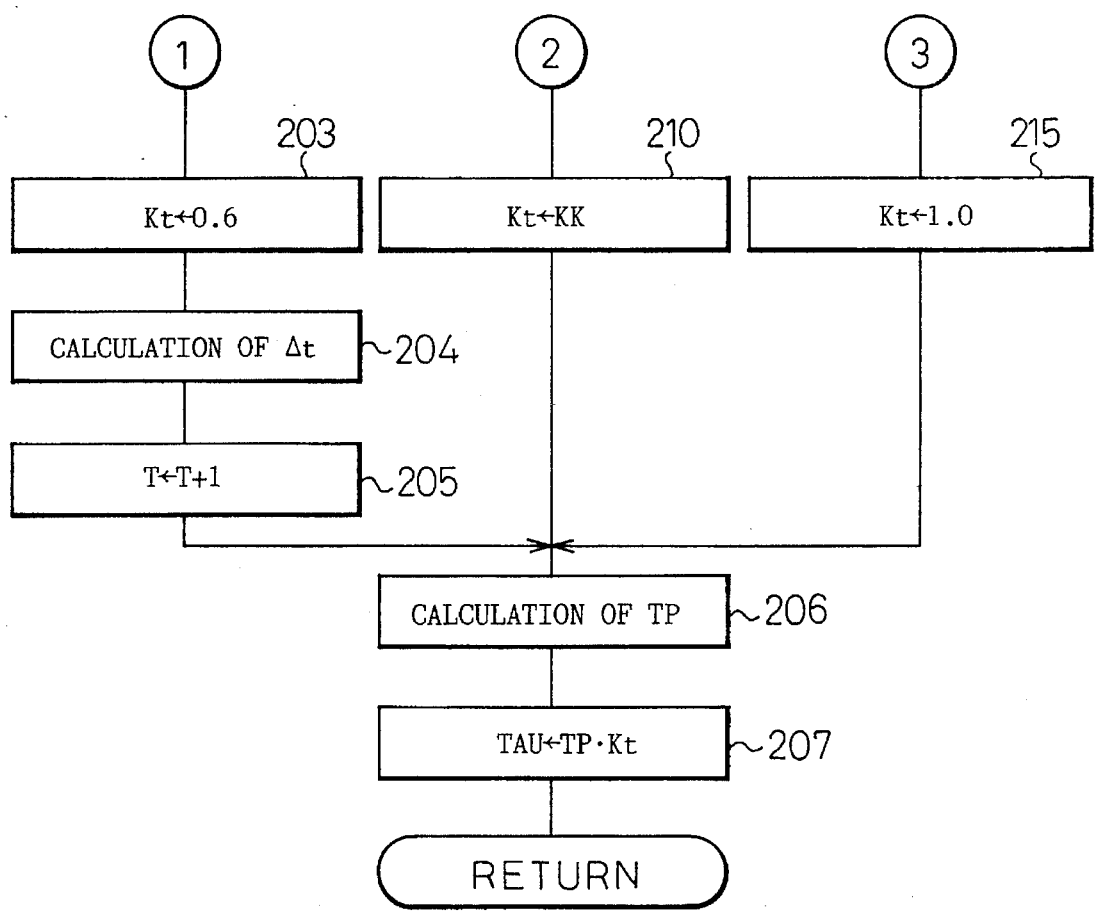

FIG. 14 and FIG. 15 show another embodiment of the air-fuel ratio control routine. In this embodiment, when the target value K changes from a state of K<1.0 to a state where K=1.0, the control air-fuel ratio is not temporarily made rich, but as indicated by a broken line in FIG. 10, the control air-fuel ratio is made the stoichiometric air-fuel ratio.

Referring to FIG. 14 and FIG. 15, first of all, at step 200, the correction coefficient K is calculated from the operation state of the engine. Subsequently, at step 201, it is determined whether or not the correction coefficient K is smaller than 1.0, that is, whether it is an operation state where a lean air-fuel mixture should be burned. When K<1.0, that is, when it is an operation state where a lean air-fuel mixture should be burned, the processing routine goes to step 202, at which it is determined whether or not the cumulative time T for which the combustion of the lean air-fuel mixture is carried out exceeds the predetermined constant time $T_0$. When $T \leq T_0$, the processing routine goes to step 203.

At step 203, the correction coefficient $K_t$ is made for example 0.6. Subsequently, at step 204, the elapsed time Δt from when the processing routine goes to step 204 in the previous processing cycle is calculated, and then at step 205, Δt is added to the cumulative time T. Accordingly, as mentioned above, this cumulative time indicates a time for which the lean air-fuel mixture is burned. Subsequently, at step 206, the basic fuel injection time TP is calculated from the map shown in FIG. 2, and then at step 207, the fuel injection time TAU is calculated by multiplying the basic fuel injection time TP by the correction coefficient $K_t$. At this time, a lean air-fuel mixture is burned in the combustion chamber 3.

Subsequently, when the cumulative time T exceeds the constant time $T_0$, the processing routine goes from step 202 to step 208, at which it is determined whether or not the correction coefficient $K_t$ is smaller than 1.0. At this time, $K_t$<1.0, and therefore the processing routine goes to step 209, at which it is determined whether or not the correction coefficient K is 1.0. At this time, K<1.0, and therefore the processing routine goes to step 210, at which the correction coefficient $K_t$ is made the predetermined value KK. This value KK is a value of about 1.1 to 1.2 with which the air-fuel ratio of the air-fuel mixture fed into the combustion chamber 3 becomes about 12.0 to 13.5. Subsequently, the processing routine passes step 206, and at step 207, the fuel injection time TAU (=TP·$K_t$) is calculated. Accordingly, at this time, the air-fuel ratio of the air-fuel mixture fed into the combustion chamber 3 becomes rich. Namely, when the cumulative time T exceeds the constant time $T_0$, as indicated by the solid line in FIG. 9, the control air-fuel ratio is switched from lean to rich.

In the next processing cycle, at step 201, it is decided that K<1.0, while it is decided at step 202 that T>$T_0$, and it is decided at step 208 that $K_t$>1.0, and therefore the processing routine goes to step 211. At step 211, the output signal of the air-fuel ratio sensor 22 is read in, and then at step 212, it is determined whether or not for example the output value V of the air-fuel ratio sensor 22 exceeds the constant value $V_0$ shown in FIG. 7, that is, whether or not the air-fuel ratio sensor 22 generates a rich signal indicating that the air-fuel ratio is rich. For a while after the air-fuel ratio of the air-fuel mixture fed into the combustion chamber 3 is switched from lean to rich, the $NO_x$ is continuously released from the $NO_x$ absorber 18, and therefore the detection air-fuel ratio detected by the air-fuel ratio sensor 22 has become slightly lean as indicated by the solid line in FIG. 9. Accordingly, during this time, the processing routine jumps from step 212 to step 209, and at this time, K<1.0, and therefore the processing routine goes to step 210. Accordingly, during this time, the rich air-fuel mixture is continuously fed into the combustion chamber 3.

Subsequently, when the air-fuel ratio sensor 22 generates a rich signal, the processing routine goes from step 212 to step 213, at which the cumulative time T is made zero. Subsequently, at step 214, it is determined whether or not the correction coefficient K is smaller than 1.0. At this time, K<1.0, and therefore the processing routine goes to step 203, at which the air-fuel ratio of the air-fuel mixture fed into the combustion chamber 3 is switched from rich to lean. In the next processing cycle, it is decided that T≦$T_0$ at step 202, and therefore the processing routine goes to step 203, and thus the air-fuel ratio of the air-fuel mixture fed into the combustion chamber 3 is maintained at lean.

On the other hand, when the target value K changes from a state where K<1.0 to K=1.0, that is, when the operation state of the engine is shifted from the operation state where a lean air-fuel mixture should be burned to an idling operation, high load operation or acceleration operation state, the processing routine goes from step 201 to step 208. At this time, $K_t$ is still smaller than 1.0, and therefore the processing routine goes to step 209. At step 209, it is decided that K=1.0, and therefore the processing routine goes to step 215, at which the correction coefficient $K_t$ is made 1.0. Subsequently, the processing routine passes step 206 and goes to step 207, and thus the air-fuel ratio of the air-fuel mixture fed into the combustion chamber 3 is switched from lean to the stoichiometric air-fuel ratio. Namely, when the operation state of the engine is shifted from the operation state where the lean air-fuel mixture should be burned to an idling operation, high load operation or acceleration operation state, as indicated by the broken line in FIG. 10, the control air-fuel ratio is switched from lean to the stoichiometric air-fuel ratio.

In the next processing cycle, the processing routine passes step 208 to step 211 and goes to step 212, at which it is determined whether or not the air-fuel ratio sensor 22 generates a rich signal. Until the air-fuel ratio sensor 22 generates a rich signal, the processing routine passes step 209 and goes to step 215, and thus, as indicated by the broken line in FIG. 10, the control air-fuel ratio is maintained at the stoichiometric air-fuel ratio. Subsequently, when the air-fuel ratio sensor 22 generates a rich signal, the processing routine passes step 213 and goes to step 214. At this time, K= 1.0, and therefore the processing routine goes to step 209, and then goes to step 215. Accordingly, even after the air-fuel ratio sensor 22 generates a rich signal, the control air-fuel ratio will be maintained at the stoichiometric air-fuel ratio.

On the other hand, when the target value K changes from a state where K<1.0 to a state where K>1.0, that is, when the engine operation state is shifted from the operation state where a lean air-fuel mixture should be burned to a full load operation state, the processing routine goes from step 201 to step 208. At this time, $K_t$ is still smaller than 1.0, and therefore the processing routine goes to step 209. At step 209, it is decided that K>1.0, and therefore the processing routine goes to step 210, and thus the air-fuel ratio of the air-fuel mixture fed into the combustion chamber 3 is switched from lean to rich. Namely, when the operation state of the engine is shifted from the operation state where the lean air-fuel mixture should be burned to the full load operation state, as shown in FIG. 11, the control air-fuel ratio is switched from lean to rich.

In the next processing cycle, the processing routine goes from step 208 to step 212 while passing step 211, and it is determined whether or not the air-fuel ratio sensor 22 generates a rich signal. Until the air-fuel ratio sensor 22 generates a rich signal, the processing routine passes step 209 and goes to step 210, and thus, as shown in FIG. 11, the control air-fuel ratio is maintained at rich. Subsequently, when the air-fuel ratio sensor 22 generates a rich signal, the processing routine passes step 213 and goes to step 214. At this time, K> 1.0, and therefore the processing routine goes to step 209, and then goes to step 210. Thus, even after the air-fuel ratio sensor 22 generates a rich signal, the rich air-fuel mixture is continuously fed into the combustion chamber 3.

Figure 16:
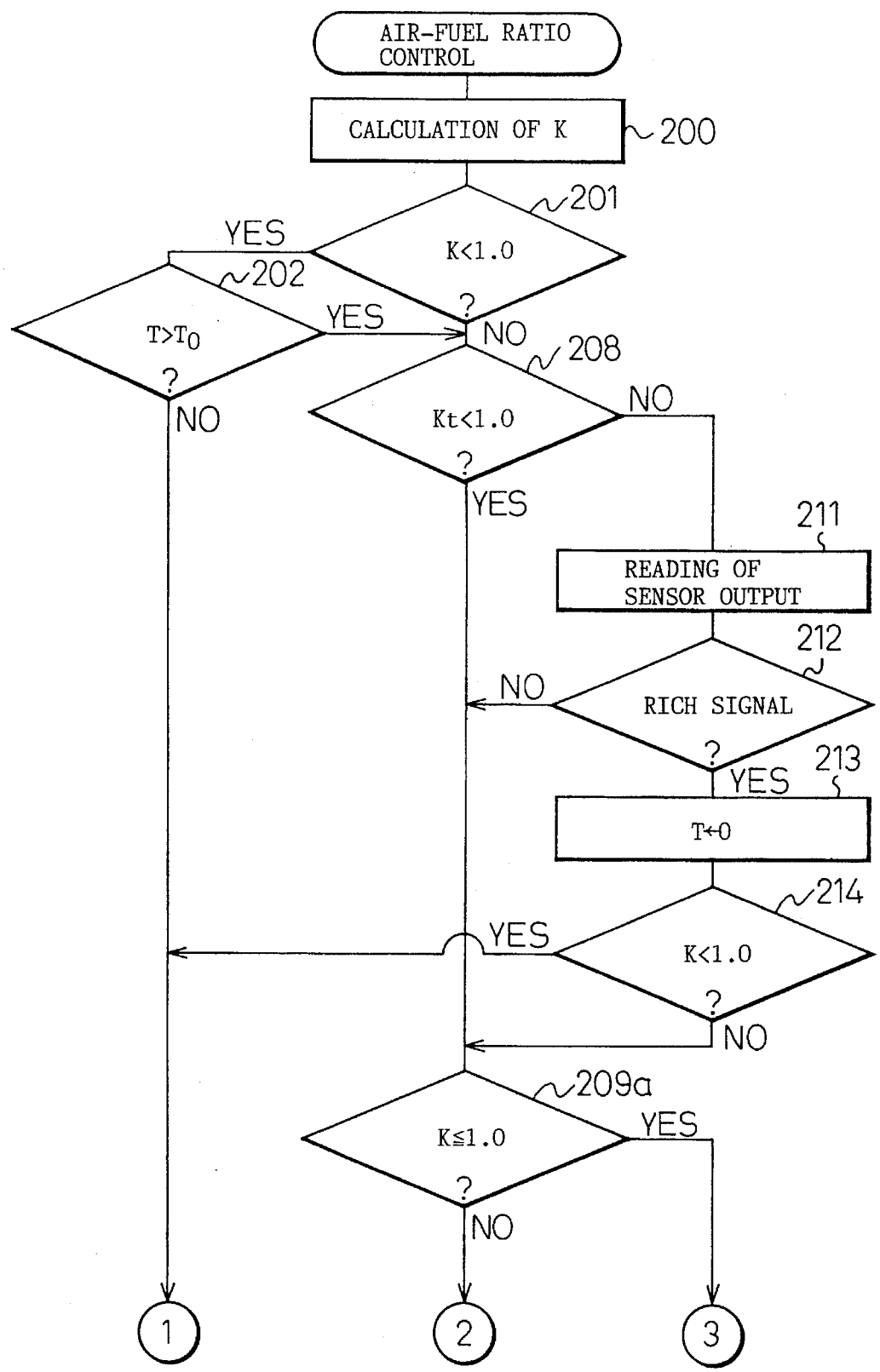
FIG. 16 and FIG. 17 are flow charts of still another embodiment for performing the air-fuel ratio control.
Figure 17:
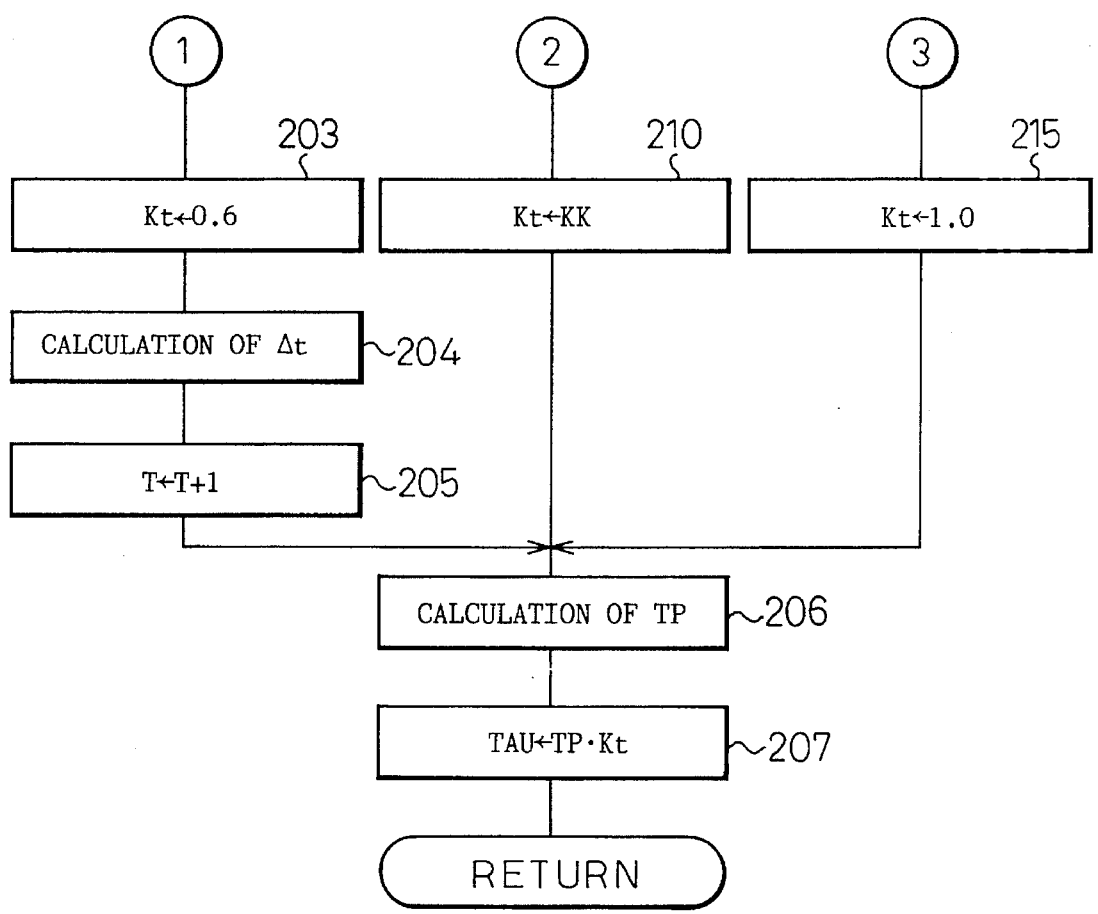

FIG. 16 and FIG. 17 show still another embodiment of the air-fuel ratio control routine. In this embodiment, in the same way as the embodiment shown in FIG. 14 and FIG. 15, when the target value K changes from a state of K<1.0 to a state where K=1.0, as indicated by the broken line in FIG. 10, the control air-fuel ratio is made the stoichiometric air-fuel ratio. Further, in this embodiment, when the cumulative time T exceeds the constant time $T_0$ when the lean air-fuel mixture is burned, the control air-fuel ratio is not temporarily made rich, but as indicated by the broken line in FIG. 9, the control air-fuel ratio is made the stoichiometric air-fuel ratio.

As seen from a comparison between the flow charts shown in FIG. 14 and FIG. 15 and the flow charts shown in FIG. 16 and FIG. 17, the difference in these flow charts resides only in step 209 of FIG. 14 and step 209a of FIG. 16. The remaining steps are all the same. Namely, at step 209 of FIG. 14, it is determined whether or not K= 1.0, and in contrast, at step 209a of FIG. 16, it is determined whether or not $K \leq 1.0$, and in the routines shown in FIG. 16 and FIG. 17, when it is determined that $K \leq 1.0$ at step 209a, the processing routine goes to step 215, and when it is determined as K>1.0. The processing routine goes to step 110.

Namely, in the routines shown in FIG. 16 and FIG. 17, when the lean air-fuel mixture is burned and it is determined at step 202 hat T>$T_0$, the processing routine passes step 208 and goes to step 209a. At this time, since K<1.0, the processing routine goes to step 215, and thus the control air-fuel ratio is switched from lean to the stoichiometric air-fuel ratio. Subsequently, when the air-fuel ratio sensor 22 generates a rich signal, the processing routine goes from step 214 to step 203, and the control air-fuel ratio is returned to lean again. On the other hand, when the state is changed from K<1.0 to K=1.0, the processing routine goes from step 209a to step 215, and therefore during a period when K=1.0, the control air-fuel ratio is maintained at the stoichiometric air-fuel ratio, and when the state is changed from K<1.0 to K>1.0, the processing routine goes from step 209a to step 210, and therefore during a period when K>1.0, the control air-fuel ratio is maintained at rich. Note that, in a period when the control air-fuel ratio is maintained at the stoichiometric air-fuel ratio or rich in this way, if the air-fuel ratio sensor 22 generates a rich signal, the cumulative time is made zero at step 213.

Figure 18:
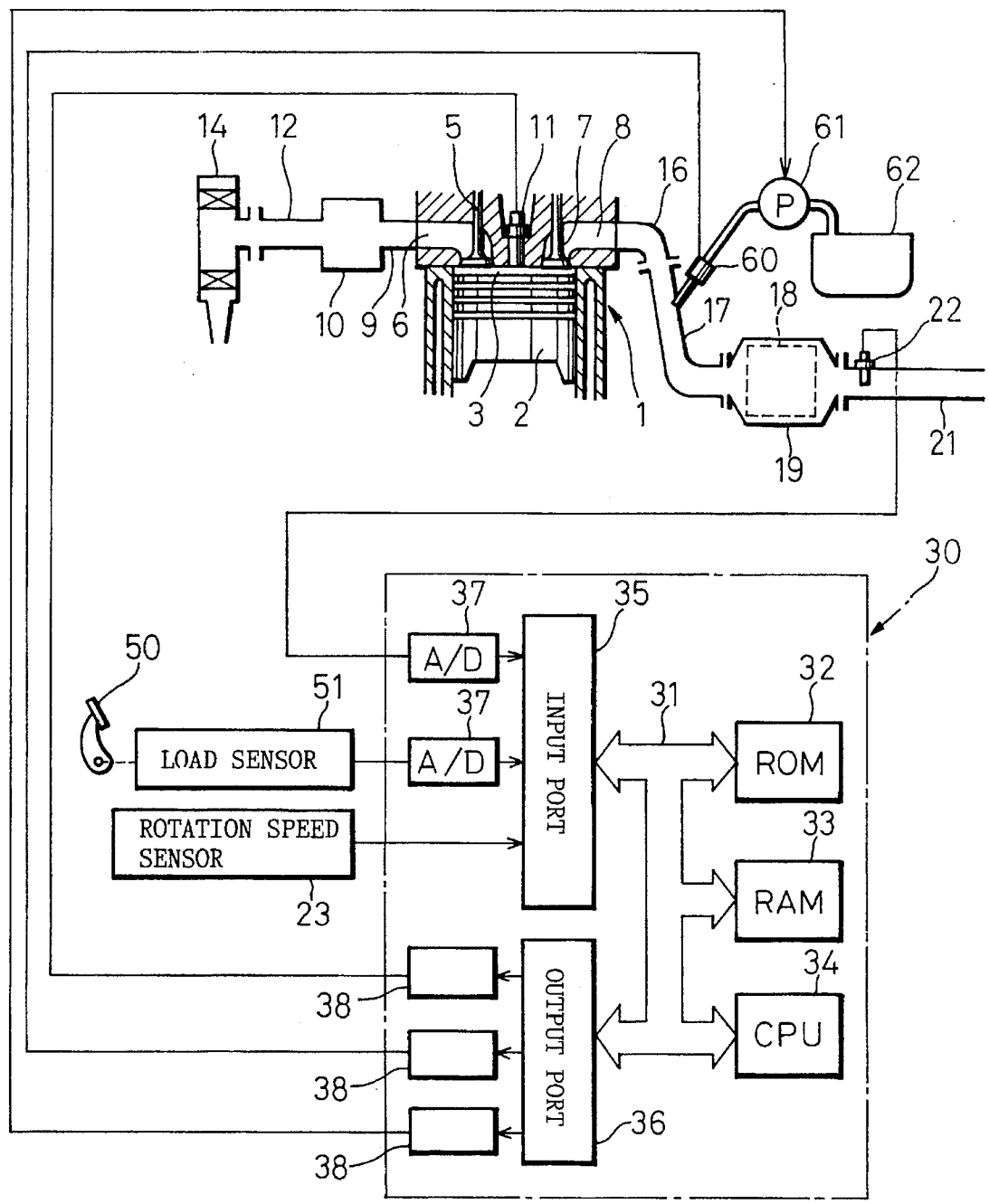
FIG. 18 is an overall view of a diesel engine.

FIG. 18 shows a case where the present invention is applied to the diesel engine. Note that, in FIG. 18, constituent elements the same as those shown in FIG. 1 are indicated by the same references.

In the diesel engine, usually in all operation states, combustion is performed in a state where an air excess rate is 1.0 or more, that is, the average air-fuel ratio of the air-fuel mixture in the combustion chamber 3 is lean. Accordingly, the $NO_x$ discharged at this time is absorbed into the $NO_x$ absorber 18. On the other hand, when the $NO_x$ should be released from the $NO_x$ absorber 18, the air-fuel ratio of the exhaust gas flowing into the $NO_x$ absorber 18 is made rich. In this case, in the embodiment shown in FIG. 18, the average air-fuel ratio of the air-fuel mixture in the combustion chamber 3 is made lean and the hydrocarbon is fed into the engine exhaust passage upstream of the $NO_x$ absorber 18, whereby the air-fuel ratio of the exhaust gas flowing into the $NO_x$ absorber 18 is made rich.

Referring to FIG. 18, in this embodiment, a load sensor 51 generating an output voltage proportional to the depression of an accelerator pedal 50 is provided, and the output voltage of this load sensor 51 is input via a corresponding AD converter 37 to the input port 35. Also, in this embodiment, a reduction agent feeding valve 60 is arranged in an exhaust pipe 17, which reduction agent feeding valve 60 is connected via a feeding pump 61 to a reduction agent tank 62. The output ports 36 of the electronic control unit 30 are respectively connected via corresponding drive circuits 38 to the reduction agent feeding valve 60 and the feeding pump 61. In the reduction agent tank 62, a hydrocarbon such as gasoline, isooctane, hexane, heptane, light oil or lamp oil or a hydrocarbon which can be stored in the liquid state, for example, butane or propane, is filled.

In this embodiment, the air-fuel mixture in the combustion chamber 3 is usually burned under an air excess, that is, in a state where the average air-fuel ratio is lean, and at this time, $NO_x$ discharged from the engine is absorbed into the $NO_x$ absorber 18. When the $NO_x$ should be released from the $NO_x$ absorber 18, the feeding pump 61 is driven and, at the same time, the reduction agent feeding valve 60 is opened, whereby the hydrocarbon filled in the reduction agent tank 62 is fed from the reduction agent feeding valve 60 into the exhaust pipe 17. The amount of feeding of the hydrocarbon at this time is determined so that the air-fuel ratio of the exhaust gas flowing into the $NO_x$ absorber 18 becomes rich, and accordingly, at this time, the $NO_x$ will be released from the $NO_x$ absorber 18.

Figure 19:
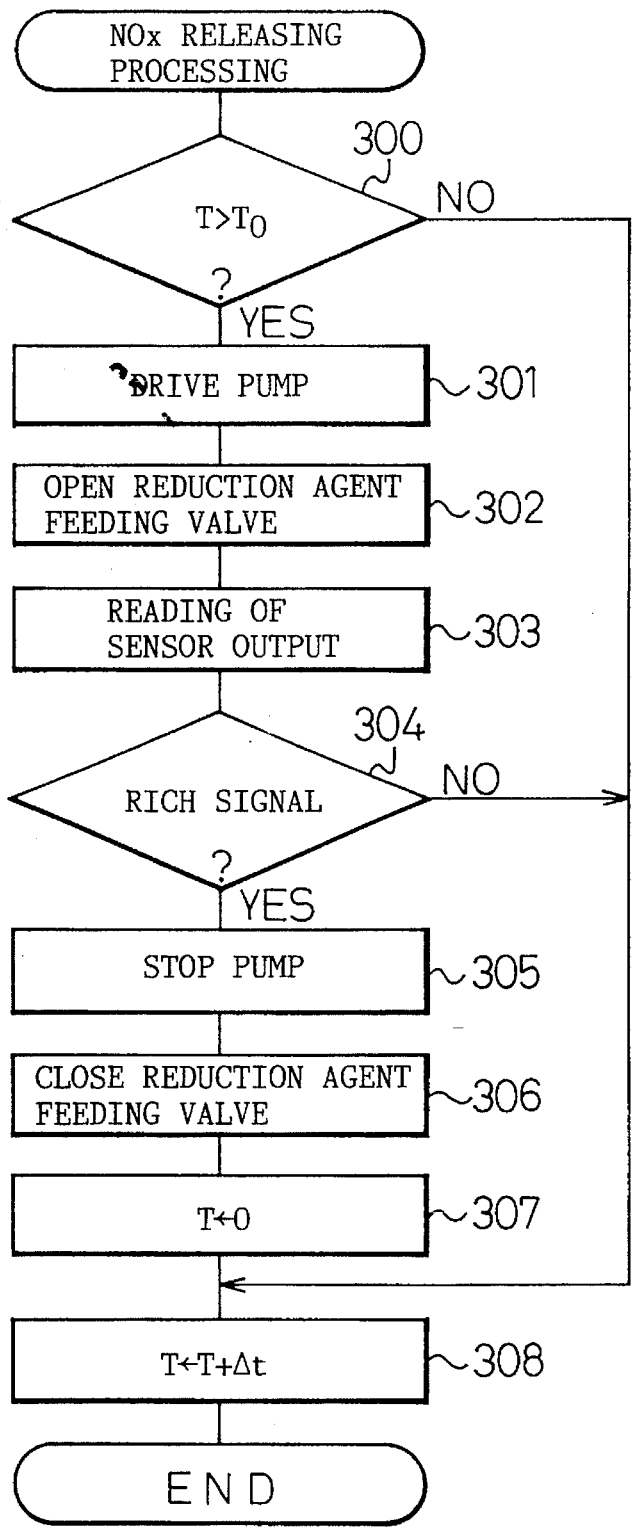
FIG. 19 is a flow chart for performing the $NO_x$ releasing processing.

FIG. 19 shows a routine for executing this $NO_x$ releasing processing, which routine is executed by interruption at predetermined time intervals.

Referring to FIG. 19, first of all, at step 300, it is determined whether or not the cumulative time T for which the operation of the engine is carried out exceeds the predetermined constant time $T_0$. When $T \leq T_0$, the processing routine goes to step 308, at which an interruption time interval $\Delta t$ is added to the cumulative time T, and then the processing cycle is completed. Contrary to this, when T becomes larger than $T_0$, the feeding pump 61 is driven at step 301, and then at step 302, the reduction agent feeding valve 60 is opened and the reduction agent is fed into the exhaust pipe 17. Subsequently, at step 303, the output signal of the air-fuel ratio sensor 22 is read in, and then at step 304, it is determined whether or not for example the output voltage V of the air-fuel ratio sensor 22 exceeds the constant value $V_0$ shown in FIG. 7, that is, whether or not the air-fuel ratio sensor 22 generates a rich signal indicating that the air-fuel ratio is rich. For a while after the feeding of the reduction agent is started, the $NO_x$ is continuously released from the $NO_x$ absorber 18, and therefore the detection air-fuel ratio detected by the air-fuel ratio sensor 22 has become slightly lean, and accordingly during this period, after the processing routine jumps from step 304 to step 308, the processing cycle is completed.

Subsequently, when the air-fuel ratio sensor 22 generates a rich signal, the processing routine goes from step 304 to step 305, at which the driving of the feeding pump 61 is stopped. Subsequently, at step 306, the reduction agent feeding valve 60 is closed, and thus the feeding of the reduction agent is stopped. Subsequently, at step 307, the cumulative time T is made zero.

As mentioned heretofore, the $NO_x$ absorber 18 has a nature such that the detection air-fuel ratio is maintained slightly leaner than the stoichiometric air-fuel ratio after the control air-fuel ratio is switched from lean to the stoichiometric air-fuel ratio or rich, and in the embodiments mentioned heretofore, this nature is utilized to detect that the $NO_x$ releasing action from the $NO_x$ absorber 18 is completed. However, according to some types of the $NO_x$ absorber 18, there is a delay in the releasing starting action of $NO_x$ from the $NO_x$ absorber 18, and accordingly there sometimes occurs a case where $NO_x$ is not immediately released from the $NO_x$ absorber 18 even when the control air-fuel ratio is switched from lean to rich. In such an $NO_x$ absorber 18, when the control air-fuel ratio is switched from lean to rich, the detection air-fuel ratio instantaneously becomes rich as shown in FIG. 20, and thereafter when the $NO_x$ releasing action from the $NO_x$ absorber 18 is started, the detection air-fuel ratio is maintained at slightly leaner than the stoichiometric air-fuel ratio.

In this way, in such an $NO_x$ absorber 18, when the control air-fuel ratio is switched from lean to rich, the detection air-fuel ratio instantaneously becomes rich, and therefore if it is decided that the $NO_x$ releasing action from the $NO_x$ absorber 18 is completed since the detection air-fuel ratio becomes rich, an erroneous decision will be made. Therefore, so as to prevent such an erroneous decision, in an embodiment shown in FIG. 21 and FIG. 22, a decision of whether or not the detection air-fuel ratio has become rich is inhibited for a constant time $CC_0$ after switching of the control air-fuel ratio from lean to rich.

Figure 20:
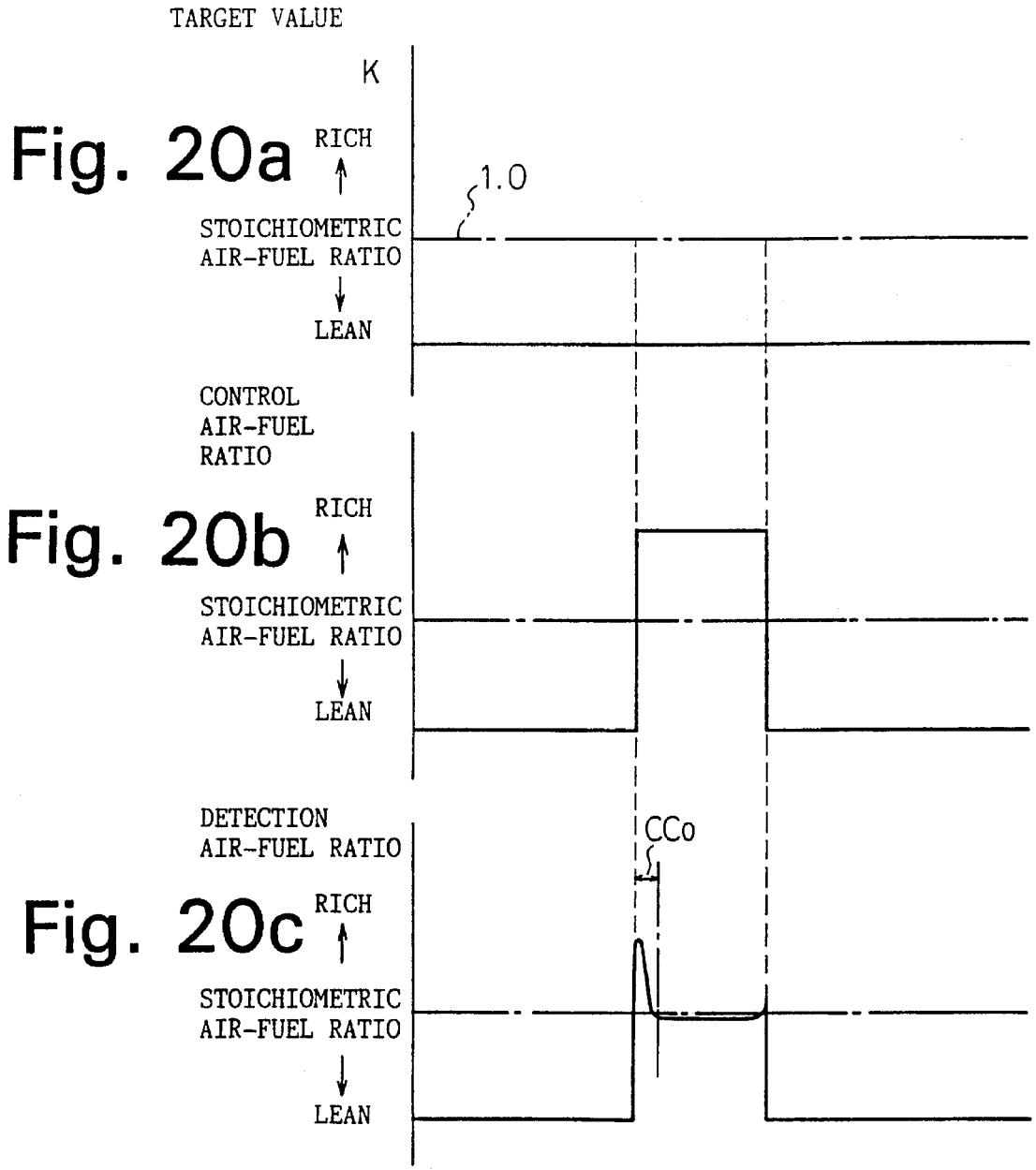
FIG. 20 is a view of the change of the air-fuel ratio.
Figure 21:
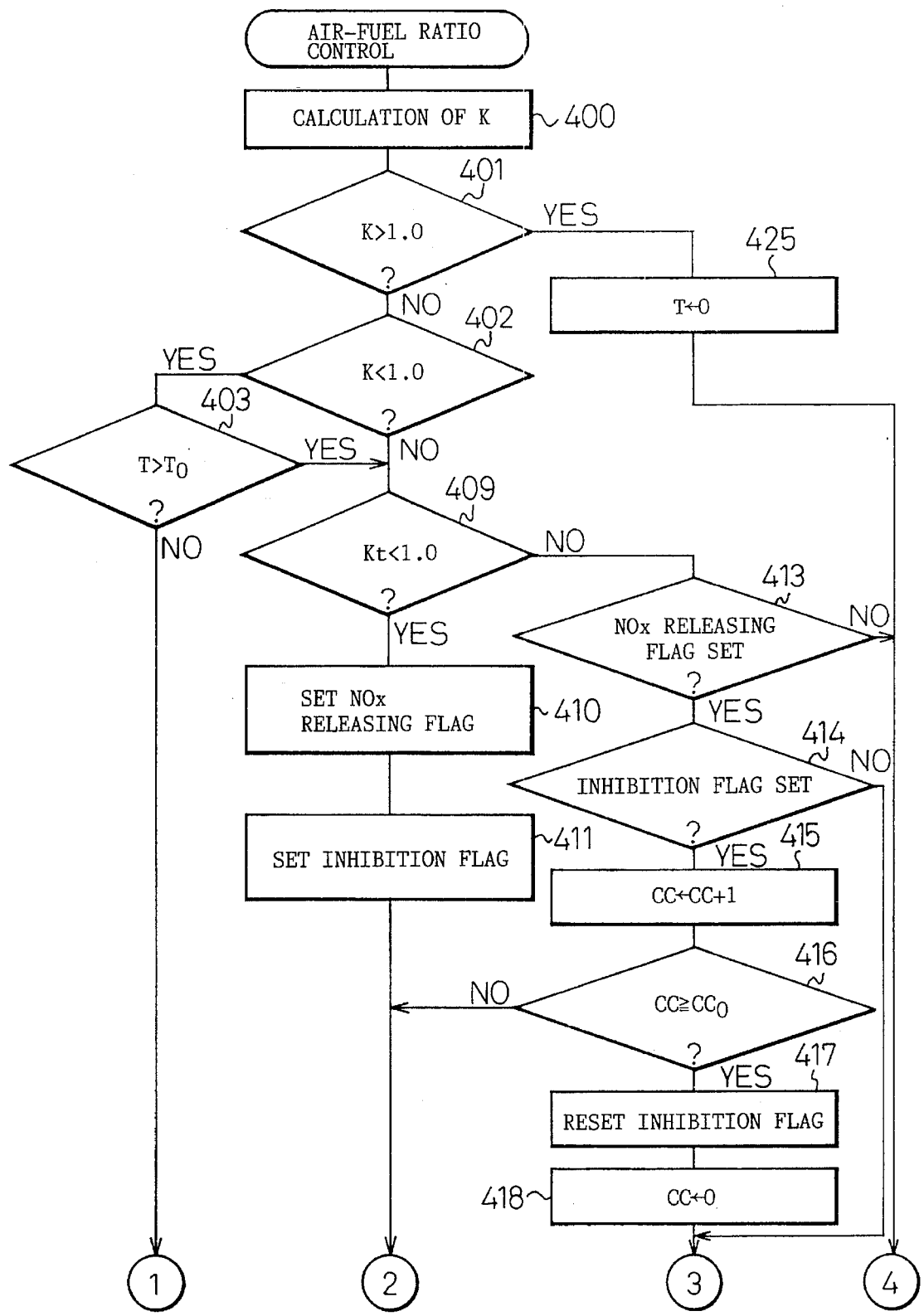
FIG. 21 and FIG. 22 are flow charts of a further embodiment for performing the air-fuel ratio control.
Figure 22:
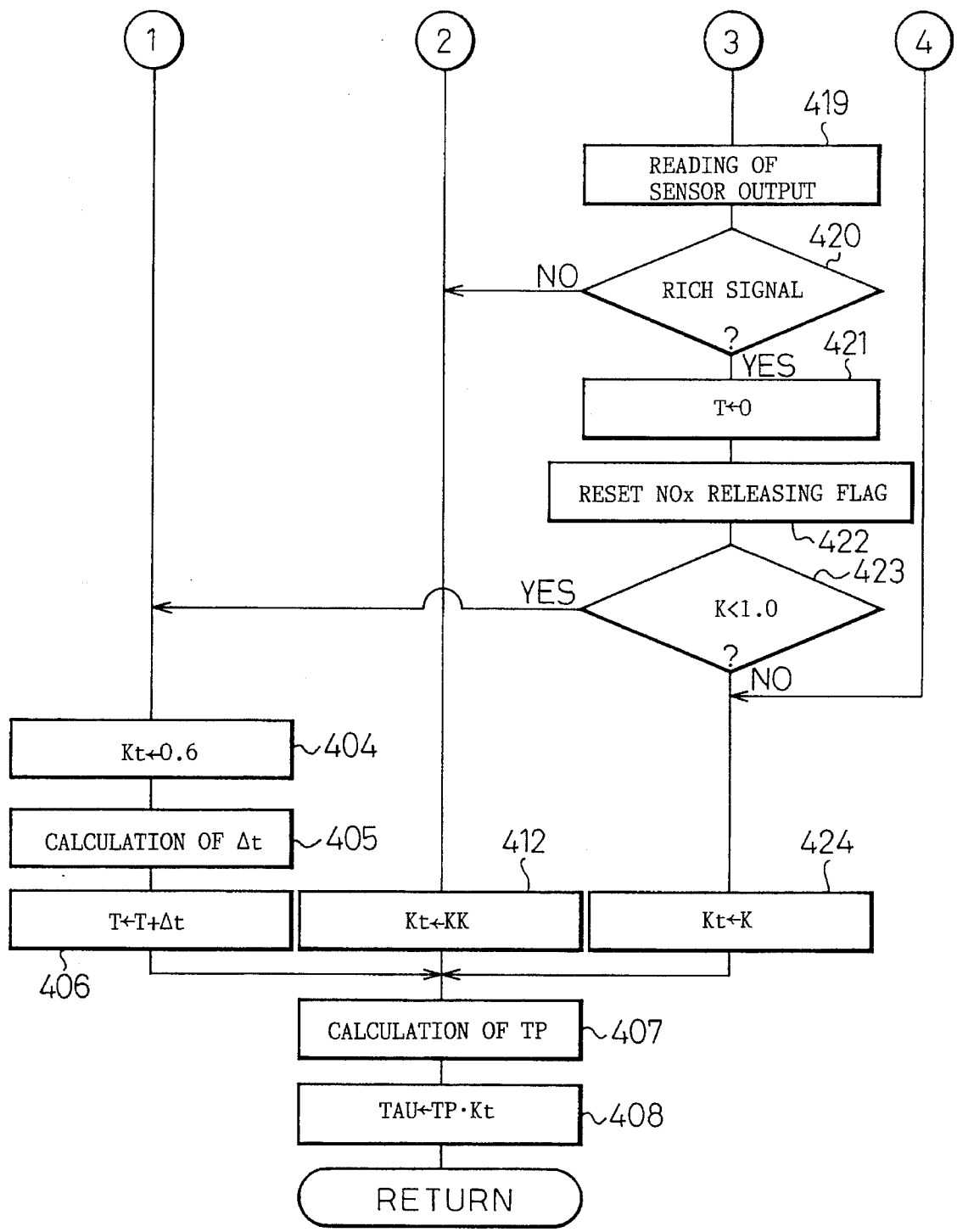

Namely, in the embodiment shown in FIG. 21 and FIG. 22, if the cumulative time T exceeds the constant time $T_0$ when the target value K is smaller than 1.0, the control air-fuel ratio is temporarily made rich, and when the target value K is switched from a state of K<1.0 to a state of K=1.0, the control air-fuel ratio is temporarily made rich, but a decision of whether or not the detection air-fuel ratio has become rich is inhibited for the constant time $CC_0$ of FIG. 20.

Referring to FIG. 21 and FIG. 22, first of all, at step 400, the correction coefficient K is calculated from the operation state of the engine. Subsequently, at step 401, it is determined whether or not the correction coefficient K is larger than 1.0, that is, whether or not it is the operation state where the rich air-fuel mixture should be burned. When $K \leq 1.0$, that is, when it is the operation state where the air-fuel mixture of the stoichiometric air-fuel ratio or the lean air-fuel mixture should be burned, the processing routine goes to step 402, at which it is determined whether or not the correction coefficient is smaller than 1.0, that is, whether or not it is an operation state where the lean air-fuel mixture should be burned. When K<1.0, that is, when it is the operation state where the lean air-fuel mixture should be burned, the processing routine goes to step 403, at which it is determined whether or not the correction coefficient is smaller than 1.0, that is, whether or not the operation state is a state where the lean air-fuel mixture should be burned. When K<1.0, that is, when the operation state is a state where the lean air-fuel mixture should be burned, the processing routine goes to step 403, at which it is determined whether or not the cumulative time T for which the combustion of lean air-fuel mixture is carried out exceeds the predetermined constant time $T_0$. When $T \leq T_0$, the processing routine goes to step 404.

At step 404, the correction coefficient $K_t$ is made for example 0.6. Subsequently, at step 405, the elapsed time $\Delta t$ from when the processing routine goes to step 405 in the previous processing cycle is calculated, and then at step 406, $\Delta t$ is added to the cumulative time T. Accordingly, as mentioned above, this cumulative time indicates a time for which the lean air-fuel mixture is burned. Subsequently, at step 407, the basic fuel injection time TP is calculated from the map shown in FIG. 2, and then at step 408, the fuel injection time TAU is calculated by multiplying the basic fuel injection time TP by the correction coefficient $K_t$. At this time, a lean air-fuel mixture is burned in the combustion chamber 3.

Subsequently, when the cumulative time T exceeds the constant time $T_0$, the processing routine goes from step 403 to step 409, at which it is determined whether or not the correction coefficient $K_t$ is smaller than 1.0. At this time, $K_t$<1.0, and therefore the processing routine goes to step 410, at which the $NO_x$ releasing flag is set, and then the processing routine goes to step 412, at which the inhibition flag is set. Subsequently, the processing routine goes to step 412, at which the correction coefficient $K_t$ is made the predetermined KK. This value KK is a value of about 1.1 to 1.2 with which the air-fuel ratio of the air-fuel mixture fed into the combustion chamber 3 becomes about 12.0 to 13.5. Subsequently, the processing routine passes step 407, and at step 408, the fuel injection time TAU (=TP·$K_t$) is calculated. Accordingly, at this time, the air-fuel ratio of the air-fuel mixture fed into the combustion chamber 3 becomes rich. Namely, when the cumulative time T exceeds the constant time $T_0$, the control air-fuel ratio is switched from lean to rich.

In the next processing cycle, at step 402, it is decided that K<1.0, while it is decided at step 403 that T>$T_0$, and it is decided at step 409 that $K_t$>1.0, and therefore the processing routine goes to step 413, at which it is determined whether or not the $NO_x$ releasing flag has been set. At this time, the $NO_x$ releasing flag has been set, and therefore the processing routine goes to step 414. At step 414, it is determined whether or not the inhibition flag has been set. At this time, the inhibition flag has been set, and therefore the processing routine goes to step 415, at which the count value CC is incremented by "1". Subsequently, at step 416, it is determined whether or not the count value becomes larger than the predetermined constant period $CC_0$ shown in FIG. 20. When $CC<CC_0$, that is, when the constant period $CC_0$ is not elapsed after the control air-fuel ratio is switched from lean to rich, the processing routine goes to step 412, and accordingly a rich air-fuel mixture is continuously fed into the combustion chamber 3.

Subsequently, when CC becomes equal to or larger than $CC_0$, that is, when the constant period $CC_0$ is elapsed from when the control air-fuel ratio is switched from lean to rich, the processing routine goes from step 416 to step 417, at which the inhibition flag is reset. Subsequently, at step 418, the count value CC is made zero, and then the processing routine goes to step 419. Note that, when the inhibition flag is reset, in the subsequent processing cycles, the processing routine jumps from step 414 to step 419.

At step 419, the output signal of the air-fuel ratio sensor 22 is read in, and then at step 420, it is determined whether or not for example the output voltage V of the air-fuel ratio sensor 22 exceeds the constant value $V_0$ shown in FIG. 7, that is, whether or not the air-fuel ratio sensor 22 generates a rich signal indicating that the air-fuel ratio is rich. After the constant period $CC_0$ shown in FIG. 20 has elapsed from when the air-fuel ratio of the air-fuel mixture fed into the combustion chamber 3 is switched from lean to rich, the $NO_x$ is continuously released from the $NO_x$ absorber 18, and therefore the detection air-fuel ratio detected by the air-fuel ratio sensor 22 has become slightly lean. Accordingly, during this period, the processing routine jumps from step 420 to step 412, and thus the rich air-fuel mixture is continuously fed into the combustion chamber 3.

Subsequently, when the air-fuel ratio sensor 22 generates a rich signal, the processing routine goes from step 420 to step 421, and the cumulative time T is made zero, and then the processing routine goes to step 422, at which the $NO_x$ releasing flag is set. Subsequently, at step 423, it is determined whether or not the correction coefficient K is smaller than 1.0. At this time, K<1.0, and therefore the processing routine goes to step 404, at which the air-fuel ratio of the air-fuel mixture fed into the combustion chamber 3 is switched from rich to lean. In the next processing cycle, at step 403, it is decided that $T \leq T_0$, and therefore the processing routine goes to step 404, and thus the air-fuel ratio of the air-fuel mixture fed into the combustion chamber 3 is maintained lean.

On the other hand, when the target value K changes from a state where K<1.0 to a state where K=1.0, that is, when the operation state of the engine changes from the operation state where a lean air-fuel mixture should be burned to an idling operation, high load operation or acceleration operation state, the processing routine passes step 401 and goes from step 402 to step 409. At this time, $K_t$ is still smaller than 1.0, and therefore the processing routine goes to step 408 via steps 410, 411, 412 and 407, and thus the air-fuel ratio of the air-fuel mixture fed into the combustion chamber 3 is switched from lean to rich. Namely, when the operation state of engine changes from the operation state where a lean air-fuel mixture should be burned to an idling operation, high load operation or acceleration operation state, the control air-fuel ratio is switched from lean to rich.

In the next processing cycle, the processing routine passes step 409 to steps 413, 414 and 415 and goes to step 416, at which it is determined whether or not the count value CC becomes larger than the constant period $CC_0$ shown in FIG. 20. During a period when $CC<CC_0$, the processing routine goes to step 412, and accordingly the control air-fuel ratio is maintained rich. Subsequently, when CC becomes equal to or larger than $CC_0$, the processing routine goes to step 419 while passing steps 417 and 418, at which it is determined whether or not the air-fuel ratio sensor 22 generates a rich signal. Until the air-fuel ratio sensor 22 generates a rich signal, the processing routine goes to step 412, and thus the control air-fuel ratio is maintained rich. Subsequently, when the air-fuel ratio sensor 22 generates a rich signal, the processing routine passes steps 421 and 422 and goes to step 423. At this time, K=1.0, and therefore the processing routine goes to step 424, at which $K_t$ is made K (=1.0). Subsequently, the processing routine passes step 407 and goes to step 408. Accordingly, when the air-fuel ratio sensor 22 generates a rich signal, the control air-fuel ratio becomes the stoichiometric air-fuel ratio. In the next processing cycle, the processing routine jumps from step 413 to step 424, and thus the control air-fuel ratio is maintained at the stoichiometric air-fuel ratio.

On the other hand, when the target value K becomes from a state where K<1.0 to a state where K>1.0, that is when the engine operation state is shift from the operation state where the lean air-fuel mixture should be burned to the full load operation state, the processing routine goes from step 401 to step 425, at which the cumulative time T is made zero, and then the processing routine goes to step 424, at which $K_t$ is made K (>1.0). Subsequently, the processing routine passes step 407 and goes to step 408, and thus the air-fuel ratio of the air-fuel mixture fed into the combustion chamber 3 is switched from lean to rich. Namely, when the operation state of the engine is shifted from the operation state where a lean air-fuel mixture should be burned to the full load operation state, the control air-fuel ratio is switched from lean to rich.

Figure 23:
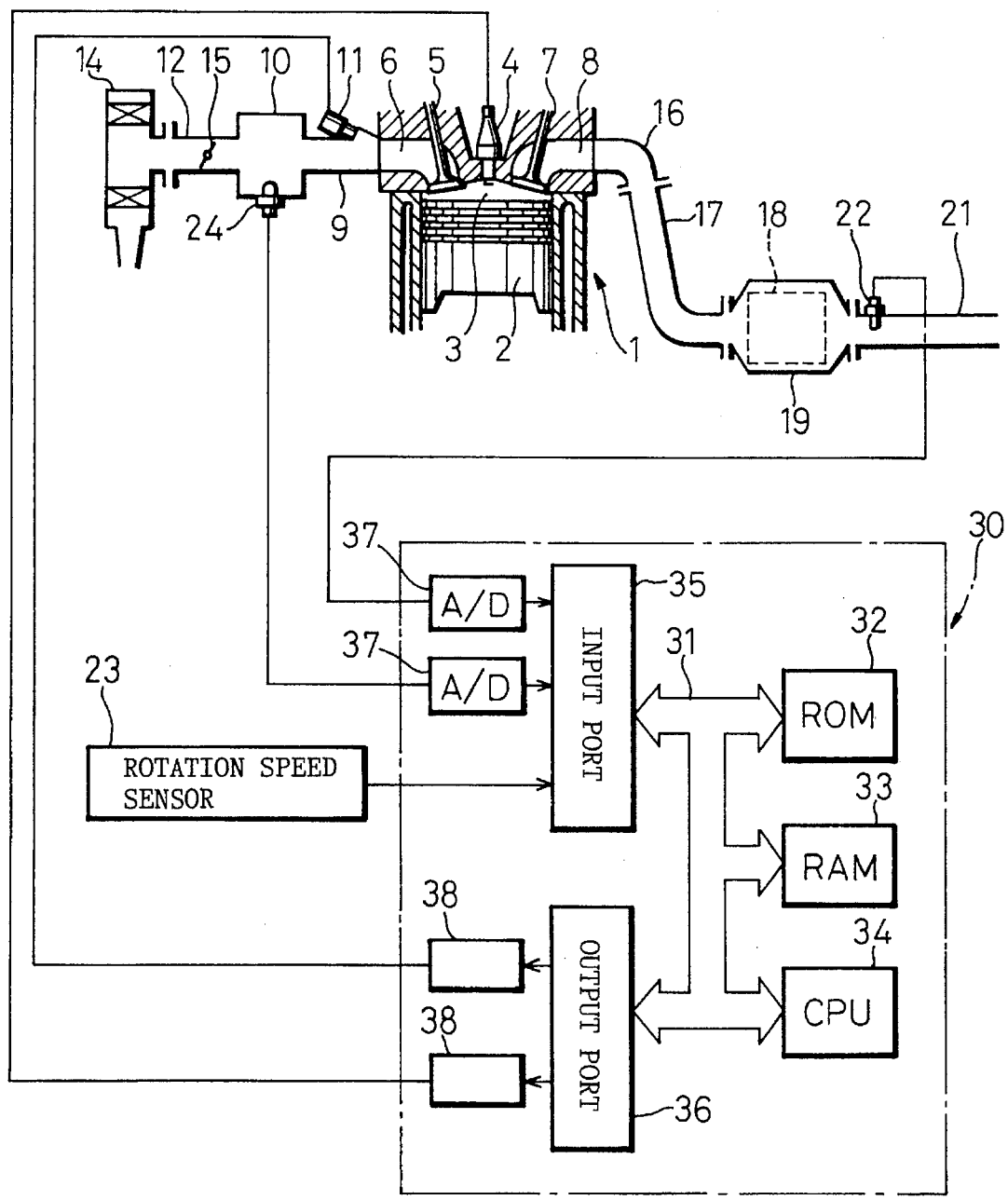
FIG. 23 is an overall view of another embodiment of the internal combustion engine.

FIG. 23 shows a further embodiment. Note that, in this embodiment, similar constituent elements to those in FIG. 1 are indicated by same references.

Figure 24:
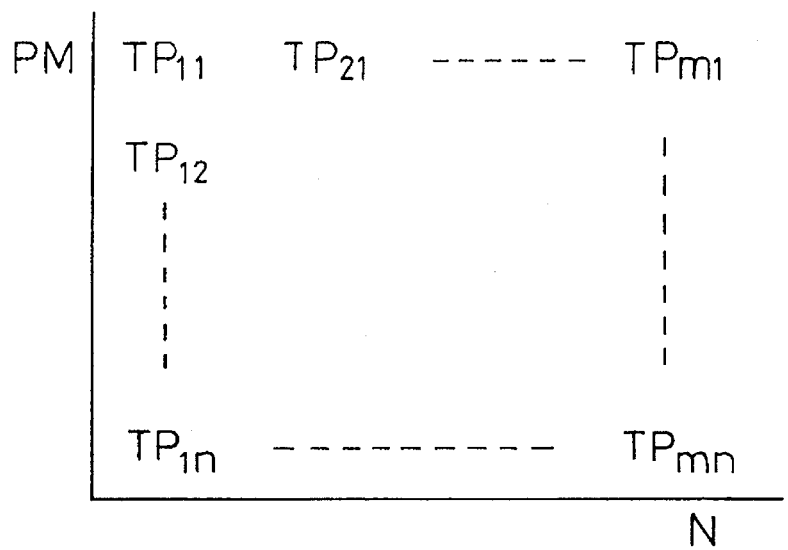
FIG. 24 is a view of a map of a basic fuel injection time.

As shown in FIG. 23, in this embodiment, a pressure sensor 24 generating an output voltage proportional to an absolute pressure in the surge tank 10 is attached to the inside the surge tank 10, and the output voltage of this pressure sensor 24 is input via the corresponding AD converter 37 to the input port 35. Moreover, also in this embodiment, the basic fuel injection time TP is preliminarily found by an experiment, and this basic fuel injection time TP is preliminarily stored in the form of a map as shown in FIG. 24 in the ROM 32 as the function of the engine rotational speed N and the absolute pressure PM of the surge tank 10 expressing the engine load.

Figure 25:
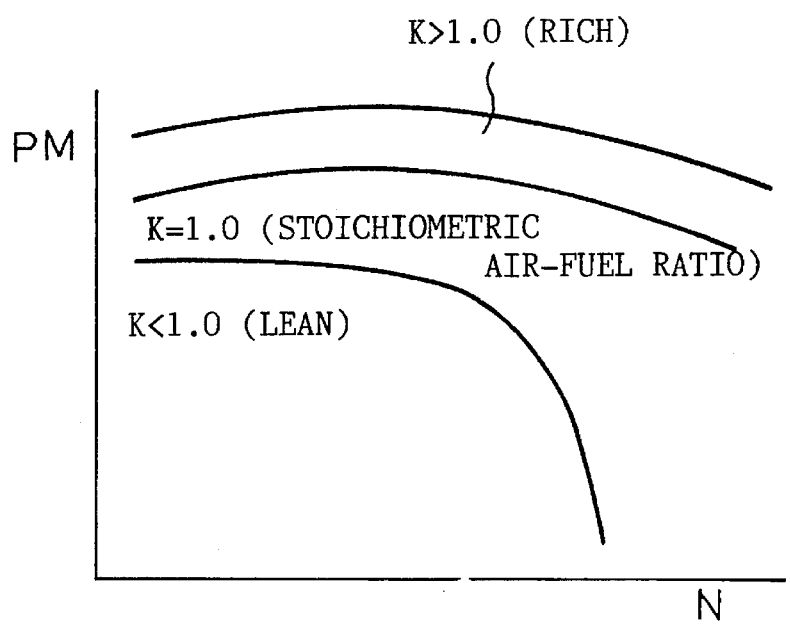
FIG. 25 is a view of the correction coefficient K.

Also, in this embodiment, the value of the correction coefficient K is predetermined with respect to the absolute pressure PM in the surge tank 10 and the engine rotational speed N, and FIG. 25 shows one example of the value of this correction coefficient K. In the example shown in FIG. 25, in an area where the absolute pressure PM in the surge tank 10 is relatively low, that is, in the engine low and middle load operation areas, the value of the correction coefficient K is made a value smaller than 1.0, and accordingly at this time, the air-fuel ratio of the air-fuel mixture fed into the engine cylinder is made lean. On the other hand, in an area where the absolute pressure PM in the surge tank 10 is relatively high, that is, in an engine high load operation area, the value of the correction coefficient K is made 1.0, and accordingly at this time, the air-fuel ratio of the air-fuel mixture fed into the engine cylinder is made the stoichiometric air-fuel ratio. Also, in an area where the absolute pressure PM in the surge tank 10 becomes the highest, that is, in an engine full load operation area, the value of the correction coefficient K is made a value larger than 1.0, and accordingly at this time, the air-fuel ratio of the air-fuel mixture fed into the engine cylinder is made rich.

Also in this embodiment, in the same way as the various embodiments mentioned heretofore, the control air-fuel ratio is controlled, but a fundamental aim of this embodiment is to detect which degree of amount of $NO_x$ is absorbed in the $NO_x$ absorber 18 during a period when the lean air-fuel mixture is burned unlike the embodiments mentioned heretofore. Namely, as mentioned before, when the releasing action of $NO_x$ from the $NO_x$ absorber 18 is completed, the air-fuel ratio of the exhaust gas discharged from the $NO_x$ absorber 18 is changed from lean to rich. In this case, as the amount of $NO_x$ absorbed in the $NO_x$ absorber 18 becomes larger, an elapsed time after the air-fuel ratio of the exhaust gas flowing into the $NO_x$ absorber 18 is switched from lean to rich and until the air-fuel ratio of the exhaust gas discharged from the $NO_x$ absorber 18 changes from lean to rich becomes longer. Accordingly, this means that the amount of $NO_x$ absorbed in the $NO_x$ absorber 18 can be detected from this elapsed time.

Figure 26A:
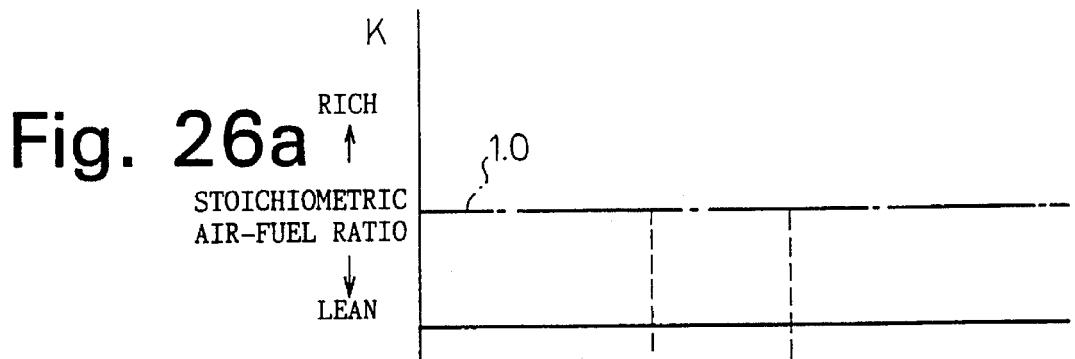
FIG. 26 is a view of the change of the air-fuel ratio.
Figure 26B:
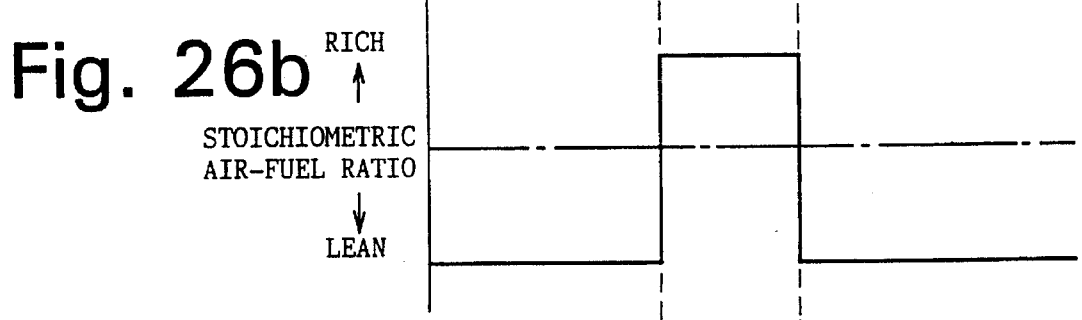
Figure 26C:
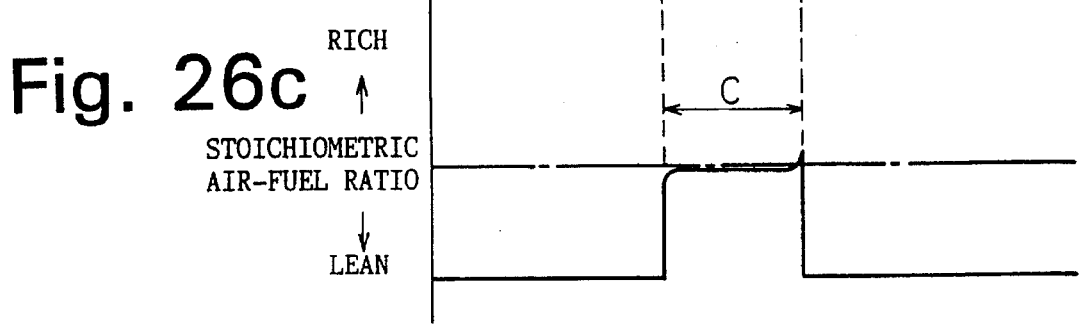
Figure 27A:
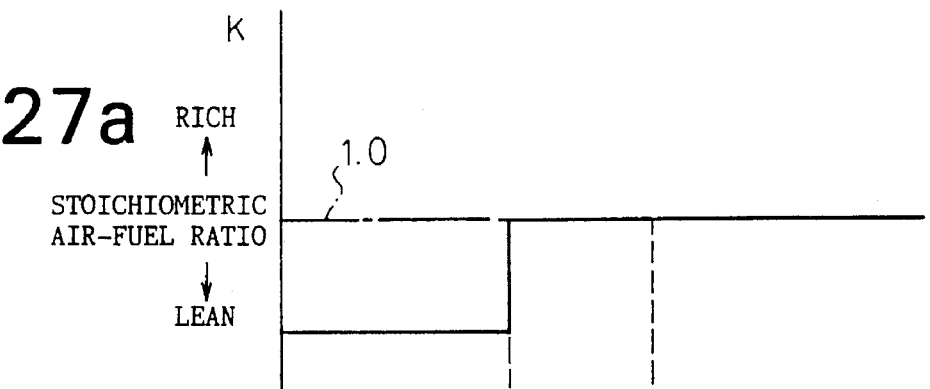
FIG. 27 is a view of the change of the air-fuel ratio.
Figure 27B:
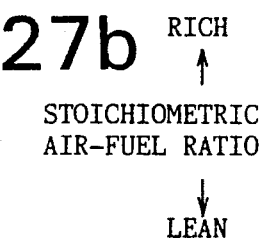
Figure 27C:
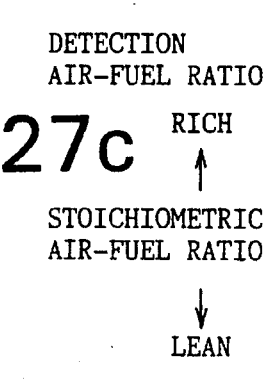

FIG. 26 to FIG. 28 show the $NO_x$ releasing control and the air-fuel ratio control of the air-fuel mixture fed into the combustion chamber 3. The method of detection of the amount of $NO_x$ absorbed in the $NO_x$ absorber 18 will be explained while explaining these controls.

The solid line of FIG. 26 indicates a case where the air-fuel ratio of air-fuel mixture is temporarily made rich so as to release $NO_x$ during the combustion of the lean air-fuel mixture. In this case, the target value K is maintained at a value smaller than 1.0, that is, the air-fuel ratio of the air-fuel mixture fed into the combustion chamber 3 is maintained lean, and when $NO_x$ should be released, the control air-fuel ratio, that is, in this case, the air-fuel ratio of the air-fuel mixture fed into the combustion chamber 3, is switched to rich. When the control air-fuel ratio is made rich, for a time when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. At this time, an elapsed time indicated by C in FIG. 26 expresses the amount of $NO_x$ absorbed in the $NO_x$ absorber 18. Note that, as shown in FIG. 26, when the detection air-fuel ratio becomes rich, the control air-fuel ratio is immediately returned to lean.

FIG. 27 shows a case where the target value K is changed from a value smaller than 1.0 to 1.0, that is a case where the operation state of engine is changed from the operation state where a lean air-fuel mixture should be burned to the operation state where an air-fuel mixture having the stoichiometric air-fuel ratio should be burned. In this case, as indicated by the solid line in FIG. 27, when the target value K is changed from the value smaller than 1.0 to 1.0, the control air-fuel ratio, that is, in this case, the air-fuel ratio of the air-fuel mixture fed into the combustion chamber 3, is switched to rich. When the control air-fuel ratio is made rich, for a time when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. At this time, an elapsed time indicated by C in FIG. 26 expresses the amount of $NO_x$ absorbed in the $NO_x$ absorber 18. Note that, in this case, when the detection air-fuel ratio becomes rich, the control air-fuel ratio is immediately switched from rich to the stoichiometric air-fuel ratio.

FIG. 28 shows a case where the target value K is changed from a value smaller than 1.0 to a value larger than 1.0, that is, a case where the operation state of engine is changed from the operation state where a lean air-fuel mixture should be burned to the operation state where a rich air-fuel mixture should be burned. In this case, as indicated by the solid line in FIG. 28, when the target value K is changed from the value smaller than 1.0 to the value larger than 1.0, the control air-fuel ratio, that is, in this case, the air-fuel ratio of the air-fuel mixture fed into the combustion chamber 3, is switched to rich. When the control air-fuel ratio is made rich, during the period when the releasing action of $NO_x$ is carried out, the detection air-fuel ratio detected by the air-fuel ratio sensor 22 is maintained slightly leaner than the stoichiometric air-fuel ratio, and when the releasing action of $NO_x$ is completed, the detection air-fuel ratio becomes rich. At this time, an elapsed time indicated by C in FIG. 28 expresses the amount of $NO_x$ absorbed in the $NO_x$ absorber 18. Note that, in this case, even though the detection air-fuel ratio becomes rich, the control air-fuel ratio, that is the air-fuel ratio of the air-fuel mixture fed into the combustion chamber 3, is continuously made rich.

In this way, by finding the elapsed time C, the amount of $NO_x$ absorbed in the $NO_x$ absorber 18 can be detected. Note that, in the example mentioned heretofore, the amount of $NO_x$ absorbed in the $NO_x$ absorber 18 is detected from the elapsed time C from when the air-fuel ratio of the air-fuel mixture fed into the combustion chamber 3 is switched from lean to rich to when the air-fuel ratio detected by the air-fuel ratio sensor 22 is changed from lean to rich, but so as to detect the amount of $NO_x$ absorbed in the $NO_x$ absorber 18 more correctly, preferably the calculation of the elapsed time C is started when the air-fuel ratio of the exhaust gas flowing into the $NO_x$ absorber 18 is changed from lean to rich. In this case, it is sufficient so far as another air-fuel ratio sensor is additionally disposed in an inlet portion of the casing 19 of the $NO_x$ absorber 18, and the calculation of the elapsed time C is started when the air-fuel ratio detected by this air-fuel ratio sensor is changed from lean to rich.

In this way, there are various merits if the amount of $NO_x$ absorbed in the $NO_x$ absorber 18 can be detected. For example, when the $SO_x$ or $CO_2$ contained in the exhaust gas is absorbed into the $NO_x$ absorber 18, and as a result the amount of $NO_x$ absorbed in the $NO_x$ absorber 18 is reduced, it becomes possible to decide that deterioration has occurred in the $NO_x$ absorber 18. Also, a main cause of deterioration of the $NO_x$ absorber 18 resides in the absorption of $SO_x$ into the $NO_x$ absorber 18, and accordingly this means that, when the amount of absorption of $SO_x$ into the $NO_x$ absorber 18 is increased, the $SO_x$ must be released from the $NO_x$ absorber 18 so as to increase the absorption capacity of $NO_x$. In this case, when the amount of absorption of $SO_x$ into the $NO_x$ absorber 18 is increased, the amount of absorption of $NO_x$ is decreased, and therefore this means that, if the amount of absorption of $NO_x$ can be detected, the amount of absorption of $SO_x$ can be roughly estimated. Therefore, in this embodiment, the amount of absorption of $SO_x$ is estimated from the amount of absorption of $NO_x$, and when the amount of absorption of $SO_x$ exceeds the predetermined limit, the $SO_x$ is released from the $NO_x$ absorber 18.

An explanation will be made next of the absorption and releasing action of $SO_x$ to or from the $NO_x$ absorber 18. First of all, for the absorption mechanism of $SO_x$ into the $NO_x$ absorber 18, it can be considered that this mechanism is the same as the absorption mechanism of the $NO_x$. Namely, when explaining this by taking as an example a case where platinum Pt and barium Ba are carried on the carrier similar to the explanation of the absorption mechanism of $NO_x$, as mentioned before, when the air-fuel ratio of the inflowing exhaust gas is lean, the oxygen $O_2$ is deposited on the surface of the platinum Pt in the form of $O_2^-$ or $O^{2-}$, and the $SO_2$ in the inflowing exhaust gas reacts with the $O_2^-$ or $O^{2-}$ on the surface of the platinum Pt and becomes $SO_3$. Subsequently, the produced $SO_3$ is further oxidized on the platinum Pt, while absorbed into the absorber, and bonded with the barium oxide BaO, while diffused in the absorber in the form of the sulfuric acid ions $SO_4^{2-}$. Subsequently, the sulfuric acid ions $SO_4^{2-}$ are bonded with the barium ions $Ba^{2+}$ to produce a sulfate $BaSO_4$.

However, this sulfate $BaSO_4$ is difficult to decompose, and even if the air-fuel ratio of the inflowing exhaust gas is made rich for a short time, only a small amount of $SO_x$ is released from the $NO_x$ absorber 18. Accordingly, as the time is elapsed, the sulfate $BaSO_4$ is increased in the $NO_x$ absorber 18, and thus as time elapses, the amount of $NO_x$ that can be absorbed by the $NO_x$ absorber 18 will be lowered. However, when the air-fuel ratio of the exhaust gas flowing into the $NO_x$ absorber 18 is maintained at the stoichiometric air-fuel ratio or rich for a long time, for example about minutes, the $SO_x$ is released from the $NO_x$ absorber 18, and accordingly in this embodiment, when the $SO_x$ should be released, the air-fuel ratio of the air-fuel mixture fed into the combustion chamber 3 is made the stoichiometric air-fuel ratio or rich for about 10 minutes. Note that, as the temperature of the $NO_x$ absorber 18 is higher, the $SO_x$ becomes be more easily released, and therefore when the $SO_x$ should be released, preferably the $NO_x$ absorber 18 or the exhaust gas flowing into the $NO_x$ absorber 18 is heated by an electric heater, etc.

In this way, so as to release the $SO_x$ from the $NO_x$ absorber 18, the air-fuel ratio of the air-fuel mixture fed into the combustion chamber 3 must be maintained at the stoichiometric air-fuel ratio or rich for a long time, and accordingly so as to attempt the reduction of the fuel consumption rate, preferably the frequency of bringing the air-fuel ratio of air-fuel mixture to the stoichiometric air-fuel ratio or rich is reduced as much as possible. Accordingly, in this embodiment, the amount of $NO_x$ absorbed in the $NO_x$ absorber 18 is detected and the releasing action of $SO_x$ is only carried out in a case where this $NO_x$ amount becomes the set amount or less.

Figure 29:
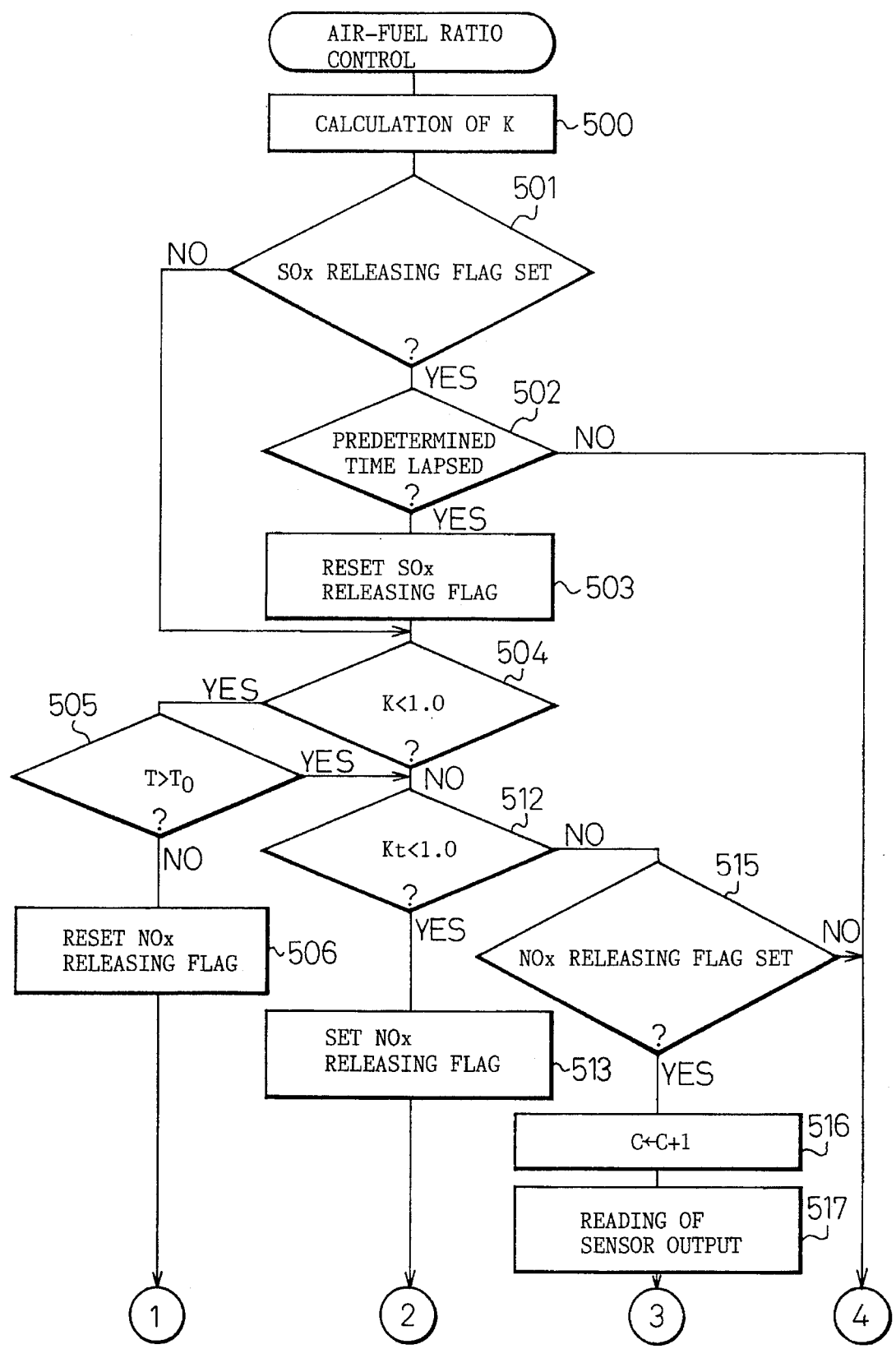
FIG. 29 to FIG. 31 are flow charts of still another embodiment for performing the air-fuel ratio control.
Figure 30:
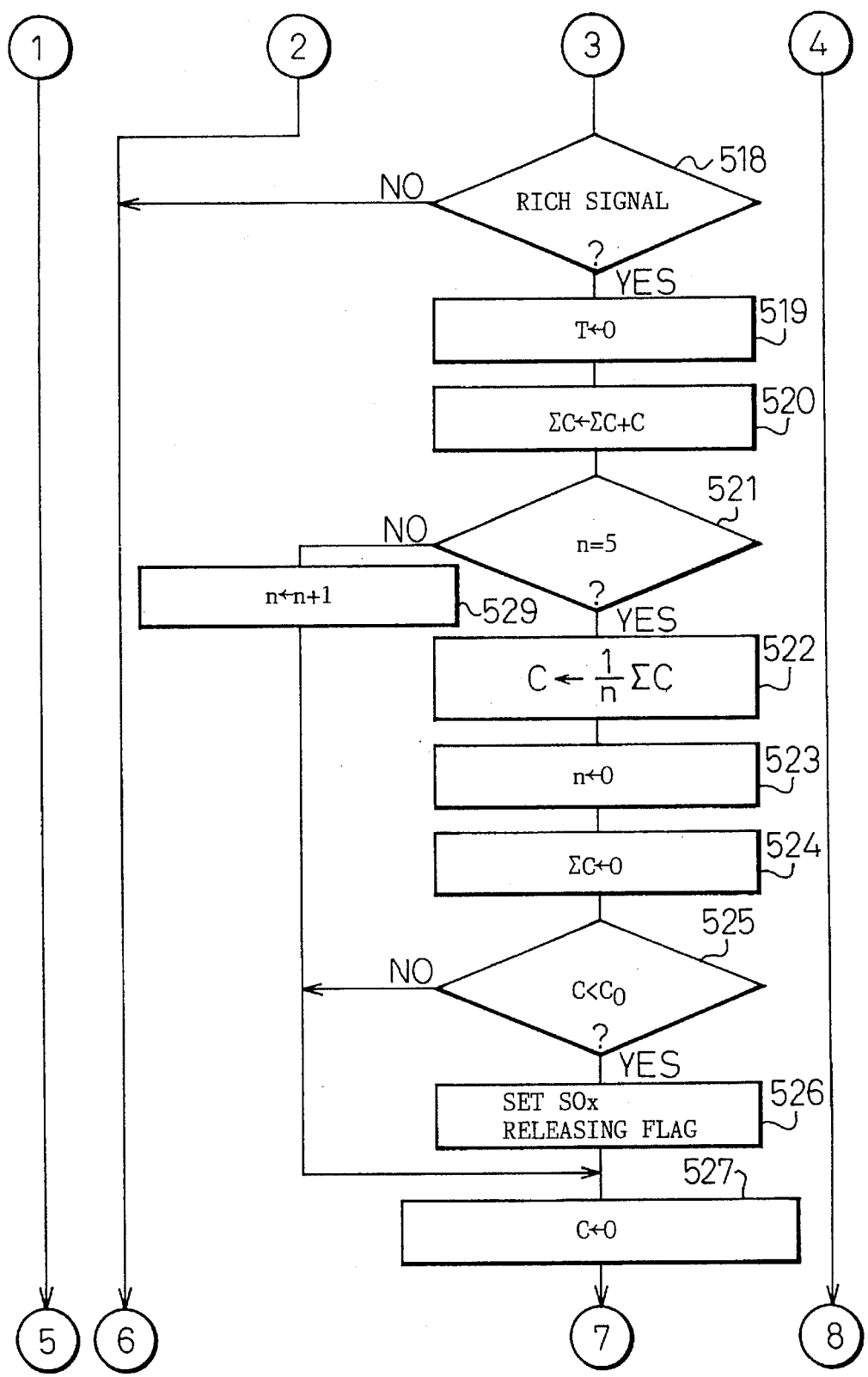
Figure 31:
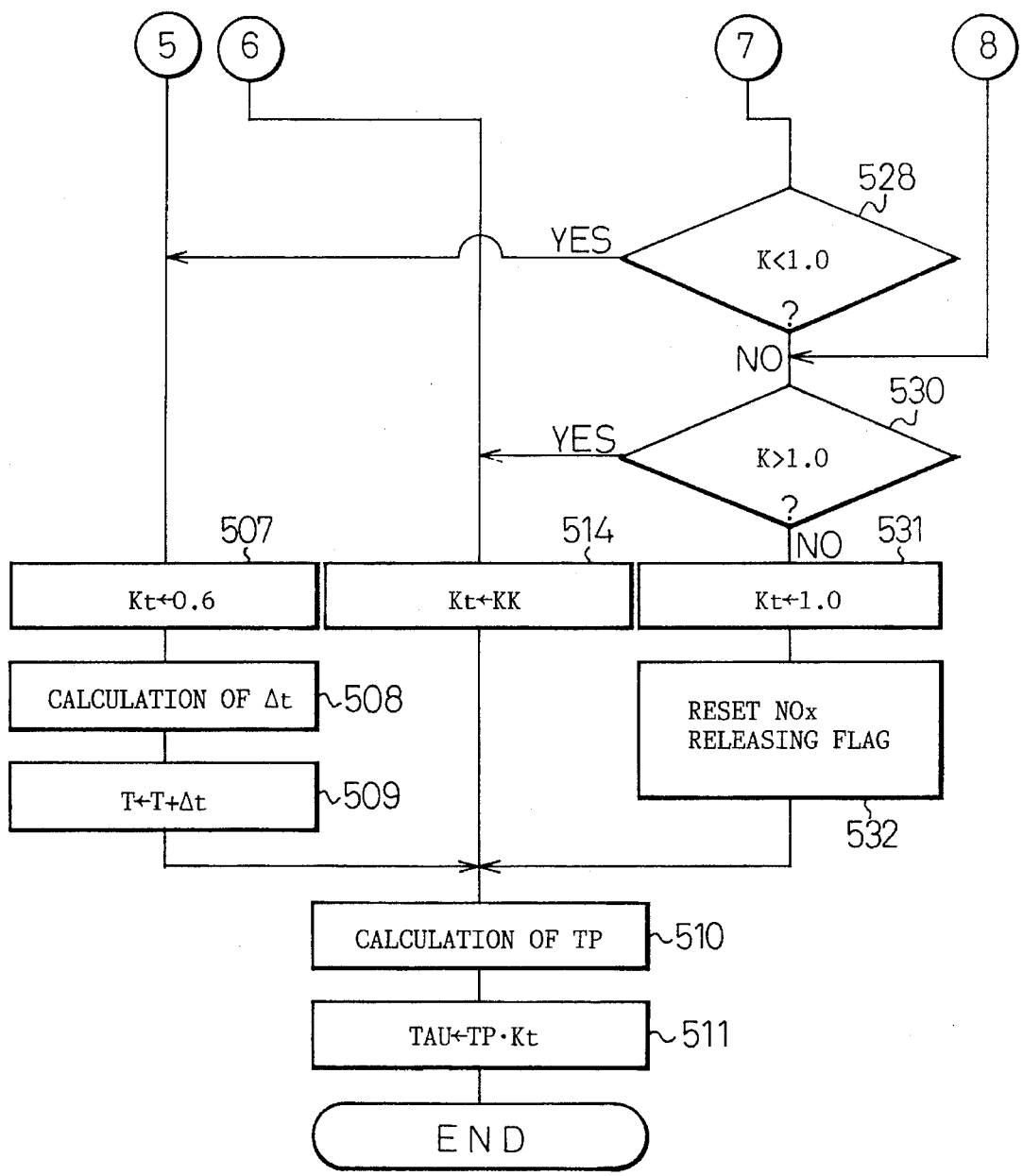

FIG. 29 to FIG. 31 show the control routine of the air-fuel ratio, which routine is executed by interruption at predetermined time intervals.

Referring to FIG. 29 to FIG. 31, first of all, at step 500, the correction coefficient K is calculated from FIG. 25 based on the operation state of the engine. Subsequently, at step 501, it is determined whether or not the $SO_x$ releasing flag indicating that the $SO_x$ should be released has been set. When the $SO_x$ releasing flag has not been set, the processing routine jumps to step 504, at which it is determined whether or not the correction coefficient K is smaller than 1.0, that is, whether or not it is an operation state where the lean air-fuel mixture should be burned. When K<1.0, that is, when it is an operation state where the lean air-fuel mixture should be burned, the processing routine goes to step 505, at which it is determined whether or not the cumulative time T for which the combustion of the lean air-fuel mixture is carried out exceeds the predetermined constant time $T_0$. When $T \leq T_0$, the processing routine goes to step 506, at which the $NO_x$ releasing flag indicating that the air-fuel ratio has been made rich for releasing the $NO_x$ is reset.

Subsequently, at step 507, the correction coefficient $K_t$ is made for example 0.6. Subsequently, at step 508, the elapsed time Δt from when the processing routine goes to step 204 in the previous processing cycle is calculated, and then at step 509, Δt is added to the cumulative time T. Accordingly, as mentioned above, this cumulative time indicates a time for which the lean air-fuel mixture is burned. Subsequently, at step 510, the basic fuel injection time TP is calculated from the map shown in FIG. 24, and then at step 511, the fuel injection time TAU is calculated by multiplying the basic fuel injection time TP by the correction coefficient $K_t$. At this time, a lean air-fuel mixture is burned in the combustion chamber 3.

Subsequently, when the cumulative time T exceeds the constant time $T_0$, the processing routine goes from step 505 to step 512, at which it is determined whether or not the correction coefficient $K_t$ is smaller than 1.0. At this time, $K_t<1.0$, and therefore the processing routine goes to step 513, at which the $NO_x$ releasing flag is set, and then the processing routine goes to step 514, at which the correction coefficient $K_t$ is made the predetermined value KK. This value KK is a value of about 1.1 to 1.2 with which the air-fuel ratio of the air-fuel mixture fed into the combustion chamber 3 becomes about 12.0 to 13.5. Subsequently, the processing routine passes step 510, and at step 511, the fuel injection time TAU (=TP·$K_t$) is calculated. Accordingly, at this time, the air-fuel ratio of the air-fuel mixture fed into the combustion chamber 3 becomes rich. Namely, when the cumulative time T exceeds the constant time $T_0$, as indicated by the solid line in FIG. 26, the control air-fuel ratio is switched from lean to rich.

In the next processing cycle, it is decided that K<1.0 at step 504, while it is decided at step 505 that T>$T_0$, and it is decided at step 512 that $K_t$>1.0, and therefore the processing routine goes to step 515, at which it is determined whether or not the $NO_x$ releasing flag has been set. At this time, since the $NO_x$ releasing flag has been set, the processing routine goes to step 516. At step 516, the count value C for calculating the elapsed time C (FIG. 26) is incremented by "1". Subsequently, at step 517, the output signal of the air-fuel ratio sensor 22 is read in, and then at step 518, it is determined whether or not for example the output value V of the air-fuel ratio sensor 22 exceeds the constant value $V_0$ shown in FIG. 7, that is, whether or not the air-fuel ratio sensor 22 generates a rich signal indicating that the air-fuel ratio is rich. For a while after the air-fuel ratio of the air-fuel mixture fed into the combustion chamber 3 is switched from lean to rich, the $NO_x$ is continuously released from the $NO_x$ absorber 18, and therefore the detection air-fuel ratio detected by the air-fuel ratio sensor 22 has become slightly lean as indicated by the solid line in FIG. 26. Accordingly, during this time, the processing routine jumps from step 518 to step 514, and thus the rich air-fuel mixture is continuously fed into the combustion chamber 3.

Subsequently, when the air-fuel ratio sensor 22 generates a rich signal, the processing routine goes from step 518 to step 519, at which the cumulative time T is made zero. Subsequently, at step 520, the εC is calculated by adding C to εC. Subsequently, at step 521, it is determined whether or not the number of times of enriching reaches the constant value, for example "5". When n is not equal to 5, the processing routine goes to step 529, at which n is incremented by "1". Namely, whenever the enriching processing for releasing $NO_x$ is carried out one time, n is incremented only by "1". Subsequently, the processing routine goes to step 527, at which the count value C is made zero, and then the processing routine goes to step 528.

At step 528, it is determined whether or not the correction coefficient K is smaller than 1.0. At this time, K<1.0, and therefore the processing routine goes to step 507, at which the air-fuel ratio of the air-fuel mixture fed into the combustion chamber 3 is switched from rich to lean. In the next processing cycle, it is decided at step 505 that $T \leq T_0$, and therefore the processing routine passes step 506 and goes to step 507, and thus the air-fuel ratio of the air-fuel mixture fed into the combustion chamber 3 is maintained lean.

On the other hand, when the enriching processing for releasing $NO_x$ is carried out five times, at step 521, it is determined that n=5, and thus the processing routine goes to step 522. At step 522, an average value C ($=1/n$ $\epsilon C$) of the elapsed time is calculated. Subsequently, at step 523, n is made zero, and then at step 524, $\epsilon C$ is made zero. Subsequently, at step 525, it is determined whether or not the average value of the elapsed time is smaller than Ca. When $C<C_0$, that is, when it is determined that a large amount of $SO_x$ is absorbed in the $NO_x$ absorber 18, the processing routine goes to step 526, at which the $SO_x$ releasing flag is set, and then the processing routine goes to step 527. Contrary to this, when $C \geq C_0$, the processing routine jumps to step 527.

When the $SO_x$ releasing flag is set, the processing routine goes from step 501 to step 502, at which it is determined whether or not a constant time, for example, 10 minutes, has lapsed. When 10 minutes has not lapsed, the processing routine jumps to step 530, at which it is determined whether or not the correction coefficient K is larger than 1.0. When K>1.0, the processing routine passes step 514 and goes to step 510, and thus at this time, a rich air-fuel mixture is fed into the combustion chamber 3. Contrary to this, when K<1.0, the processing routine goes to step 531, at which $K_t$ is made equal to 1.0, and then after the $NO_x$ releasing flag is reset at step 532, the processing routine goes to step 510. Accordingly, at this time, when K<1.0, that is, even when the operation state is the state where the lean air-fuel mixture should be burned, the air-fuel ratio of the air-fuel mixture fed into the combustion chamber 3 is made the stoichiometric air-fuel ratio.

In this way, when the $SO_x$ releasing flag is set, for 10 minutes after this, the air-fuel ratio of the air-fuel mixture fed into the combustion chamber 3 is made rich or the stoichiometric air-fuel ratio, and thus all $SO_x$ will be released from the $NO_x$ absorber 18 during this time. Note that, as mentioned before, preferably the $NO_x$ absorber 18 or the exhaust gas flowing into the $NO_x$ absorber 18 is heated for a time when the $SO_x$ releasing flag is set so as to promote the releasing of the $SO_x$. When 10 minutes elapse after the $SO_x$ releasing flag is set, the processing routine goes from step 502 to step 503, at which the $SO_x$ releasing flag is reset, and then the processing routine goes to step 504.

On the other hand, when the target value K changes from the state where K<1.0 to the state where K=1.0, that is, when the operation state is shifted from the operation state where the lean air-fuel mixture should be burned to the high load operation state, the processing routine goes from step 504 to step 512. At this time, $K_t$ is still smaller than 1.0, and therefore the processing routine goes to step 511 via steps 513, 514 and 510, and thus the air-fuel ratio of the air-fuel mixture fed into the combustion chamber 3 is switched from lean to rich. Namely, when the operation state of the engine is shifted from the operation state where the lean air-fuel mixture should be burned to the high load operation state, as indicated by the solid line in FIG. 27, the control air-fuel ratio is switched from lean to rich.

In the next processing cycle, the processing routine passes step 512 to steps 515, 516 and 517 and goes to step 518, at which it is determined whether or not the air-fuel ratio sensor 22 generates a rich signal. Until the air-fuel ratio sensor 22 generates a rich signal, the processing routine jumps to step 514, and thus, as indicated by the solid line in FIG. 27, the control air-fuel ratio is maintained at rich. Subsequently, when the air-fuel ratio sensor 22 generates a rich signal, the processing routine passes step 519 to 521, 529 and step 527 or passes step 519 to step 527, and goes to step 528. At this time, K=1.0, and therefore the processing routine goes to step 530, at which it is determined whether or not the correction coefficient K is larger than 1.0. It is decided at step 530 that $K \leq 1.0$, and therefore the processing routine goes to step 531, at which the correction coefficient $K_t$ is made 1.0. Subsequently, at step 532, the $NO_x$ releasing flag is reset, and then the processing routine passes step 510 and goes to step 511. Accordingly, when the air-fuel ratio sensor 22 generates a rich signal, as indicated by the solid line in FIG. 27, the control air-fuel ratio becomes the stoichiometric air-fuel ratio. In the next processing cycle, the processing routine jumps from step 515 to step 530 and thus the control air-fuel ratio is maintained at the stoichiometric air-fuel ratio.

On the other hand, when the target value K changes from the state indicated as K<1.0 to the state indicated as K>1.0, that is when the engine operation state is shifted from the operation state where a lean air-fuel mixture should be burned to the full load operation state, the processing routine goes from step 504 to step 512. At this time, $K_t$ is still smaller than 1.0, and therefore the processing routine goes to step 511 via steps 513, 514 and 510, and thus the air-fuel ratio of the air-fuel mixture fed into the combustion chamber 3 is switched from lean to rich. Namely, when the operation state of the engine is shifted from the operation state where a lean air-fuel mixture should be burned to the full load operation state, as shown in FIG. 28, the control air-fuel ratio is switched from lean to rich.

In the next processing cycle, the processing routine goes from step 512, passes steps 515, 516 and 517, and goes to step 518, at which it is determined whether or not the air-fuel ratio sensor 22 generates a rich signal. Until the air-fuel ratio sensor 22 generates a rich signal, the processing routine jumps to step 514, and thus, as shown in FIG. 28, the control air-fuel ratio is maintained rich. Subsequently, when the air-fuel ratio sensor 22 generates a rich signal, the processing routine passes step 519 to 521, 529 and step 527, or passes step 519 to step 527 and goes to step 528. At this time, K=1.0, and therefore the processing routine goes to step 530, and then goes from step 530 to step 514. Thus, in this case, even after the air-fuel ratio sensor 22 generates a rich signal, a rich air-fuel mixture is continuously fed into the combustion chamber 3.

In this embodiment, the amount of $NO_x$ absorbed in the $NO_x$ absorber 18 can be correctly detected. Also, the degree of deterioration of the $NO_x$ absorber 18 can be estimated from this $NO_x$ amount, and when the degree of deterioration of the $NO_x$ absorber 18 is advanced, the $SO_x$ which has become the main cause of deterioration is released from the $NO_x$ absorber 18 and thus the toxicity by $SO_x$ of the $NO_x$ absorber 18 can be solved.

On the other hand, as mentioned before, according to a certain kind of the $NO_x$ absorber 18, there is a delay in the releasing starting action of $NO_x$ from the $NO_x$ absorber 18, and accordingly even when the control air-fuel ratio is switched from lean to rich, there sometimes occurs a case where the $NO_x$ is not immediately released from the $NO_x$ absorber 18. In such an $NO_x$ absorber 18, when the control air-fuel ratio is switched from lean to rich, the detection air-fuel ratio instantaneously becomes rich as shown in FIG.

32, and thereafter when the $NO_x$ releasing action from the $NO_x$ absorber 18 is started, the detection air-fuel ratio is maintained slightly leaner than the stoichiometric air-fuel ratio.

In this way, in such an $NO_x$ absorber 18, when the control air-fuel ratio is switched from lean to rich, the detection air-fuel ratio instantaneously becomes rich, and therefore if it is decided that the $NO_x$ releasing action from the $NO_x$ absorber 18 is completed since the detection air-fuel ratio becomes rich, an erroneous decision occurs. Therefore, so as to prevent such an erroneous decision, in the embodiment shown in FIG. 33 to FIG. 36, a decision of whether or not the detection air-fuel ratio becomes rich is inhibited for a constant time $CC_0$ after the switching of the control air-fuel ratio from rich to lean, and the amount of $NO_x$ absorbed in the $NO_x$ absorber 18 is detected from the elapsed time C of from when this constant time $CC_0$ is elapsed to when the detection air-fuel ratio becomes rich. Note that, in this embodiment, when the average value C of the elapsed time exceeds the set value $C_0$, the air-fuel ratio of the air-fuel mixture is made rich for for example 10 minutes irrespective of the value of the correction coefficient K.

Referring to FIG. 33 to FIG. 36, first of all, at step 600, the correction coefficient K is calculated from FIG. 25 based on the operation state of the engine. Subsequently, at step 601, it is determined whether or not the $SO_x$ releasing flag indicating that the $SO_x$ should be released has been set. When the $SO_x$ releasing flag has not been set, the processing routine jumps to step 604, at which it is determined whether or not the correction coefficient K is smaller than 1.0, that is, whether or not it is an operation state where the lean air-fuel mixture should be burned. When K<1.0, that is, when it is an operation state where the lean air-fuel mixture should be burned, the processing routine goes to step 605, at which it is determined whether or not the cumulative time T for which the combustion of the lean air-fuel mixture is carried out exceeds the predetermined constant time $T_0$. When $T \leq T_0$, the processing routine goes to step 606.

At step 606, the correction coefficient $K_t$ is made for example 0.6. Subsequently, at step 607, the elapsed time $\Delta t$ from when the processing routine goes to step 607 in the previous processing cycle is calculated, and then at step 608, $\Delta t$ is added to the cumulative time T. Accordingly, as mentioned above, this cumulative time indicates a time for which the lean air-fuel mixture is burned. Subsequently, at step 609, the basic fuel injection time TP is calculated from the map shown in FIG. 24, and then at step 610, the fuel injection time TAU is calculated by multiplying the basic fuel injection time TP by the correction coefficient $K_t$. At this time, a lean air-fuel mixture is burned in the combustion chamber 3.

Subsequently, when the cumulative time T exceeds the constant time $T_0$, the processing routine goes from step 605 to step 611, at which it is determined whether or not the correction coefficient $K_t$ is smaller than 1.0. At this time, $K_t$<1.0, and therefore the processing routine goes to step 612, at which the $NO_x$ releasing flag is set, and then the processing routine goes to step 613, at which the inhibition flag is set. Subsequently, the processing routine goes to step 614, at which the correction coefficient $K_t$ is made the predetermined value KK. This value KK is a value of about 1.1 to 1.2 with which the air-fuel ratio of the air-fuel mixture fed into the combustion chamber 3 becomes about 12.0 to 13.5. Subsequently, the processing routine passes step 609, and at step 610, the fuel injection time TAU (=TP·$K_t$) is calculated. Accordingly, at this time, the air-fuel ratio of the air-fuel mixture fed into the combustion chamber 3 becomes rich. Namely, when the cumulative time T exceeds the constant time $T_0$, the control air-fuel ratio is switched from lean to rich.

In the next processing cycle, it is decided that K 1.0 at step 604, while it is decided at step 605 that T> $T_0$, and it is decided at step 611 that $K_t$>1.0, and therefore the processing routine goes to step 615, at which it is determined whether or not the $NO_x$ releasing flag has been set. At this time, since the $NO_x$ releasing flag has been set, the processing routine goes to step 616. At step 616, it is determined whether or not the inhibition flag has been set. At this time, since the inhibition flag has been set, the processing routine goes to step 617, at which the count value CC is incremented by "1". Subsequently, at step 618, it is determined whether or not the count value becomes larger than the predetermined constant period $CC_0$ shown in FIG. 32. When CC<$CC_0$, that is, when the constant period $CC_0$ has not elapsed after the control air-fuel ratio is switched from lean to rich, the processing routine goes to step 614, and accordingly the rich air-fuel mixture is continuously fed into the combustion chamber 3.

Subsequently, when CC becomes equal to or larger than $CC_0$, that is, when a constant period $CC_0$ has elapsed from when the control air-fuel ratio is switched from lean to rich, the processing routine goes from step 618 to step 619, at which the inhibition flag is reset. Subsequently, at step 620, the count value CC is made zero, and then the processing routine goes to step 621. Note that, when the inhibition flag is reset, in the subsequent processing cycles, the processing routine jumps from step 616 to step 621.

At step 621, the count value C for calculating the elapsed time C (FIG. 32) is incremented by "1". Subsequently, at step 622, the output signal of the air-fuel ratio sensor 22 is read in, and then at step 623, it is determined whether or not for example the output voltage V of the air-fuel ratio sensor 22 exceeds the constant value $V_0$ shown in FIG. 7, that is, whether or not the air-fuel ratio sensor 22 generates a rich signal indicating that the air-fuel ratio is rich. After the constant period $CC_0$ shown in FIG. 32 has elapsed from when the air-fuel ratio of the air-fuel mixture fed into the combustion chamber 3 is switched from lean to rich, the $NO_x$ is continuously released from the $NO_x$ absorber 18, and therefore the detection air-fuel ratio detected by the air-fuel ratio sensor 22 has become slightly lean. Accordingly, during this term, the processing routine jumps from step 623 to step 614, and thus the rich air-fuel mixture is continuously fed into the combustion chamber 3.

Subsequently, when the air-fuel ratio sensor 22 generates a rich signal, the processing routine goes from step 623 to step 624, and the cumulative time T is made zero. Subsequently, at step 625, the $\epsilon C$ is calculated by adding C to $\epsilon C$. Subsequently, at step 626, it is determined whether or not the number of times of enriching reaches the constant value, for example "5". When n is not equal to 5, the processing routine goes to step 633, at which n is incremented by "1". Namely, whenever the enriching processing for releasing $NO_x$ is carried out one time, n is incremented only by "1". Subsequently, the processing routine goes to step 632, at which the count value C is made zero, and then the processing routine goes to step 634.

At step 634, the $NO_x$ releasing flag is reset, and then at step 635, it is determined whether or not the correction coefficient K is smaller than 1.0. At this time, K<1.0, and therefore the processing routine goes to step 606, at which the air-fuel ratio of the air-fuel mixture fed into the combustion chamber 3 is switched from rich to lean. In the next processing cycle, it is decided at step 605 that $T \leq T_0$, and therefore the processing routine goes to step 606, and thus the air-fuel ratio of the air-fuel mixture fed into the combustion chamber 3 is maintained lean.

On the other hand, when the enriching processing for releasing $NO_x$ is carried out five times, at step 626, it is determined that n=5, and thus the processing routine goes to step 627. At step 627, an average value C (=1/n $\epsilon$C) of the elapsed time is calculated. Subsequently, at step 628, n is made zero, and then at step 629, $\epsilon$C is made zero. Subsequently, at step 630, it is determined whether or not the average value of the elapsed time is smaller than $C_0$. When C<$C_0$, that is, when it is determined that a large amount of $SO_x$ is absorbed in the $NO_x$ absorber 18, the processing routine goes to step 631, at which the $SO_x$ releasing flag is set, and then the processing routine goes to step 632. Contrary to this, when C$\geq$$C_0$, the processing routine jumps to step 632.

When the $SO_x$ releasing flag is set, the processing routine goes from step 601 to step 602, at which it is determined whether or not a constant time, for example 10 minutes, has lapsed. When 10 minutes have not lapsed, the processing routine goes to step 637, at which the $K_t$ is made the constant value KK (>1.0), and then at step 638, the cumulative time T is made zero. Subsequently, the processing routine passes step 609 and goes to step 610. Accordingly, when the $SO_x$ releasing flag is set, for 10 minutes after this, the air-fuel ratio of the air-fuel mixture fed into the combustion chamber 3 is made rich, and thus during this time, all $SO_x$ will be released from the $NO_x$ absorber 18. When 10 minutes are elapsed after the $SO_x$ releasing flag is set, the processing routine goes from step 602 to step 603, at which the $SO_x$ releasing flag is reset, and then the processing routine goes to step 604.

On the other hand, when the target value K changes from the state where K<1.0 to the state where K=1.0, that is, when the operation state of the engine is shifted from the operation state where the lean air-fuel mixture should be burned to the high load operation state, the processing routine goes from step 604 to step 611. At this time, $K_t$ is still smaller than 1.0, and therefore the processing routine goes to step 610 via steps 612, 613, 614 and 609, and thus the air-fuel ratio of the air-fuel mixture fed into the combustion chamber 3 is switched from lean to rich. Namely, when the operation state of the engine is shifted from the operation state where a lean air-fuel mixture should be burned to the high load operation state, the control air-fuel ratio is switched from lean to rich.

Figure 32A:
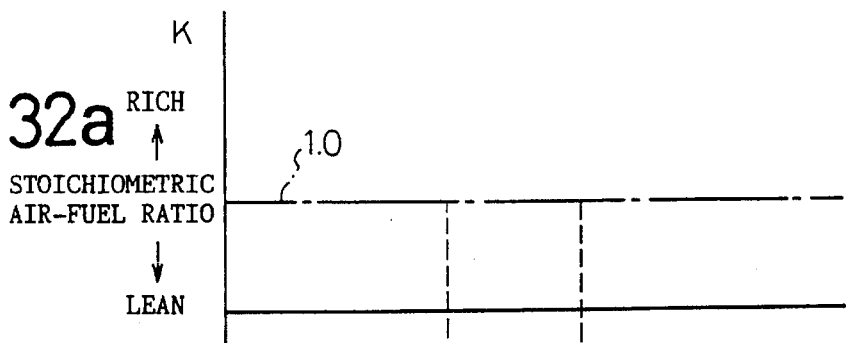
FIG. 32 is a view of the change of the air-fuel ratio.
Figure 32B:
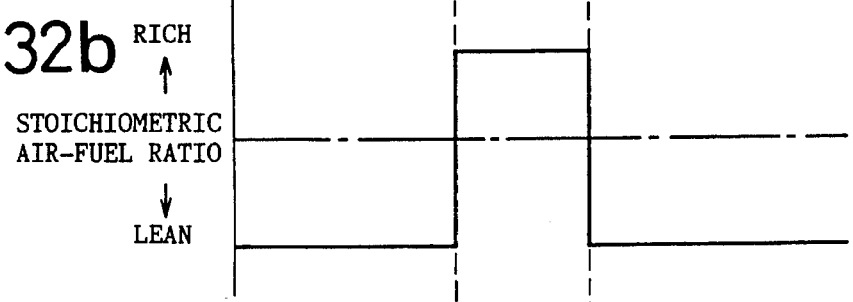
Figure 32C:
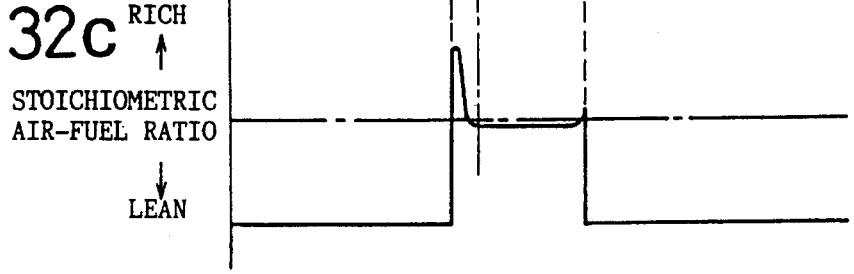
Figure 33:
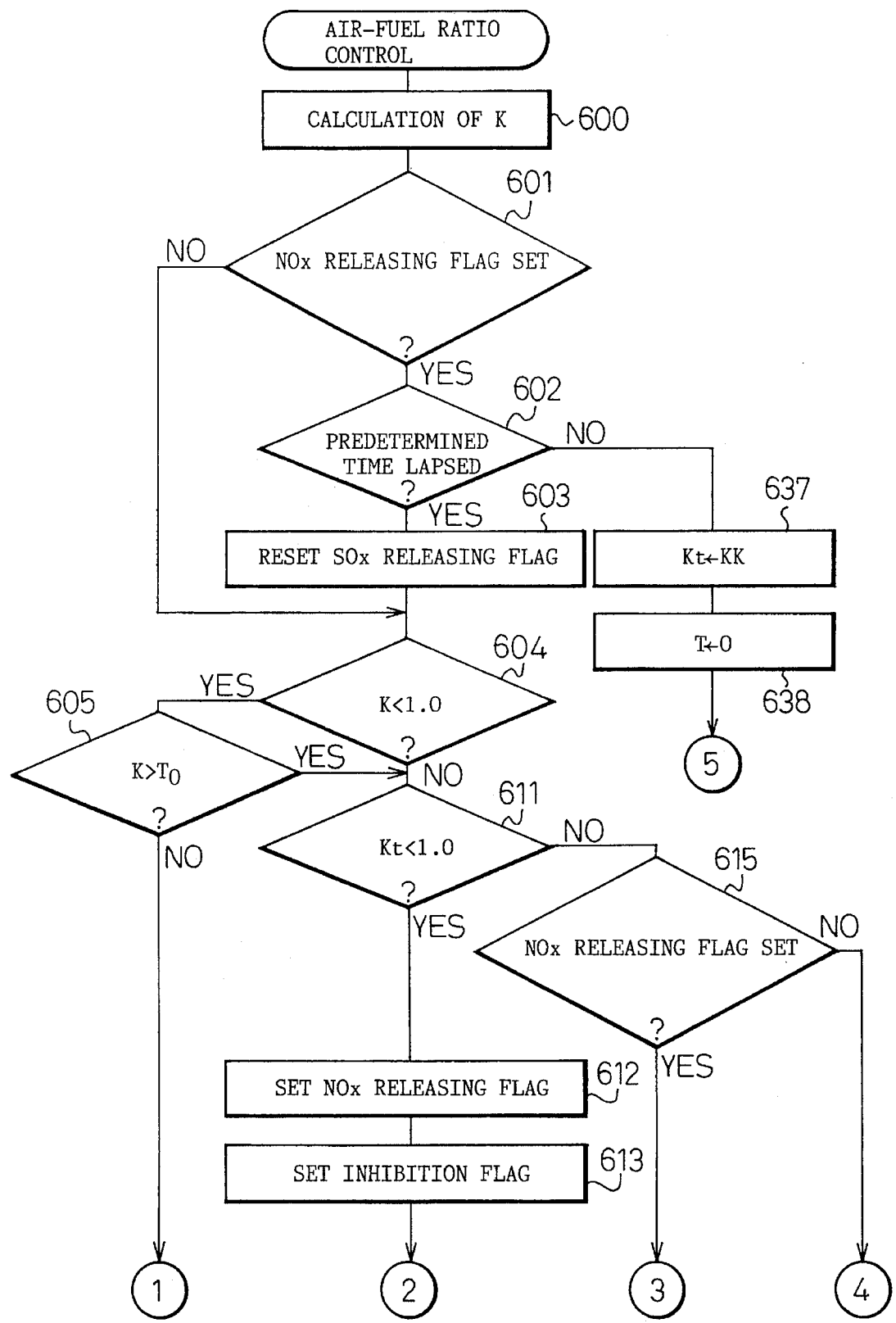
FIG. 33 to FIG. 36 are flow charts of still another embodiment for performing the air-fuel ratio control.
Figure 34:
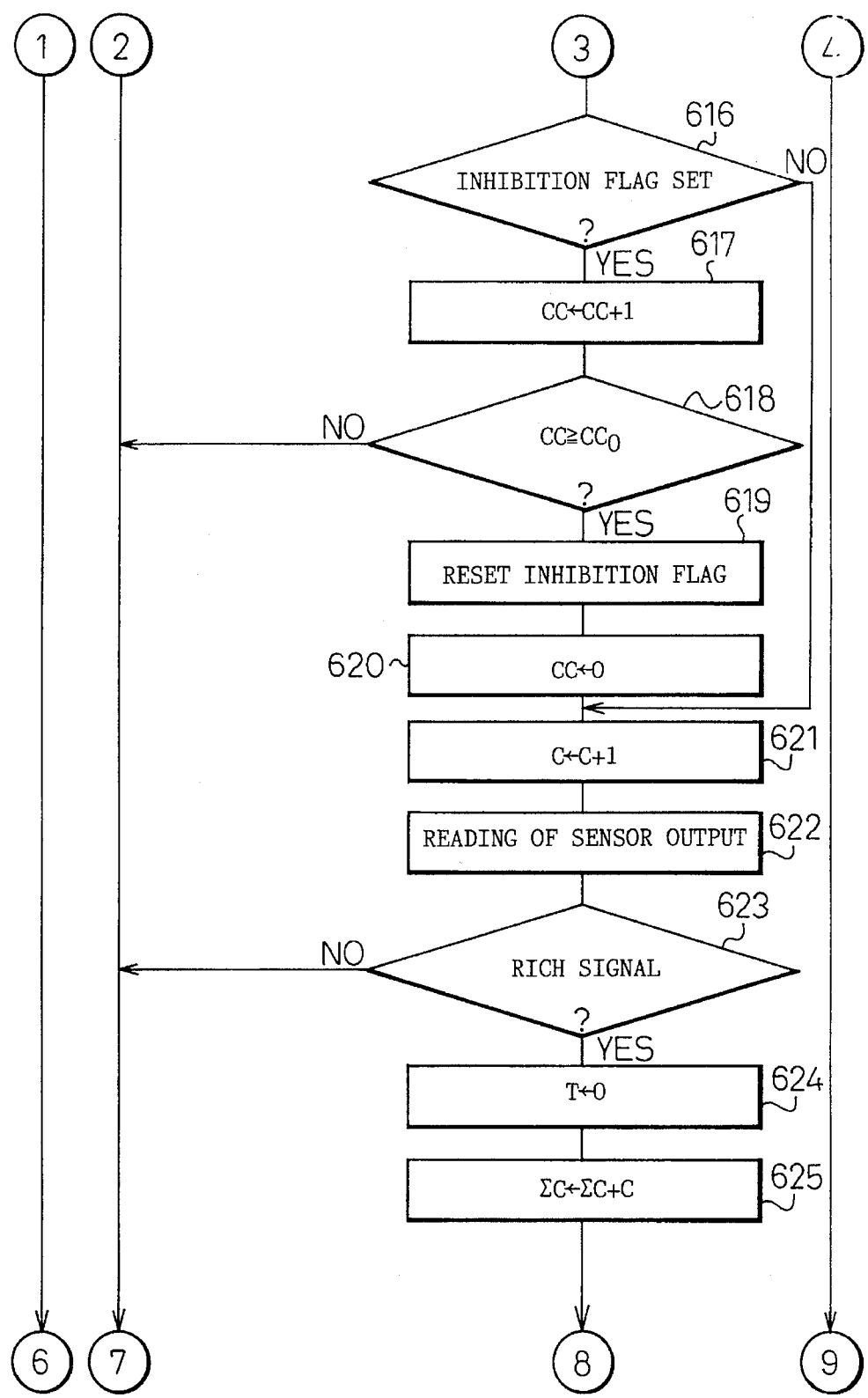
Figure 35:
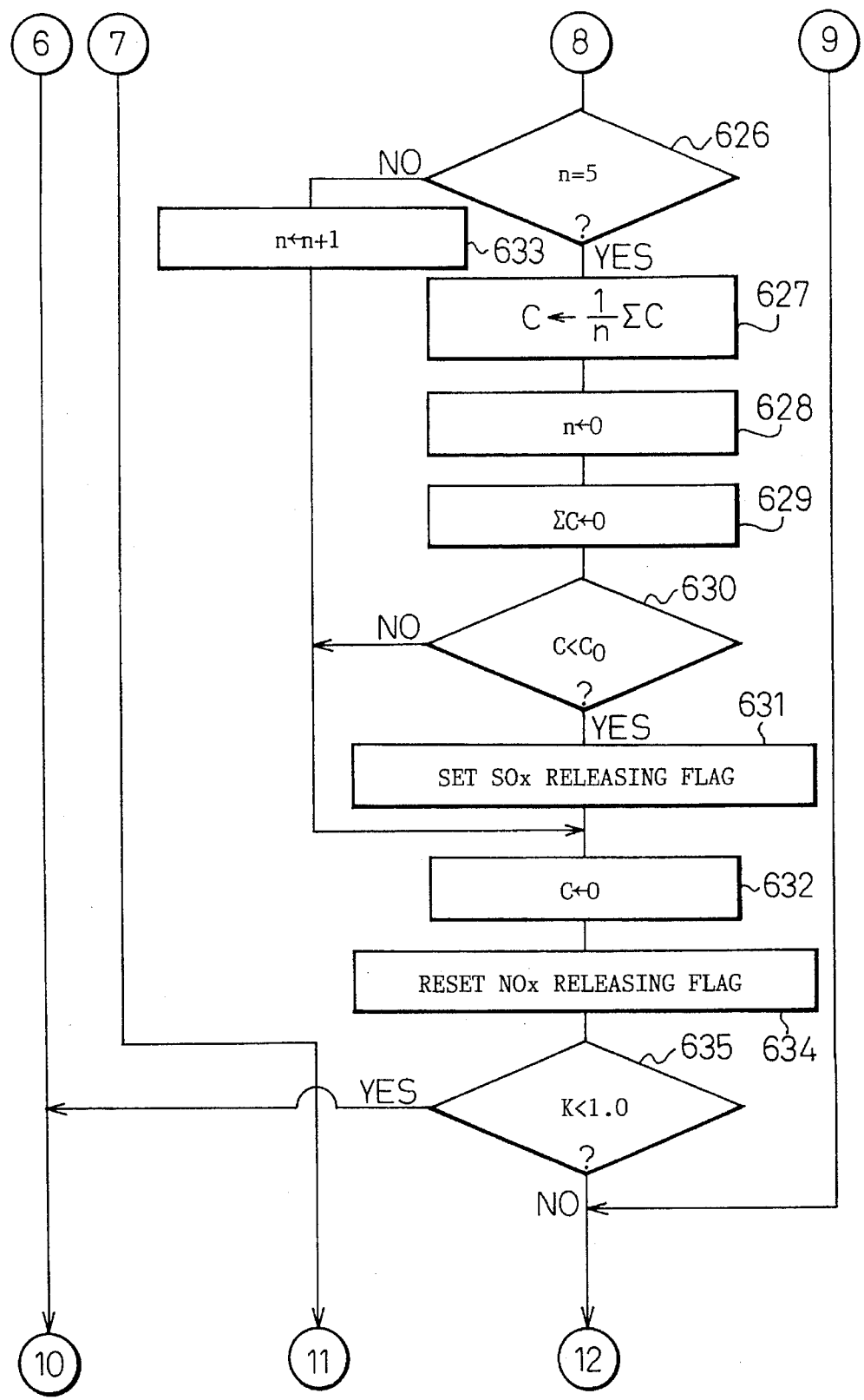
Figure 36:
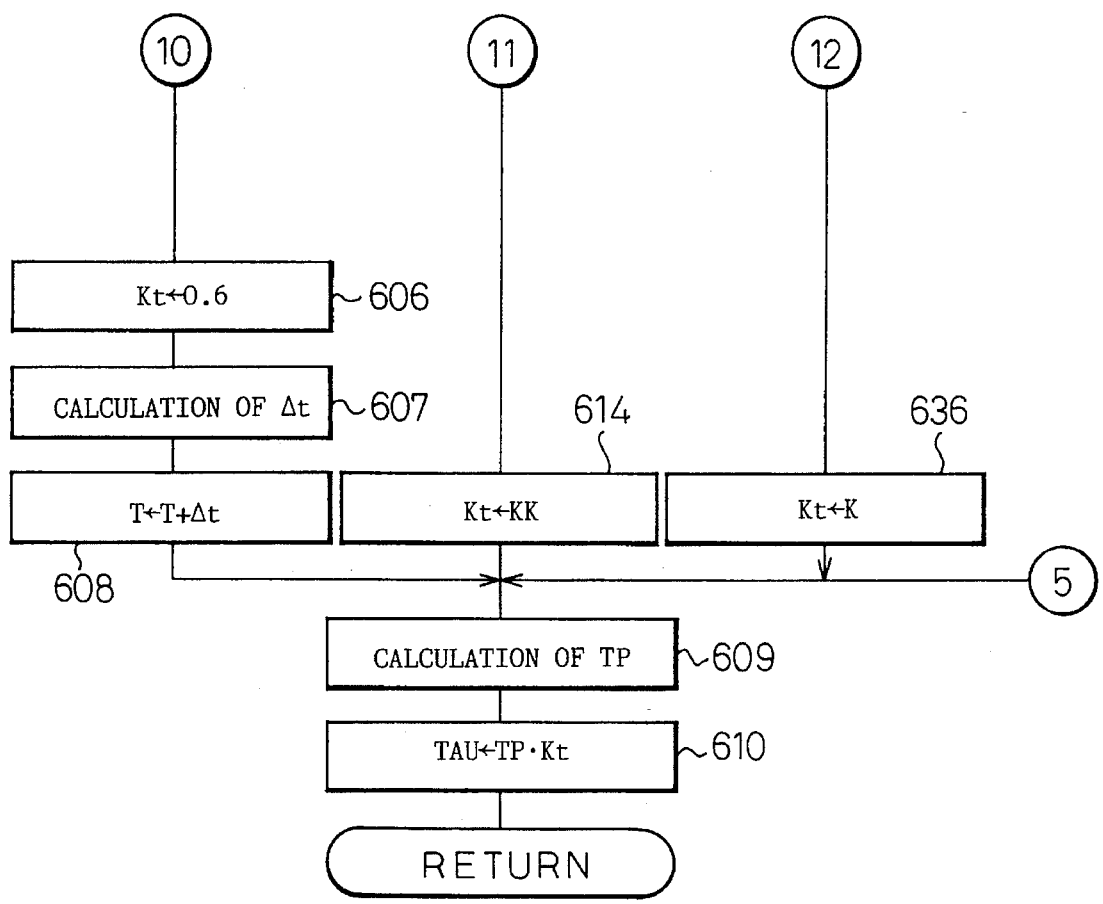

In the next processing cycle, the processing routine passes step 611 to steps 615, 616 and 617 and goes to step 618, at which it is determined whether or not the count value CC becomes larger than the constant period $CC_0$ shown in FIG. 32. For a time when CC<$CC_0$, the processing routine goes to step 614, and accordingly the control air-fuel ratio is maintained rich. Subsequently, when CC becomes equal to or larger than $CC_0$, the processing routine passes steps 619 to 622 and goes to step 623, at which it is determined whether or not the air-fuel ratio sensor 22 generates a rich signal. Until the air-fuel ratio sensor 22 generates a rich signal, the processing routine goes to step 614, and thus the control air-fuel ratio is maintained rich. Subsequently, when the air-fuel ratio sensor 22 generates a rich signal, the processing routine passes steps 624 to 626, 633, 632 and step 634 or passes step 624 to step 632 and step 634 and goes to step 635. At this time, K=1.0, and therefore the processing routine goes to step 636, at which $K_t$ is made K (=1.0). Subsequently, the processing routine passes step 609 and goes to step 610. Accordingly, when the air-fuel ratio sensor 22 generates a rich signal, the control air-fuel ratio becomes the stoichiometric air-fuel ratio. In the next processing cycle, the processing routine jumps from step 615 to step 636, and thus the control air-fuel ratio is maintained at the stoichiometric air-fuel ratio.

On the other hand, when the target value K changes from the state where K<1.0 to the state where K>1.0, that is, when the operation state of the engine is shifted from the operation state where the lean air-fuel mixture should be burned to the full load operation state, the processing routine goes from step 604 to step 612. At this time, $K_t$ is still smaller than 1.0, and therefore the processing routine goes to step 610 via steps 612, 613, 614 and 609, and thus the air-fuel ratio of the air-fuel mixture fed into the combustion chamber 3 is switched from lean to rich. Namely, when the operation state of the engine is shifted from the operation state where the lean air-fuel mixture should be burned to the full load operation state, the control air-fuel ratio is switched from lean to rich.

In the next processing cycle, the processing routine passes step 611 to steps 615, 616 and 617 and goes to step 618, at which it is determined whether or not the count value CC becomes larger than the constant period $CC_0$ shown in FIG. 32. For a time when CC<$CC_0$, the processing routine goes to step 614, and accordingly the control air-fuel ratio is maintained at rich. Subsequently, when CC becomes equal to or larger than $CC_0$, the processing routine passes steps 619 to 622 and goes to step 623, at which it is determined whether or not the air-fuel ratio sensor 22 generates a rich signal. Until the air-fuel ratio sensor 22 generates a rich signal, the processing routine goes to step 614, and thus the control air-fuel ratio is maintained at rich. Subsequently, when the air-fuel ratio sensor 22 generates a rich signal, the processing routine passes step 624 to step 634 and goes to step 635. At this time, K>1.0, and therefore the processing routine goes to step 636, at which $K_t$ is made K (>1.0). Subsequently, the processing routine passes step 609 and goes to step 610. Thus, in this case, even after the air-fuel ratio sensor 22 generates the rich signal, the rich air-fuel mixture is continuously fed into the combustion chamber 3.

We claim:

1. An exhaust purification device of an internal combustion engine in which an $NO_x$ absorber which absorbs $NO_x$ when the air-fuel ratio of an inflowing exhaust gas is lean and releases the absorbed $NO_x$ when the air-fuel ratio of the inflowing exhaust gas is the stoichiometric air-fuel ratio or rich is arranged in an engine exhaust passage, an air-fuel ratio sensor is arranged in the engine exhaust passage downstream of said $NO_x$ absorber, and $NO_x$ releasing completion decision means is provided for deciding that the releasing action of $NO_x$ from the $NO_x$ absorber is completed when the air-fuel ratio detected by the air-fuel ratio sensor is switched from lean to the stoichiometric air-fuel ratio or rich after the air-fuel ratio of the exhaust gas flowing into the $NO_x$ absorber is switched from lean to the stoichiometric air-fuel ratio or rich and the releasing action of $NO_x$ from the $NO_x$ absorber is started.

2. An exhaust purification device of an internal combustion engine according to claim 1, wherein the air-fuel ratio sensor comprises a sensor with an output which abruptly changes at the stoichiometric air-fuel ratio.

3. An exhaust purification device of an internal combustion engine according to claim 1, wherein decision inhibition means is provided for inhibiting the completion decision of the $NO_x$ releasing action by said $NO_x$ releasing completion decision means for a predetermined period from when the air-fuel ratio of the exhaust gas flowing into the $NO_x$ absorber is switched from lean to the stoichiometric air-fuel ratio or rich.

4. An exhaust purification device of an internal combustion engine according to claim 1, wherein the maintenance of the air-fuel ratio of the exhaust gas at the stoichiometric air-fuel ratio or rich for the releasing of $NO_x$ is stopped when it is decided by said $NO_x$ releasing completion decision means that the $NO_x$ releasing action from the $NO_x$ absorber is completed.

5. An exhaust purification device of an internal combustion engine according to claim 4, wherein air-fuel ratio control means is provided for controlling the air-fuel ratio of the air-fuel mixture fed into the engine combustion chamber and the air-fuel ratio of the exhaust gas flowing into the $NO_x$ absorber is changed by changing the air-fuel ratio of the air-fuel mixture fed into the engine combustion chamber by said air-fuel ratio control means.

6. An exhaust purification device of an internal combustion engine according to claim 5, wherein $NO_x$ releasing timing determination means is provided for determining the timing at which the $NO_x$ is released from the $NO_x$ absorber; said air-fuel ratio control means switches the air-fuel ratio of the air-fuel mixture from lean to the stoichiometric air-fuel ratio or rich when the timing of releasing $NO_x$ from the $NO_x$ absorber comes and switches the air-fuel ratio of the air-fuel mixture from the stoichiometric air-fuel ratio or rich to lean when it is decided by said $NO_x$ releasing completion decision means that the $NO_x$ releasing action from the $NO_x$ absorber is completed.

7. An exhaust purification device of an internal combustion engine according to claim 6, wherein said $NO_x$ releasing timing determination means decides that the timing of releasing $NO_x$ from the $NO_x$ absorber comes when the period for which the lean air-fuel mixture combustion is carried out exceeds a predetermined period.

8. An exhaust purification device of an internal combustion engine according to claim 5, wherein an engine operation state where a lean air-fuel mixture should be burned and an engine operation state where an air-fuel mixture of the stoichiometric air-fuel ratio should be burned are preliminarily determined, said air-fuel ratio control means switches the air-fuel ratio of the air-fuel mixture from lean to rich when the engine operation state changes from the operation state where the lean air-fuel mixture should be burned to the operation state where the air-fuel mixture having the stoichiometric air-fuel ratio should be burned, and then switches the air-fuel ratio of the air-fuel mixture from rich to the stoichiometric air-fuel ratio when it is decided that the $NO_x$ releasing action from the $NO_x$ absorber is completed by said $NO_x$ releasing completion decision means.

9. An exhaust purification device of an internal combustion engine according to claim 4, wherein reduction agent feeding means is provided for feeding the reduction agent into the engine exhaust passage upstream of the $NO_x$ absorber; and the air-fuel ratio of the exhaust gas flowing into the $NO_x$ absorber is changed by feeding the reduction agent into the engine exhaust passage by said reduction agent feeding means.

10. An exhaust purification device of an internal combustion engine according to claim 9, wherein $NO_x$ releasing timing determination means for determining the timing of releasing the $NO_x$ from the $NO_x$ absorber is provided; said reduction agent feeding means starts the feeding of the reduction agent when the timing of releasing $NO_x$ from the $NO_x$ absorber comes and switches the air-fuel ratio of the exhaust gas from lean to the stoichiometric air-fuel ratio or rich, and then stops the feeding of the reduction agent and switches the air-fuel ratio of the exhaust from the stoichiometric air-fuel ratio or rich to lean when it is decided by said $NO_x$ releasing completion decision means that the $NO_x$ releasing action from the $NO_x$ absorber is completed.

11. An exhaust purification device of an internal combustion engine according to claim 10, wherein said $NO_x$ releasing timing determination means decides that the timing of releasing $NO_x$ from the $NO_x$ absorber comes when the period for which the operation of the engine is carried out exceeds a predetermined period.

12. An exhaust purification device of an internal combustion engine according to claim 9, wherein said reduction agent is made of at least one selected from gasoline, isooctane, hexane, heptane, butane, propane, light oil and lamp oil.

13. An exhaust purification device of an internal combustion engine according to claim 1, wherein $NO_x$ absorption amount detection means is provided for finding the amount of $NO_x$ absorbed in the $NO_x$ absorber from an elapsed time from when the air-fuel ratio of the exhaust gas flowing into the $NO_x$ absorber is switched from lean to the stoichiometric air-fuel ratio or rich to when it is decided by said $NO_x$ releasing completion decision means that the $NO_x$ releasing action from the $NO_x$ absorber is completed.

14. An exhaust purification device of an internal combustion engine according to claim 13, wherein said elapsed time is counted a plurality of times, and said $NO_x$ absorption amount detection means finds the amount of $NO_x$ absorbed in the $NO_x$ absorber from an average value of the plurality of elapsed times.

15. An exhaust purification device of an internal combustion engine according to claim 13, wherein deterioration degree estimation means is provided for estimating the degree of deterioration of the $NO_x$ absorber based on the $NO_x$ amount detected by said $NO_x$ absorption amount detection means.

16. An exhaust purification device of an internal combustion engine according to claim 13, wherein air-fuel ratio control means is provided for maintaining the air-fuel ratio of the exhaust gas flowing into the $NO_x$ absorber at the stoichiometric air-fuel ratio or rich over a longer time than a time for which the air-fuel ratio is made the stoichiometric air-fuel ratio or rich for the releasing of $NO_x$ when the $NO_x$ amount detected by said $NO_x$ absorption amount detection means is smaller than the predetermined set amount.

17. An exhaust purification device of an internal combustion engine according to claim 16, wherein said air-fuel ratio control means controls the air-fuel ratio of the air-fuel mixture fed into the engine combustion chamber and changes the air-fuel ratio of the exhaust gas flowing into the $NO_x$ absorber by changing the air-fuel ratio of the air-fuel mixture fed into the engine combustion chamber.

18. An exhaust purification device of an internal combustion engine according to claim 1, wherein the $NO_x$ absorber contains at least one element selected from alkali metals, for example potassium, sodium, lithium and cesium, alkali earths consisting of barium and calcium, rare earths such as lanthanum and yttrium and platinum.

* * * * *

UNITED STATES PATENT AND TRADEMARK OFFICE
CERTIFICATE OF CORRECTION

PATENT NO. : 5,483,795

DATED : January 16, 1996

INVENTOR(S) : Kenji KATOH et al.

It is certified that error appears in the above-identified patent and that said Letters Patent is hereby corrected as shown below:

ON THE TITLE PAGE:

IN THE ABSTRACT, line 4:   Change "releases" to --releasing--.

| Column | Line | |
|---|---|---|
| 1 | 12 | Change "releases" to --releasing--. |
| 2 | 22 | Change "releases" to --releasing--. |
| 2 | 26 | Change "of" to --for--. |
| 5 | 11 | Change "release" to --releasing--. |
| 5 | 20 | Change "FIG. 6o" to --FIG. 6.--. |
| 5 | 28 | Change "02" to --$O_2$--. |
| 8 | 58 | After "while" insert --it--. |
| 11 | 66 | Change "K 1.0" to --K<1.0--. |
| 11 | 67 | After "decided" (first occurrence) change "the" to --that--. |

UNITED STATES PATENT AND TRADEMARK OFFICE
CERTIFICATE OF CORRECTION

PATENT NO. : 5,483,795                  Page 2 of 3

DATED : January 16, 1996

INVENTOR(S) : Kenji KATOH et al.

It is certified that error appears in the above-identified patent and that said Letters Patent is hereby corrected as shown below:

| Column | Line | |
|---|---|---|
| 12 | 35 | Change "becomes" to --changes--. |
| 15 | 65 | Change "as K>1.0. The" to --that K>1.0, the--. |
| 20 | 21 | Change "becomes" to --changes--. |
| 20 | 23 | Change "shift" to --shifted--. |
| 20 | 41 | After "inside" insert --of--. |
| 21 | 48 | After "that is" insert --,--. |
| 23 | 23 | After "example" insert --,--; after "about" insert --10--. |
| 23 | 29 | After "becomes" delete "be". |

UNITED STATES PATENT AND TRADEMARK OFFICE
CERTIFICATE OF CORRECTION

PATENT NO. : 5,483,795

DATED : January 16, 1996

INVENTOR(S) : Kenji KATOH et al.

It is certified that error appears in the above-identified patent and that said Letters Patent is hereby corrected as shown below:

| Column | Line | |
|---|---|---|
| 24 | 56 | Change "$\epsilon$ C" to --$\Sigma$C--. |
| 24 | 57 | Change "$\epsilon$ C" to --$\Sigma$C--. |
| 25 | 11 | Change "$\epsilon$ C" to --$\Sigma$C--. |
| 25 | 13 | Change "$\epsilon$ C" to --$\Sigma$C--. |
| 25 | 15 | Change "Ca." to --$C_0$.--. |
| 28 | 4 | Change "K 1.0" to --K<1.0--. |
| 28 | 50 | Change "$\epsilon$ C" to --$\Sigma$C--. |
| 29 | 6 | Change "$\epsilon$ C" to --$\Sigma$C--. |
| 29 | 8 | Change "$\epsilon$ C" to --$\Sigma$C--. |

Signed and Sealed this

Eleventh Day of June, 1996

*Attest:*

BRUCE LEHMAN

*Attesting Officer*   *Commissioner of Patents and Trademarks*